United States Statutory Invention Registration [19]

[11] Reg. Number: H899

Suzuki et al. [43] Published: Mar. 5, 1991

[54] LIGHT-SENSITIVE SILVER HALIDE PHOTOGRAPHIC MATERIAL FEASIBLE FOR HIGH SPEED

[75] Inventors: Akio Suzuki; Satoru Nagasaki; Eiji Yoshida; Masumi Hosaka, all of Hino, Japan

[73] Assignee: Konishiroku Photo Industry Co., Ltd., Hino, Japan

[21] Appl. No.: 502,371

[22] Filed: Mar. 21, 1990

Related U.S. Application Data

[63] Continuation of Ser. No. 231,659, Aug. 12, 1988, abandoned, which is a continuation of Ser. No. 29,774, Mar. 24, 1987, abandoned.

[30] Foreign Application Priority Data

| | | | |
|---|---|---|---|
| Mar. 25, 1986 | [JP] | Japan | 61-66566 |
| May 15, 1986 | [JP] | Japan | 61-111671 |
| Sep. 29, 1986 | [JP] | Japan | 61-230786 |

[51] Int. Cl.[5] ..... G03C 5/16; G03C 1/04; G03C 1/02

[52] U.S. Cl. ..... 430/539; 430/523; 430/966

[58] Field of Search ..... 430/523, 539

[56] References Cited

U.S. PATENT DOCUMENTS

| | | | |
|---|---|---|---|
| 2,761,059 | 8/1955 | Yutzy et al. | 95/6 |
| 3,369,902 | 2/1968 | Abbott | 96/76 |
| 3,425,857 | 2/1969 | Bacon et al. | 117/34 |
| 3,545,971 | 12/1970 | Barnes et al. | 96/61 |
| 3,711,288 | 1/1973 | Sato et al. | 430/583 |
| 3,713,835 | 1/1973 | Sato et al. | 430/583 |
| 3,718,475 | 2/1973 | Shiba et al. | 430/583 |
| 3,769,024 | 10/1973 | Sakazume et al. | 430/583 |
| 3,840,376 | 10/1974 | Shiba et al. | 430/583 |
| 3,936,308 | 2/1976 | Gaugh et al. | 430/583 |
| 4,001,024 | 1/1977 | Dittman et al. | 96/87 R |
| 4,113,903 | 9/1978 | Choinski | 427/420 |
| 4,172,730 | 10/1979 | Hinata et al. | 96/82 |
| 4,216,290 | 8/1980 | De Beul et al. | 430/935 |
| 4,525,392 | 6/1985 | Ishizaki et al. | 427/420 |
| 4,551,424 | 11/1985 | Ikeda et al. | 430/588 |
| 4,555,480 | 11/1985 | Yokoyama et al. | 430/527 |
| 4,569,863 | 2/1986 | Kaetke et al. | 430/935 |

FOREIGN PATENT DOCUMENTS

| | | |
|---|---|---|
| 47045 | 7/1976 | Japan . |
| 115214 | 6/1977 | Japan . |
| 1350 | 3/1979 | Japan . |
| 108566 | 4/1981 | Japan . |
| 1143931 | 2/1969 | United Kingdom . |
| 2096782 | 10/1982 | United Kingdom . |

*Primary Examiner*—John S. Maples
*Assistant Examiner*—Joseph D. Anthony
*Attorney, Agent, or Firm*—Finnegan, Henderson, Farabow, Garrett & Dunner

[57] ABSTRACT

Disclosed is a light-sensitive silver halide photographic element which comprises photographic layers applied under the condition that the surface tension of a coating solution for forming an outermost layer is 6 dyn/cm or more smaller than the surface tension of a solution for forming a layer adjacent to the outermost layer, and satisfying at least one of the conditions shown below:

(a) gelatin contained in at least the side of a support having a light-sensitive silver halide emulsion layer and a hydrophilic colloid layer is in an amount of 2.20 to 3.10 g/m$^2$, (b) the photographic layers are formed by the constitution such that said coating solution for forming the outermost layer and said solution for forming the layer adjacent thereto each have a viscosity of 20 cp or less.

The light-sensitive silver halide photographic element obtained by this invention can be processed with a high speed processing, and has high sensitivity and also excellent pressure resistance and graininess even when subjected to an ultra rapid processing.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIGHT-SENSITIVE SILVER HALIDE PHOTOGRAPHIC MATERIAL FEASIBLE FOR HIGH SPEED

This application is a continuation of application Ser. No. 07/231,659, filed Aug. 12, 1988, now abandoned, which is a continuation of Ser. No. 07/029,774, filed Mar. 24, 1987, now abandoned.

BACKGROUND OF THE INVENTION

This invention relates to a light-sensitive silver halide photographic material feasible for high speed processing. Particularly, it relates to a light-sensitive silver halide photographic material having high sensitivity and also having excellent pressure resistance and graininess even when subjected to an ultra rapid processing.

In recent years, light-sensitive silver halide photographic materials have been consumed in such quantities that go on increasing. For this reason, there is an increase in the number of sheet for the processing of light-sensitive silver halide photographic materials, and it has been needed to carry out the processing more rapidly, in other words, to increase processing quantities in a given time.

The above trend is also seen in the field of X-ray light-sensitive materials, for example, of X-ray films for medical use. More specifically, with a rapid increase in the frequency of diagnosis to be caused by encouragement of periodical health examinations, it is attempted to diagnose more accurately, thereby increasing check items and thus increasing the number of sheet for the X-ray photography.

On the other hand, it is also necessary to give notice of results of diagnosis as soon as possible, to those who have been diagnosed.

That is, there are strong demands for carrying out the processing more rapidly than ever to facilitate the diagnosis. In particular, in angiography, perioperative photography or the like, it is essentially necessary to look at photographs in a time as short as possible.

In order to satisfy the above demands in the medical field, it is necessary to promote the automatization (in photography, conveyance, etc.) of the diagnosis, and also to process X-ray films more rapidly.

However, the ultra rapid processing causes problems such that (a) density is insufficient (i.e., decrease in sensitivity, contrast and maximum density), (b) fixing can not be sufficiently carried out, (c) water washing of films may become insufficient, (d) drying of films may become insufficient, and so forth. Moreover, the insufficient fixing and insufficient water washing may cause a change in tone during storage of films to lower image quality.

A means for solving these problems is to decrease the amount of gelatin. However, decrease in the amount of gelatin tends to bring about troubles such as coating unevenness and coating streaks. Also, films with less gelatin may produce problems such that, when films rub each other or films are rubbed by other materials, the so-called abrasion blackening may become liable to occur after the processing to form a portion having higher density than other portions, i.e., the so-called abrasion blackening.

Ultra rapid processing has been sought after as mentioned above. In the present specification, the ultra rapid processing is meant to be a processing for 20 seconds to 60 seconds in total of the time during which a top end of a film is first inserted to an automatic processor, and then passes through a developing tank, a gangway, a fixing tank, a gangway, a washing tank, a gangway and a drying spot, and thereafter the top end of the film comes out of the drying spot [in other words, the quotient (sec) obtained by dividing the total length (m) of a processing line by the line conveyor speed (m/sec)]. The reason why the time for the gangways is included is, though well known in the present industrial field, that a processing solution used in a step preceding thereto may swell also at a gangway and a processing step is considered to substantially proceed thereat.

To promote the rapid processing, it becomes very important to control the surface tension and viscosity of coating solutions used for forming an outermost layer and a layer adjacent thereto which constitute a light-sensitive silver halide photographic material. In particular, a technique for improving the viscosity of a coating solution is disclosed in Japanese Unexamined Patent Publications No. 115214/1977, No. 1350/1979 and No. 108566/1981 as a bead coating technique. Also, a great number of efforts has been made on the formation of better photographic layers according to other various methods. For example, as conditions imposed to a lowermost layer in the layer constitution of a light-sensitive material, the amount of coating solution and the viscosity are defined to be 2 to 12 g/m$^2$ and 1 to 8 cp, respectively (Japanese Unexamined Patent Publication No. 115214/1977), or, in respect of the viscosity $\eta_0$ of a coating solution for a lowermost layer, when coated at a low shear rate, the scope of tolerance between it and the viscosity $\eta_1$ of a coating solution for a layer directly above this lowermost 35 layer is defined to be $\eta_0=\eta_1\pm10$ (cp), and, when coated at a high shear rate, it is defined to be $\eta_0<\eta_1$ (Japanese Unexamined Patent Publication No. 108566/1981).

Japanese Patent Publication No. 47045/1976 discloses the importance of the amount of gelatin in a rapid processing, in which, however, the processing time is 60 seconds to 120 seconds in total processing time including the time for gangways. Such a processing time, however, can not satisfy the demands in the ultra rapid processing recently practiced.

Also, in recent years, with increase in medical X-ray examinations in particular, there is a strong demand for decreasing exposed doses not only in the field of medical science but also as an international public opinion. To meet such a demand, there have been used devices or appliances such as fluorescent intensifying paper, intensifying screens, fluorescent screens and X-ray image amplifiers, and a remarkable trend is seen in improvement in these devices or appliances and increase in the sensitivity of X-ray light-sensitive photographic materials. On the other hand, to carry out examinations more precisely, there is a demand for high precision techniques of X-ray photography. Since the precision may proportionally increase with greater X-ray irradiation, an X-ray photographing technique utilizing a larger radiation dose has been developed, and also a large volume X-ray generator has been developed. However, the photographing techniques requiring such a large radiation dose may rather contradict the above demands for decreasing exposed doses, and can not be said to be preferable. Accordingly, in the field of X-ray photographying techniques, it is required to provide a photographic technique that can achieve less exposed doses and yet higher precision. Thus, it has been sought after to develop a photographic material that can obtain a precise image, in other words, a photographic material having higher sensitivity, with less X-ray doses.

Many and various techniques are available for the methods of increasing sensitivity, i.e. sensitizing methods, under the same grain size. It is expected that sensitivity can be increased while keeping the same grain size, namely, while maintaining the covering power, if an appropriate sensitizing technique is used. Many reports have been made on such techniques, including, for example, a method in which a development accelerator such as thioethers is added to an emulsion, a method in which a silver halide emulsion having been spectrally sensitized is subjected to hypersensitization by use of suitable combination of dyes, or an improved technique for optical sensitizers. These methods, however, can not necessarily be said to have general-purpose properties when used in high sensitivity light-sensitive silver halide photographic materials. In other words, the high sensitivity light-sensitive silver halide photographic materials, which are chemically sensitized to an all possible maximum extent, tend to be fogged during storage when the above methods are applied.

Moreover, in the field of X-ray photographs for medical use, recently used are orthochromatic light-sensitive materials which are made light-sensitive in the wavelength region of 540 to 550 nm by carrying out orthochromatic sensitization, rather than regular type materials conventionally having a light-sensitive region at 450 nm. The materials sensitized like this have wide light-sensitive wavelength region and also have a sensitivity made higher. Accordingly, they can decrease exposed X-ray doses and minimize the influence to be given to human bodies. Thus, dye sensitization is a very useful sensitizing means, but is still involved in unsolved problems. For example, there remains a problem that sufficient sensitivity can not be obtained depending on the kind of photographic emulsions to be used.

Pressure desensitization (i.e., desensitization seen at the time of development, caused by mechanical pressure applied before exposure) also may sometimes occur due to various mechanical pressure applied before exposure. For instance, in X-ray films for medical use, which are large in size, film folding such as the so-called knick mark folding may sometimes occur, which is a phenomenon that a film is folded by its own weight at a portion where the film is held, whereby the pressure desensitization is liable to occur. Also, nowadays, automatic exposing and developing apparatus utilizing mechanical conveyance are widely used as medical X-ray photographic systems. In such apparatus, however, mechanical force may be applied to films, whereby the above-mentioned pressure blackening and pressure desensitization tend to occur especially in a dry place as in winter. Such a phenomenon is likely to cause serious difficulties in medial diagnosis. In particular, it is well known that light-sensitive silver halide photographic materials comprising silver halide grains having large grain size and high sensitivity are still more likely to cause the pressure desensitization.

As materials aiming at improving the pressure desensitization, those using thallium or those using a dye are disclosed in U.S. Pat. Nos. 2,628,167, 2,759,822, 3,455,235 and 2,296,204, French Pat. No. 2,296,204, Japanese Unexamined Patent Publications Nos. 107129/1976 and 116025/1975, etc., but the improvement to such a level is insufficient, or dye stains may greatly occur, or other materials can not necessarily be said to have sufficiently derived the nature inherent in the light-sensitive silver halide photographic materials having high sensitivity, comprising large grain size silver halide emulsions and chiefly utilizing ordinary surface sensitivity.

On the other hand, various attempts have been made to decrease the pressure desensitization by changing binder properties of light-sensitive silver halide photographic materials, as disclosed, for example, in U.S. Pat. Nos. 3,536,491, 3,775,128, 3,003,878, 2,759,821 and 3,772,032, and further in Japanese Unexamined Patent Publications No. 3325/1978, No. 56227/1975, No. 147324/1975 and No. 141625/1976, etc. However, although an improvement has been made for the pressure sensitization by these techniques, no fundamental improvement has been achieved as there may seriously occur the sticking of film surfaces or the deterioration of binder properties such as dryness and scratching.

SUMMARY OF THE INVENTION

A first object of this invention is to provide light-sensitive silver halide photographic material that can eliminate the above problems in the prior arts even when a high speed processing is carried out, for example, even when the ultra rapid processing whose total processing time is 20 seconds to 60 seconds as mentioned above is carried out, and can be excellent in sensitivity, contrast, maximum density, fixing performance, dryness, and so forth.

A second object of this invention is to provide a light-sensitive silver halide photographic material that may be involved in less troubles in coating even with less amount of gelatin, that may suffer less abrasion blackening or pressure desensitization, and that can also be excellent in graininess.

The above objects can be achieved by a light-sensitive silver halide photographic material which comprises photographic layers applied under the condition that the surface tension of a coating solution for forming an outermost layer is 6 dyn/cm or more smaller than the surface tension of a solution for forming a layer adjacent to the outermost layer, and satisfying at least one of the conditions shown below:

(a) Gelatin contained in at least the side of a support having a light-sensitive silver halide emulsion layer and a hydrophilic colloid layer is in an amount of 2.20 to 3.10 g/m$^2$.

(b) The photographic layers are formed by the constitution such that said coating solution for forming the outermost layer and said solution for forming the layer adjacent thereto each have a viscosity of 20 cp or less.

According to a preferred embodiment of this invention, the above light-sensitive silver halide photographic material may preferably have at least one silver halide emulsion layer containing at least one compound selected from the group of the compounds represented respectively by Formulas (I), (II) and (III).

Formulas (I), (II) and (III) are as follows:

Formula (I)

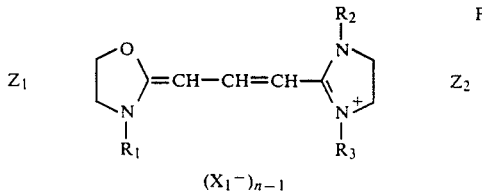

wherein $R_1$, $R_2$ and $R_3$ each represent a substituted or unsubstituted alkyl group, alkenyl group or aryl group, and at least one of $R_1$ and $R_3$ represents a sulfoalkyl group or a carboxyalkyl group; $X_1-$represents an anion; $Z_1$ and $Z_2$ represent a group of nonmetallic atoms necessary for the completion of a substituted or unsubstituted carbon ring; and n represents 1 or 2, provided, that n is 1 when an intramolecular salt is formed.

Formula (II)

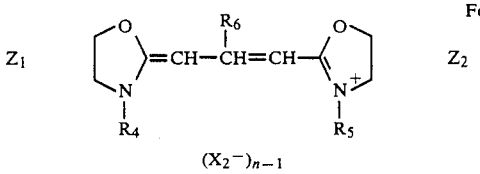

wherein $R_4$ and $R_5$ each represent a substituted or unsubstituted alkyl group, alkenyl group or aryl group, and at least one of $R_4$ and $R_5$ represents a sulfoalkyl group or a carboxyalkyl group; $R_6$ represents a hydrogen atom, a lower alkyl group or an aryl group; $X_2-$ represents an anion, $Z_1$ and $Z_2$ represent a group of nonmetallic atoms necessary for the completion of a substituted or unsubstituted carbon ring; and n represents 1 or 2, provided, that n is 1 when an intramolecular salt is formed.

Formula (III)

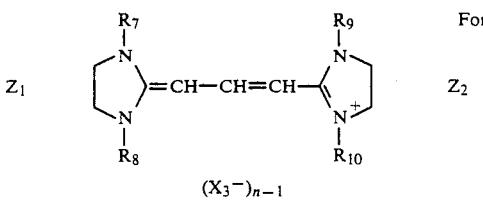

wherein $R_7$ and $R_9$ each represent a substituted or unsubstituted lower alkyl group; $R_8$ and $R_{10}$ each represent a lower alkyl group, a hydroxyalkyl group, a sulfoalkyl group or a carboxyalkyl group; $X_3-$represents an anion, $Z_1$ and $Z_2$ represent a group of nonmetallic atoms necessary for the completion of a substituted or unsubstituted carbon ring; and n represents 1 or 2, provided, that n is 1 when an intramolecular salt is formed.

DESCRIPTION OF THE PREFERRED EMBODIMENTS

In this invention, photographic layers are applied under the conditions that the surface tension of a solution for forming an outermost layer is 6 dyn/cm or more smaller than the surface tension of a solution for forming a layer adjacent to the outermost layer. In order to make 6 dyn/cm or more the difference in the surface tension between the solutions used for the above outermost layer (which is usually an uppermost layer) and the adjacent layer (which is a layer directly under the uppermost layer), an embodiment may be taken wherein at least one kind of surface active agent is used in the uppermost layer and the surface active agent may be or may not be used in the layer directly under the uppermost layer. The surface active agents used in the uppermost layer and the layer directly under it may be the same or different.

The difference in the surface tension between the solutions used for the uppermost layer and the layer directly under it is preferably controlled to be not less than 8 dyn/cm, more preferably not less than 10 dyn/cm, and most preferably not less than 12 dyn/cm.

Usually, the "outermost layer" mentioned in this invention refers literally to a most outside layer, and, in general, it is formed as an uppermost layer as mentioned above, including, of course, in this invention a case where a coating called as a super coat or the like formed by spraying or coating is sometimes provided on such an outermost layer.

The above surface active agent usable in this invention may include, for example, nonionic surface active agents such as saponin (steroid type), alkylene oxide derivatives (for example, polyethylene glycol, a polyethylene glycol/polypropylene glycol condensate, polyethylene glycol alkyl ethers or polyethylene glycol alkylaryl ethers, polyethylene glycol esters, polyethylene glycol sorbitan esters, polyalkylene glycol alkylamines or amides, and addition products of silicone with polyethylene oxides), glycidol derivatives (for example, alkenylsuccinic acid polyglycerides, and alkylphenol polyglycerides), aliphatic acid esters of polyhydric alcohol and alkyl esters of sugar. It may also include anionic surface active agents containing an acidic group such as a carboxyl group, a sulfo group, a phospho group, a sulfuric acid ester group and a phosphoric acid ester group, including alkyl carboxylates, alkyl sulfonates, alkyl benzenesulfonates, alkyl naphthalenesulfonates, alkylsulfuric acid esters, alkylphosphoric acid esters, N-acyl-N-alkyltaurines, sulfosuccinic acid esters, sulfoalkyl polyoxyethylene alkylphenyl ethers, polyoxyethylene alkylphosphoric acid esters, etc. It may further include amphoteric surface active agents such as amino acids, aminoalkylsulfonic acids, aminoalkylsulfuric acid or phosphoric acid esters, alkylbetaines and amine oxides. It may also include cationic surface active agents such as alkylamine salts, aliphatic or aromatic quaternary ammonium salts, heterocyclic quaternary ammonium salts such as pyridinium and imidazolium, phosphonium or sulfonium salts containing an aliphatic or a heterocyclic ring. There may be further used fluorine-containing surface active agents, fluorine-containing surface active agents having a polyoxyethylene group, etc.

The surface active agents of alkylene oxide type are disclosed in Japanese Patent publication No. 9610/1976, DT-26 48 746, Japanese Unexamined Patent Publications No.129623/1978, No. 89624/1979, No. 98235/1979, 203435/1983, No. 208743/1983, No. 80848/1985 and No. 94126/1985, etc. Examples of combined use of the surface active agents of alkylene oxide type and other compounds are disclosed in Japanese Unexamined Patent Publications No. 89626/1979, No. 70837/1980, No. 11341/1982, No. 109947/1982, No. 74554/1984, No. 76741/1985, No. 76742/1985, No. 76743/1985, No. 80839/1985, No. 80846/1985, No. 80847/1985, No. 131293/1975, No. 29715/1978, etc.

The anionic surface active agents may include those disclosed in Japanese Unexamined Patent Publication No. 21922/1978, GB-1,503,218, Japanese Patent Publication No. 1617/1981, and sulfates of higher alcohols, higher alkyl sulfonates, alkylbenzene sulfonates, dialkyl sulfosuccinates, acylmethyltauride, N-acylsarcocinate, aliphatic monoglyceride sulfate, $\alpha$-sulfonic acid, etc.

The fluorine-containing surface active agents may include the compounds disclosed in Japanese Patent Publications No. 9303/1972, No. 43130/1973, No. 25087/1977 and No. 1230/1982, Japanese Unexamined Patent Publications No. 46733/1974, No. 16525/1975, No. 34233/1975, No. 32322/1976, No. 14224/1979, No. 111330/1979, No. 557762/1980, No. 19042/1981, No. 41093/1981, No. 34856/1981, No. 11341/1982, No. 29691/1982, No. 64228/1982, No. 146248/1982, No. 114944/1981, No. 114945/1981, No. 196544/1983, No. 200235/1983, No. 109548/1985 and No. 136534/1982, U.S. Pat. Nos. 3,589,906, 3,775,126, and 4,292,402, RD-16630, etc., and the compounds exemplified in Japanese Unexamined Patent Publication No. 164738/1985.

The surface tension of the coating solutions regulated by the surface active agent can be determined by measurement according to the Wilhelm's conventional method at a prescribed liquid temperature.

Preferable examples of anionic surface active agents containing no polyalkylene oxide are shown below as 1-1 to 1-10.

$C_4H_9O-SO_3Na$ 1-1

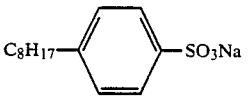
1-2

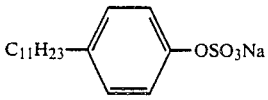
1-3

-continued

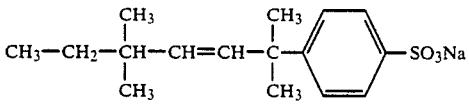
1-4

$NaO_3S-CH(CH_2-COOC_8H_17)-COOC_5H_{11}$ 1-5

$C_5H_{11}-CON(CH_3)-CH_2CH_2SO_3Na$ 1-6

$C_4H_9CON(CH_3)-CH_2COONa$ 1-7

$C_8H_{17}COOCH_2-CH(OH)-CH_2OSO_3Na$ 1-8

$C_6H_{13}-CH(SO_3Na)-COOH$ 1-9

$NaO_3S-CH(CH_2-COOCH_2CH(C_2H_5)-C_4H_9)-COOCH_2CH(C_2H_5)-C_4H_9$ 1-10

Preferable examples of fluorine-containing surface active agents are shown below as 2-1 to 2-81.

$C_3F_5O(CH_2CH_2O)_{20}C_{12}H_{25}$ 2-1

$C_3F_5O(CH_2CH_2O)_5C_3F_5$ 2-2

$C_6F_{13}O(CH_2CH_2O)_{10}C_4H_9$ 2-3

$C_6F_{13}O(CH_2CH_2O)_{20}C_6H_{13}$ 2-4

$C_6F_{13}O(CH_2CH_2O)_7CH_3$ 2-5

$C_9F_{17}O(CH_2CH_2O)_{20}CH_3$ 2-6

$C_7F_{15}CON(C_3H_7)(CH_2CH_2O)_2(CH_2)_3SO_3Na$ 2-7

$C_6F_{13}SO_2N(CH_3)(CH_2CH_2O)_3(CH_2)_4SO_3Na$ 2-8

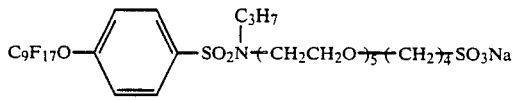
2-9

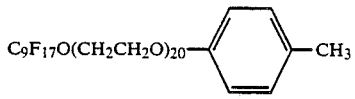
2-10

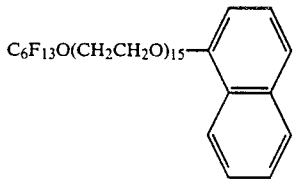
2-11

$C_6F_{13}O(CH_2CH_2O)_{20}-N(CH_3)-C_8H_{17}$ 2-12

-continued 2-13

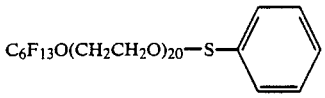

2-14 $C_6F_{13}O(CH_2CH_2O)_{40}-C_{18}H_{35}$ 2-15 $C_9F_{17}O(CH_2CH_2O)_{10}-H$ 2-16 $C_{12}F_{23}O(CH_2CH_2O)_{50}-CH_3$ 2-17 $C_6F_{11}O(CH_2CH_2O)_{20}(\underset{\underset{CH_3}{|}}{C}HCH_2O)_3CH_3$ 2-18

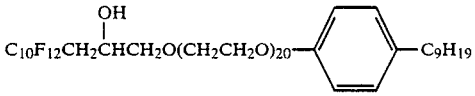

2-19 $C_9F_{19}CH_2\overset{\overset{OH}{|}}{C}HCH_2O(C_2H_4O)_{10}CH_3$ 2-20

$$C_6F_{13}SO_2\overset{\overset{C_3H_7}{|}}{N}(CH_2CH_2O)_2\overset{\overset{O}{\|}}{C}-CH$$
$$C_6F_{13}SO_2\overset{\overset{C_3H_7}{|}}{N}(CH_2CH_2O)_2\overset{\overset{O}{\|}}{C}-CH_2-SO_3Na$$

2-21 $C_8F_{17}(CH_2CH_2O)_5(CH_2)_4SO_3Na$ 2-22 $H(CF_2)_8CH_2O(CH_2CH_2)_4(CH_2)_3SO_3H$ 2-23 $C_7F_{15}COO(CH_2CH_2O)_4(CH_2)_4SO_3K$ 2-24 $C_8F_{17}SO_2\overset{\overset{CH_3}{|}}{N}(CH_2CH_2O)_8SO_3Na$ 2-25 $C_4F_9(CH_2CH_2O)_3SO_3Na$ 2-26 $C_8F_{17}SO_2\overset{\overset{C_3H_7}{|}}{N}(CH_2CH_2O)_6CH_2COONa$ 2-27 $H(CF_2)_8CH_2O(CH_2CH_2O)_3\overset{\overset{O}{\|}}{\underset{\underset{ONH_4}{|}}{P}}-ONH_4$ 2-28

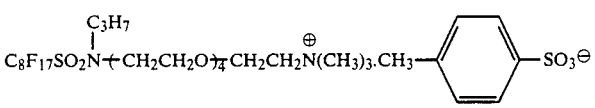

2-29 $C_8F_{17}SO_2\overset{\overset{C_3H_7}{|}}{N}(CH_2CH_2O)_4CH_2CH_2-\overset{\overset{CH_3}{|}}{\underset{\underset{CH_3}{|}}{\overset{\oplus}{N}}}-CH_2COO^{\ominus}$ 2-30 $C_8F_{17}(CH_2CH_2O)_3CH_2CH_2-\overset{\overset{CH_3}{|}}{\underset{\underset{CH_3}{|}}{\overset{\oplus}{N}}}-CH_2COO^{\ominus}$ 2-31 $C_8F_{17}SO_2\overset{\overset{C_3H_7}{|}}{N}(CH_2CH_2O)_8H$ 2-32 $C_6F_{13}SO_3Na$ 2-33 $C_8F_{17}SO_3Na$ 2-34 $C_6F_{13}COOK$ 2-35 $C_8F_{17}SO_3COOK$ 2-36 $C_8F_{17}SO_2\underset{\underset{C_3H_7}{|}}{N}CH_2COOK$ -continued
$F_3C-(CF_2)_2-COOH$ 2-37
$H-(CF_2)_6-COOH$ 2-38
$CF_3-(CF_2)_6-COONH_4$ 2-39
$H-(CF_2)_{10}-COOH$ 2-40
$H-(CF_2)_6-CH_2-OSO_3Na$ 2-41
$H-(CF_2)_3-CH_2-OSO_3Na$ 2-42
2-43
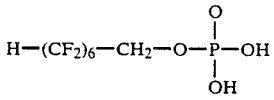
2-44
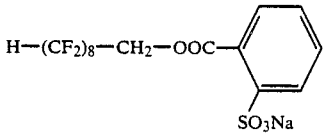
2-45
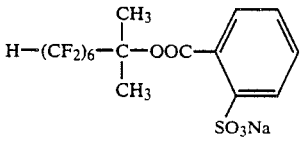
2-46
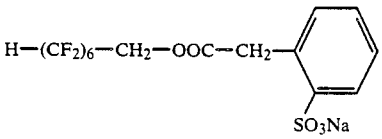
2-47
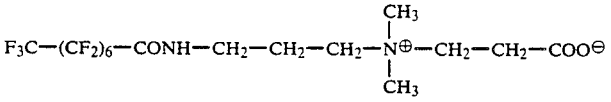
$H-(CF_2)_6-CONH-CH_2-O-SO_3Na$ 2-48
2-49
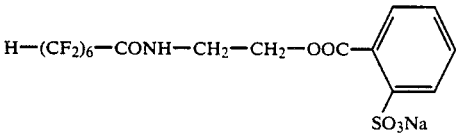
2-50
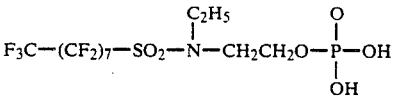
2-51
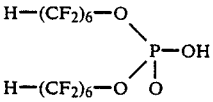
2-52
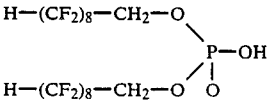
2-53
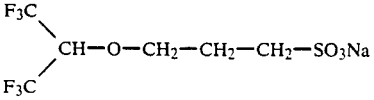
$H-(CF_2)_6-CH_2-O-CH_2-CH_2-CH_2-SO_3Na$ 2-54
$F_3C-(CF_2)_6-CH_2-O-CH_2-CH_2-CH_2-SO_3Na$ 2-55

-continued
2-56
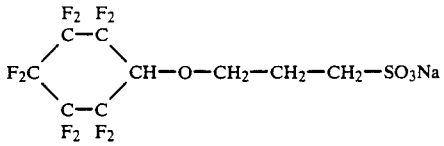
2-57
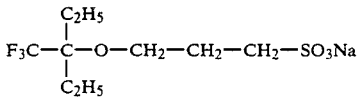
2-58 $F_3C-(CF_2)_2-COO-CH_2-CH_2-CH_2-SO_3Na$
2-59 $H-(CF_2)_{10}-COO-CH_2-CH_2-CH_2-SO_3Na$
2-60
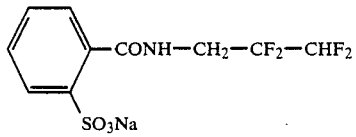
2-61 $F_3C-(CF_2)_2-COO(-CH_2CH_2O)_7-CH_3$
2-62 $F_3C-(CF_2)_7-SO_2-N(-CH_2CH_2O)_4H$ ($C_2H_5$)
2-63 $F_3C-(CF_2)_2-CH_2O(-CH_2CH_2O)_5H$
2-64
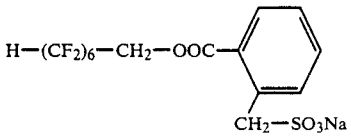
2-65 $C_{16}H_{33}-CH(SO_3Na)-COO-CH_2-CF_3$
2-66
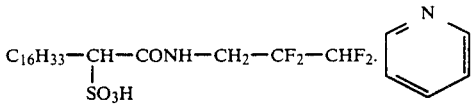
2-67 $F_3C-(CF_2)_7-SO_2-N(C_2H_5)-CH_2COOH$
2-68 $F_3C-(CF_2)_7-SO_2-N(C_2H_5)-CH_2-CH_2-O-SO_3H$
2-69
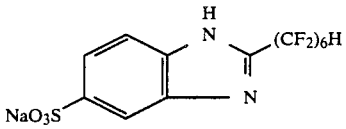
2-70 $NaO_3S-CH(CH_2-COOCH_2(CF_2CF_2)_3H)-COOCH_2(CF_2CF_2)_3H$
2-71 $C_8F_17SO_2N(C_2H_5)CH_2CH_2OP(=O)(OH)_2$
2-72 $F_{17}C_8SO_2NHCH_2CH_2CH_2-\oplus N(CH_3)_2-CH_2CH_2OHBr^{\ominus}$ -continued 2-73

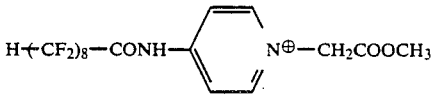

2-74

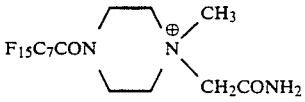

2-75

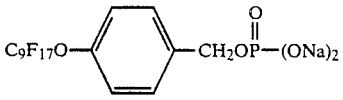

2-76

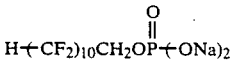

2-77

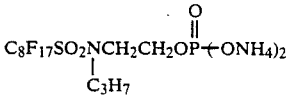

2-78

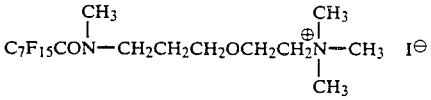

2-79

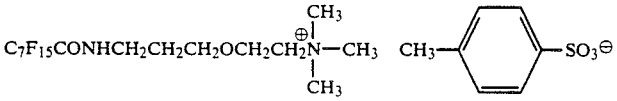

2-80

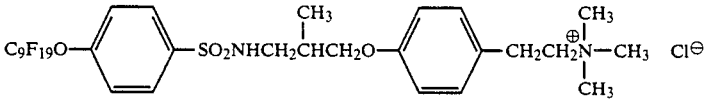

2-81

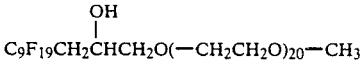

2-82

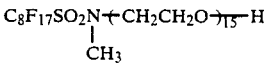

Commercially available fluorine-containing surface active agents may include those which are commercially available in the trade name of UNIDAIN from Daikin Industries, Ltd., or in the trade name of FLOLARD from 3 M (Suimitomo 3M Limited).

Specific examples of polyoxyethylene surface active agents preferably usable in this invention are shown as 3-1 to 3-44.

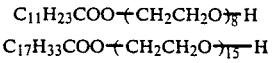

3-1

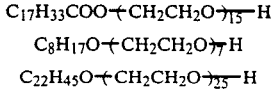

3-2

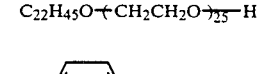

3-3

3-4

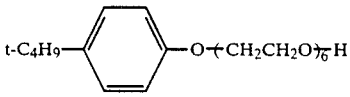

3-5

-continued

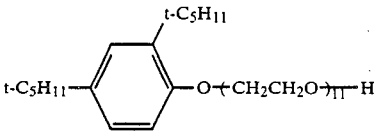

3-6

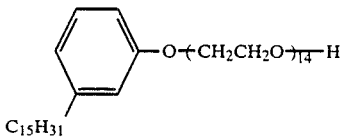

3-7

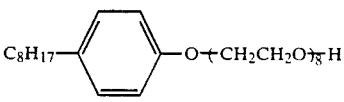

3-8

-continued
3-9
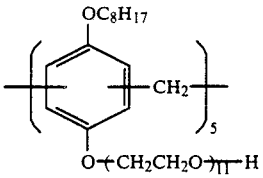
3-10
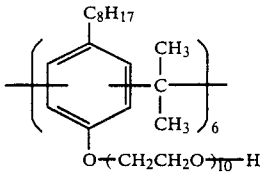
3-11
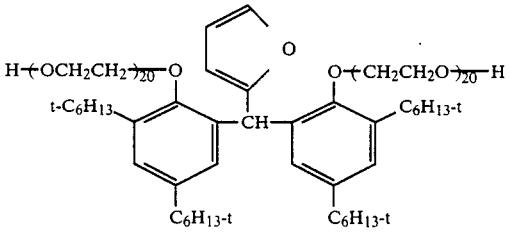
3-12
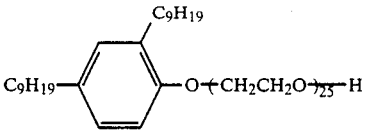
3-13
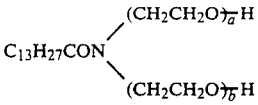
a + b = 15
3-14
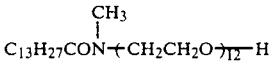
3-15
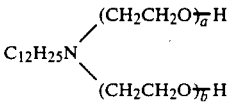
a + b = 20
3-16
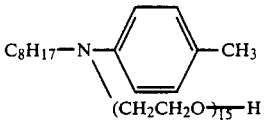
3-17
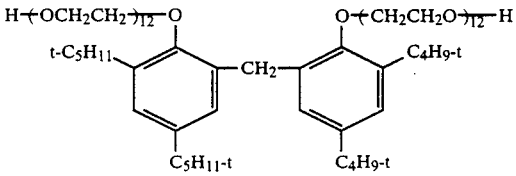
3-18
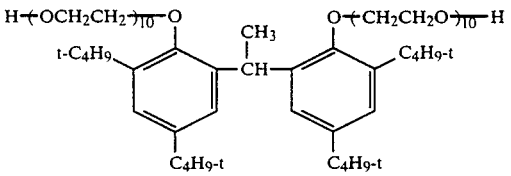
-continued
3-19
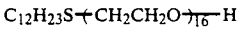
3-20
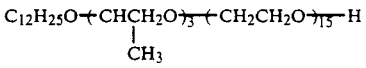
3-21
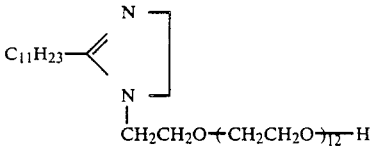
3-22
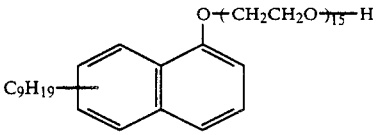
3-23
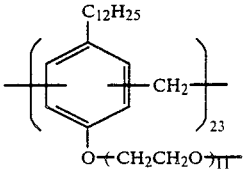
3-24
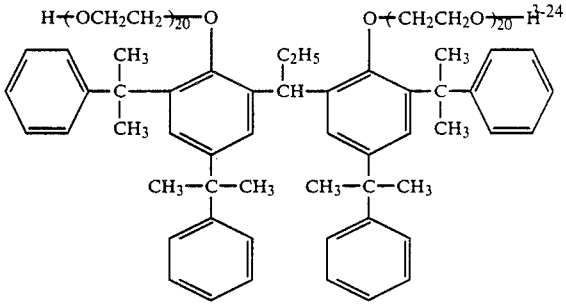
3-25
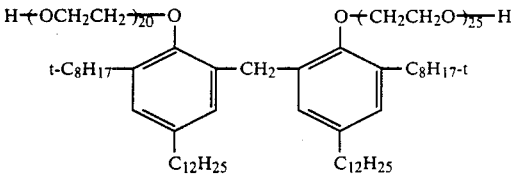
3-26
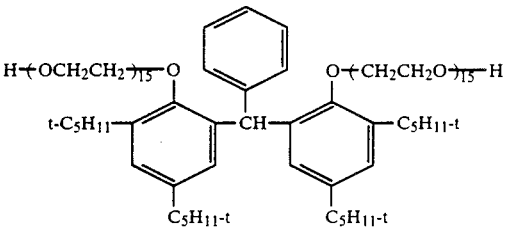
3-27
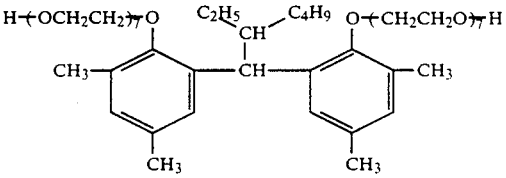

-continued
3-28
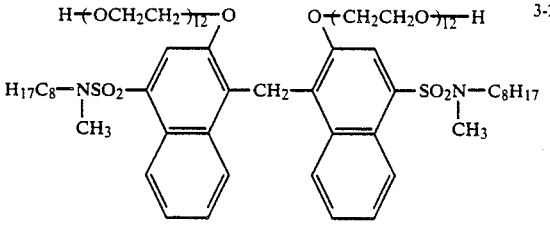
3-29
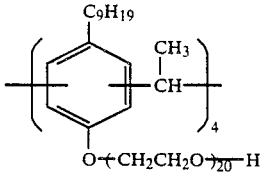
3-30
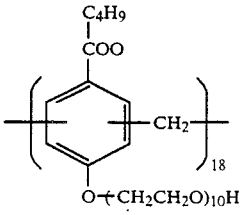
3-31 $C_{12}H_{25}O(OCH_2CH_2)_{14}(CH_2)_4SO_3Na$
3-32 $C_{18}H_{35}O(CH_2CH_2O)_8(CH_2)_3SO_3Na$
3-33
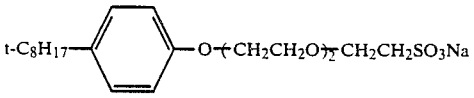
3-34
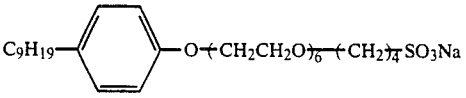
-continued
3-35
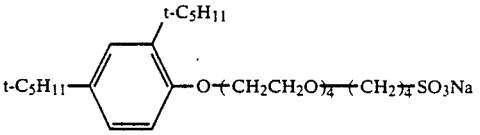
3-36 $C_{11}H_{23}CON(CH_2CH_2O)_2(CH_2)_4SO_3Na$ ($CH_3$)
3-37 $C_9H_{19}O(CH_2CH_2O)_4SO_3K$
3-38
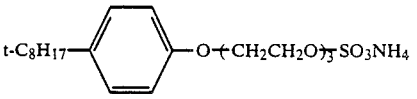
3-39 $C_{18}H_{33}O(CH_2CH_2O)_4SO_3Na$
3-40
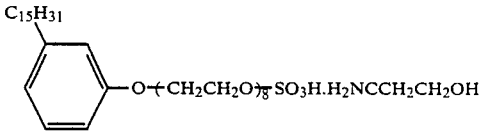
3-41 $C_{12}H_{25}O(CH_2CH_2O)_4CH_2COONa$
3-42
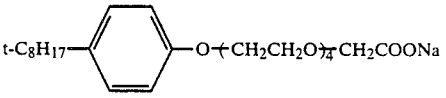
3-43 $C_{18}H_{35}O(CH_2CH_2O)_4P(=O)(ONa)_2$
3-44
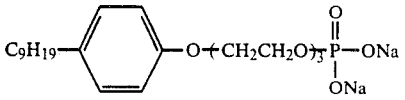
Preferably quaternary ammonium salts may include the compounds shown below as 4-1 to 4-20.
4-1
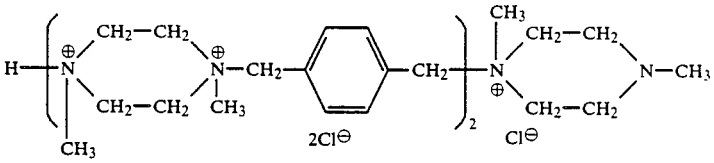
4-2
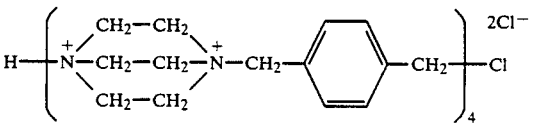
4-3
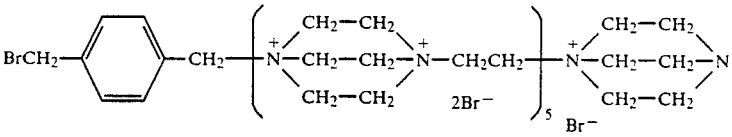

-continued
4-4
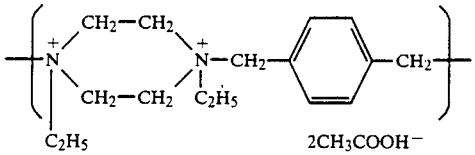
4-5
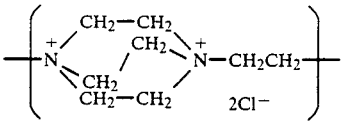
4-6
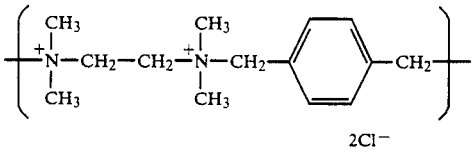
4-7
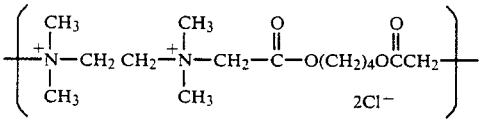
4-8
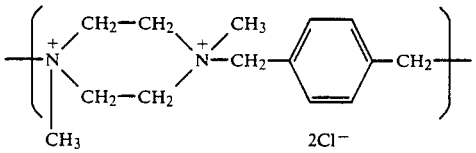
4-9
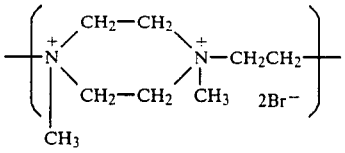
4-10
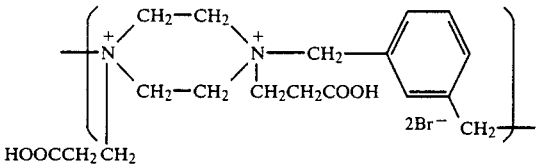
4-11
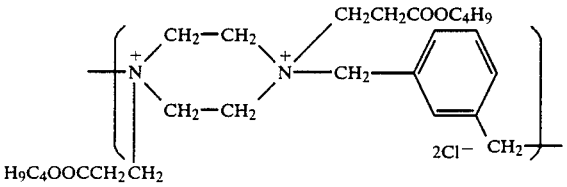
4-12
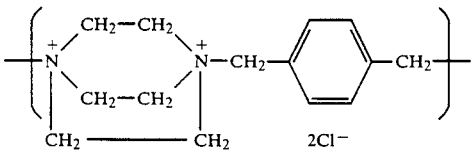

-continued 4-13

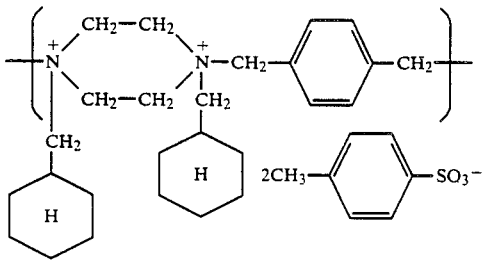

4-14

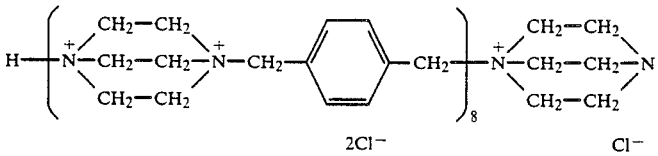

4-15

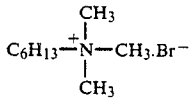

4-16

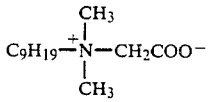

4-17

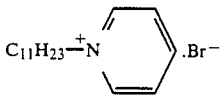

4-18

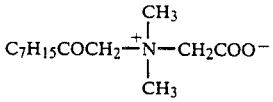

4-19

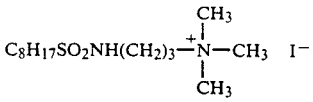

4-20

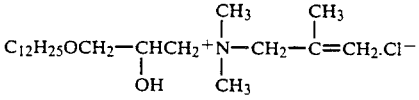

Coating solutions for the outermost layer and the layer adjacent thereto which form the photographic constituent layers of the light-sensitive material of this invention will be described below. The coating solutions are controlled to have respectively a viscosity preferably of 20 cp or less, more preferably 15 cp or less. It is further preferable for both solutions to be controlled so that the difference in the viscosity therebetween may be in the range of ±2 cp. As a thickening agent used therefor, any thickening agent can be used if it has a thickening effect and, at the same time, may not particularly adversely affect the light-sensitive silver halide photographic material. In other words, if it is a thickening agent that may not inhibit any properties of the above light-sensitive material, it may not particularly limited to a particular substance.

Those which are generally used as the thickening agent may include, for example, aqueous polymers having a sulfuric acid ester group (Japanese Patent Publication No. 21574/1961), dextran and sulfuric acid esters thereof (Japanese Patent Publications No. 11989/1960 and No. 12872/1970), polysaccharides (U.S. Pat. No. 3,767,410), polymers having a sulfonic acid group, a carboxylic acid group or a phosphoric acid group (Japanese Unexamined Patent Publication No. 18687/1983) and colloid silica (Japanese Unexamined Patent Publication No. 36768/1983). Those which are particularly preferable in this invention are disclosed in Japanese Unexamined Patent Publication No. 109947/1982.

When working this invention, one or more kinds of, for example, thickening agents other than colloidal silica can be used as the thickening agent. In such a case, the amount of the thickening agents may be suitably selected depending on the layer(s) to which they are added or the kind of the compound. In summary, it is satisfactory if the viscosity has been controlled to 20 cp or less by using the thickening agent.

After control by the thickening agent, the viscosity can be determined by measurement at a liquid temperature of 35° C. with use of a viscometer such as a B-type viscometer.

When the above gelatin is used in the light-sensitive photographic material of this invention, it is preferable to control the amount of gelatin contained in the photographic constituent layers formed on a support to be 2.20 to 3.10 g/m$^2$. If the amount of gelatin is in such a range, the sensitivity as a light-sensitive material and the resistance to abrasion blackening can be more improved than the case where gelatin is contained in an amount more than 3.10 g/m$^2$. If it is less than 2.20 g/m$^2$, gelatin can be applied to a support only with difficulty.

Sensitizing dyes that can be used when working this invention will be described below. The sensitizing dyes may be any of substances having a desired absorption band in the visible light region, and a group of the organic compounds represented respectively by Formula (I), (II) and (III) shown below may be preferably used in this invention.

Formula (I)

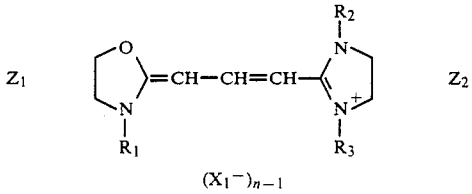

wherein $R_1$, $R_2$ and $R_3$ each represent a substituted or unsubstituted alkyl group, alkenyl group or aryl group, and at least one of $R_1$ and $R_3$ takes a sulfoalkyl group or a carboxyalkyl group; $X_1^-$represents an anion; $Z_1$ and $Z_2$ represent a group of nonmetallic atoms necessary for the completion of a substituted or unsubstituted carbon ring; and n represents 1 or 2, provided, however, that n is 1 when an intramolecular salt is formed.

Formula (II)

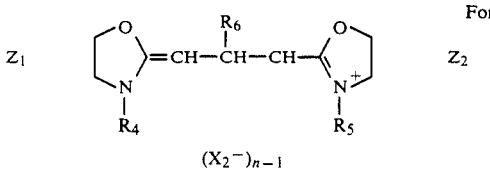

wherein $R_4$ and $R_5$ each represent a substituted or unsubstituted alkyl group, alkenyl group or aryl group, and at least one of $R_4$ and $R_5$ takes a sulfoalkyl group or a carboxyalkyl group; $R_6$ represents a hydrogen atom, a lower alkyl group or an aryl group; $X_2^-$ represents an anion, $Z_1$ and $Z_2$ represent a group of nonmetallic atoms necessary for the completion of a substituted or unsubstituted carbon ring; and n represents 1 or 2, provided, however, that n is 1 when an intramolecular salt is formed.

Formula (III)

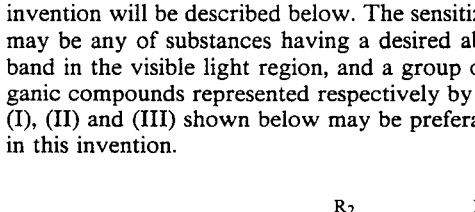

wherein $R_7$ and $R_9$ each represent a substituted or unsubstituted lower alkyl group; $R_8$ and $R_{10}$ each represent a lower alkyl group, a hydroxyalkyl group, a sulfoalkyl group or a carboxyalkyl group; $X_3^-$ represents an anion, $Z_1$ and $Z_2$ represent a group of nonmetallic atoms necessary for the completion of a substituted or unsubstituted carbon ring; and n represents 1 or 2, provided, however, that n is 1 when an intramolecular salt is formed.

In Formulas (I), (II) and (III), the carbon ring containing $Z_1$ and $Z_2$ may preferably include an aromatic ring such as a substituted or unsubstituted benzene ring or naphthalene ring.

In Formula (I), the anion represented by $X_1^-$ may include, for example, a chloride ion, a bromide ion, an iodide ion, a thiocyanate ion, a sulfate ion, a perchlorate ion, a p-toluene sulfonate ion, an ethyl sulfate ion, etc.

Typical examples of the compound represented by Formula (I) is shown below, but this invention is by no means limited by these.

(Examples of the compound)

(1)

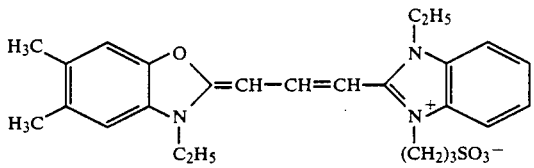

(2)

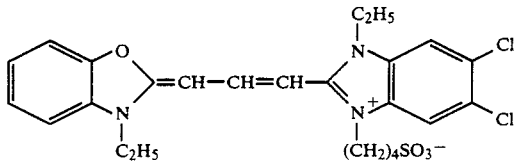

(3)

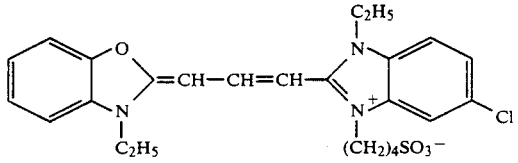

-continued
(Examples of the compound)
(4)
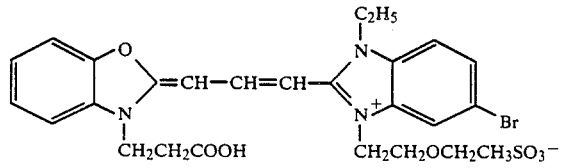
(5)
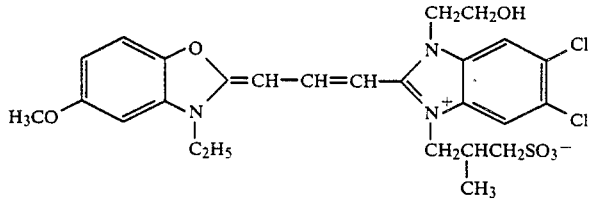
(6)
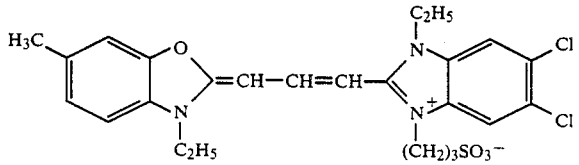
(7)
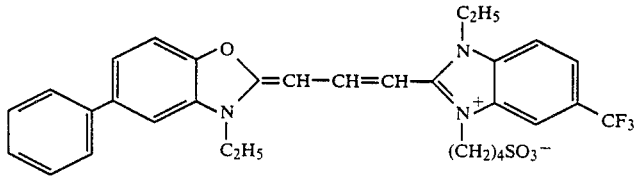
(8)
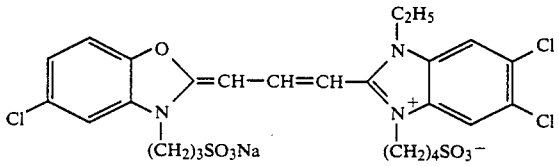
(9)
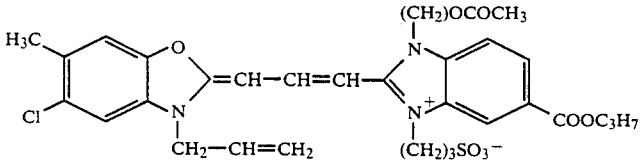
(10)
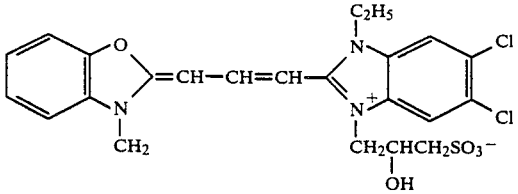
(11)
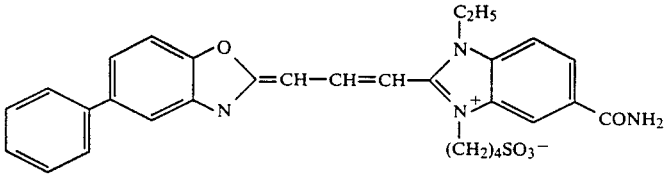

-continued
(Examples of the compound)
(12)
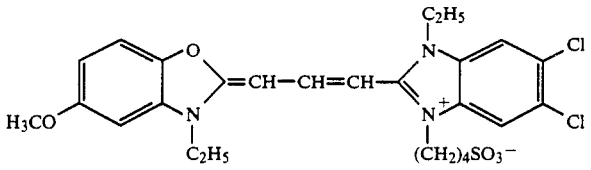
(13)
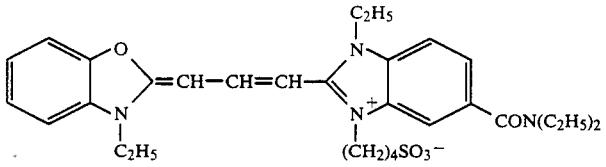
(14)
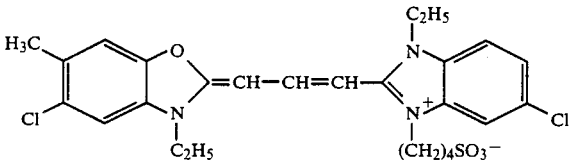
(15)
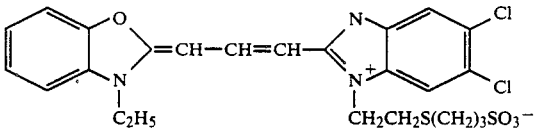
(16)
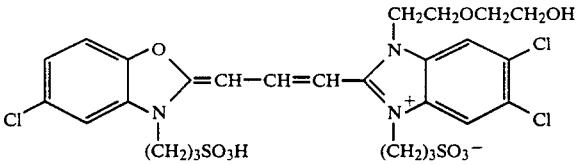
(17)
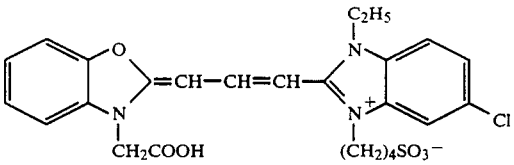
(18)
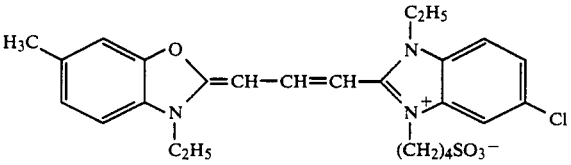
(19)
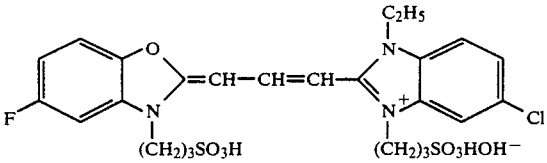
(20)
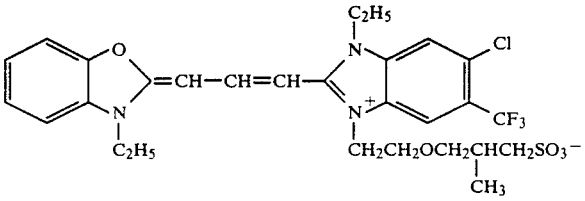

-continued
(Examples of the compound)
(21)
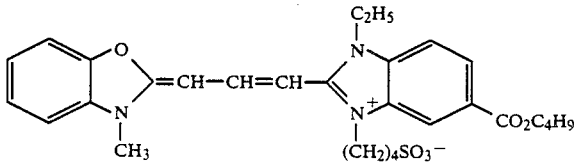
(22)
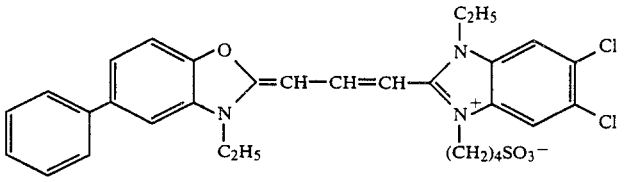
(23)
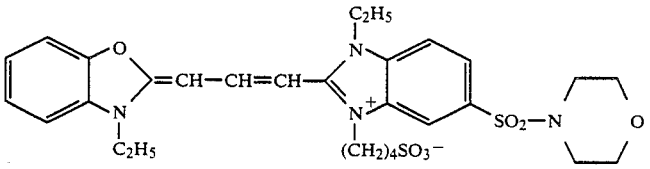
(24)
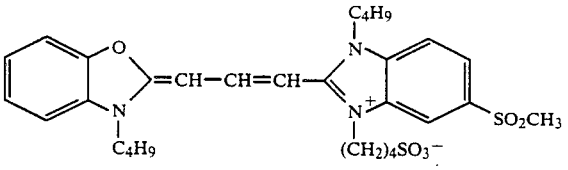
(25)
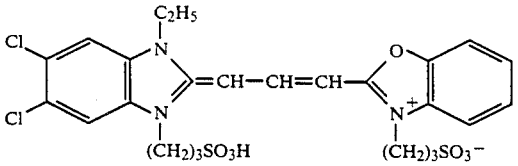
(26)
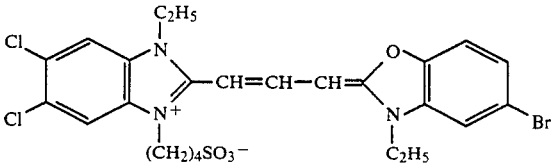
(27)
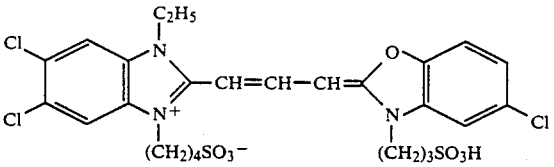
(28)
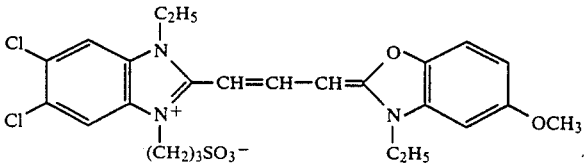
(29)
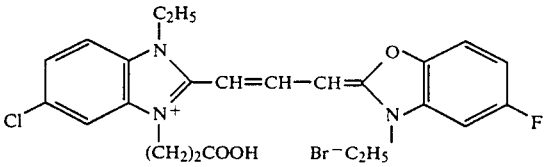

-continued
(Examples of the compound)
(30)
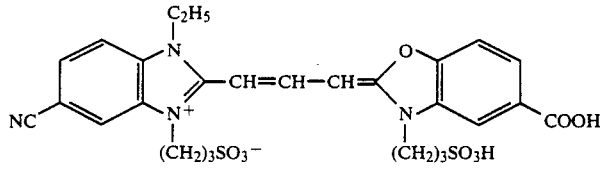
(31)
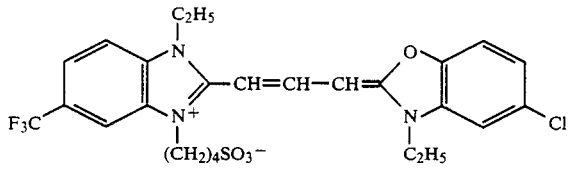
(32)
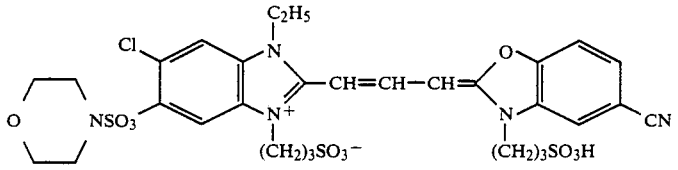
(33)
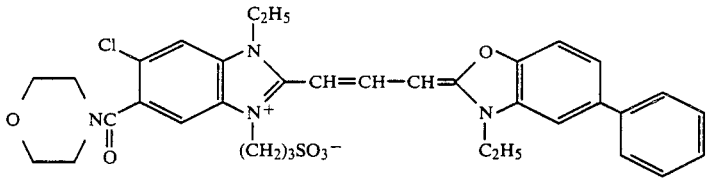
(34)
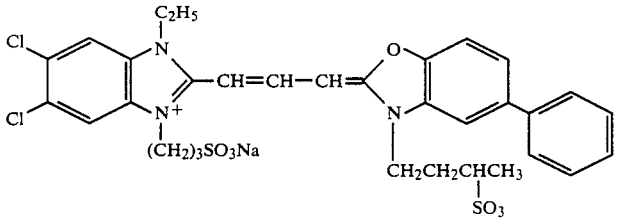
(35)
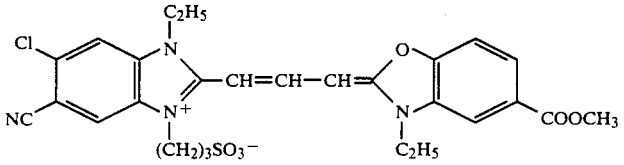
(36)
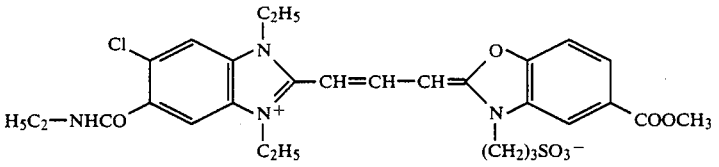
(37)
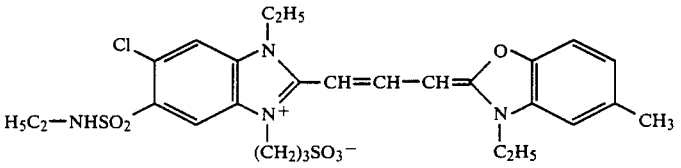
(38)
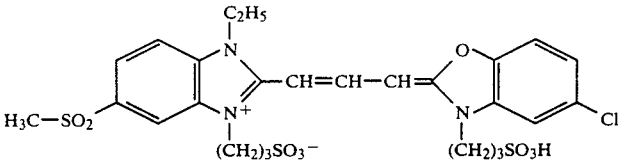

-continued (Examples of the compound)

(39)

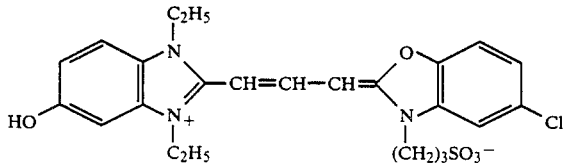

(40)

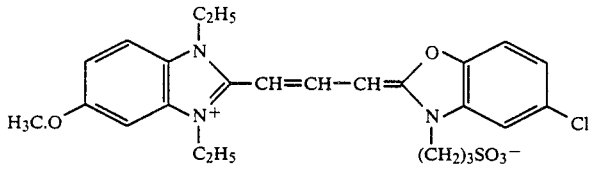

(41)

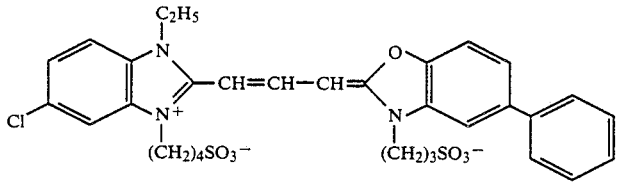

In Formula (II), $R_6$ represents a hydrogen atom, a lower alkyl group or an aryl group, and the lower alkyl group may include groups such as methyl, ethyl, propyl and butyl. The aryl group may include, for example, a phenyl group. The groups represented by $R_4$ and $R_5$ may include those exemplified for $R_1$ and $R_3$ in Formula (I) in the above description of Formula(I). The anions represented by $X_2^-$ may also include those exemplified for $X_1^-$ in Formula (I).

Typical examples of the compound represented by Formula (II) are shown below, but, also in this case, this invention is by no means limited by these examples as a matter of course.

(Examples of the compound)

(42)

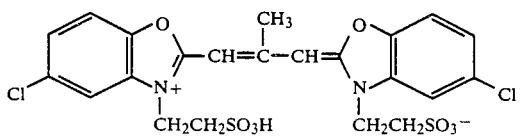

(43)

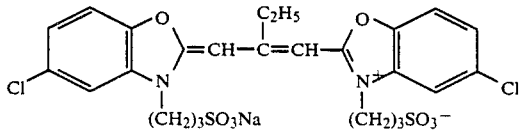

(44)

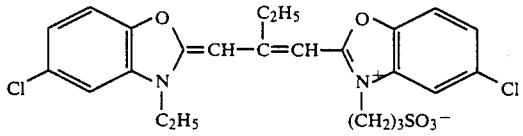

(45)

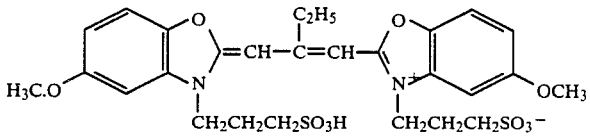

(46)

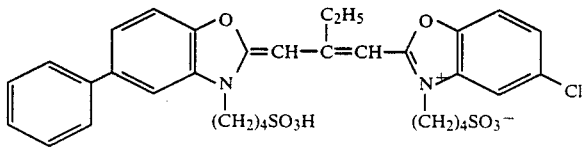

-continued
(Examples of the compound)
(47)
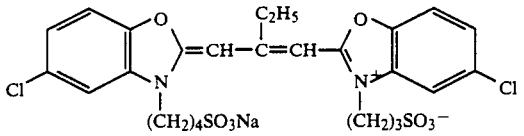
(48)
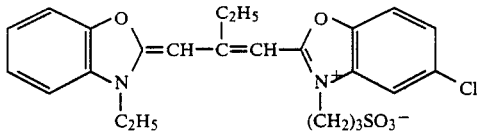
(49)
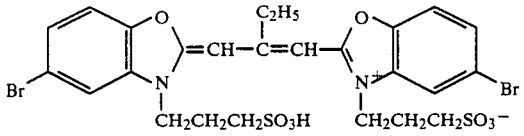
(50)
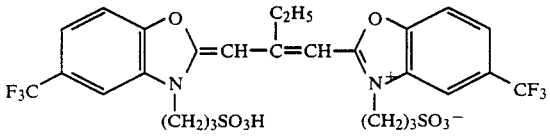
(51)
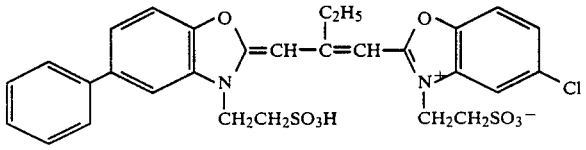
(52)
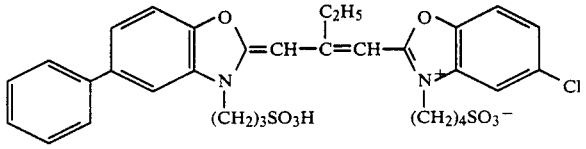
(53)
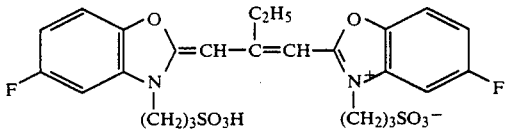
(54)
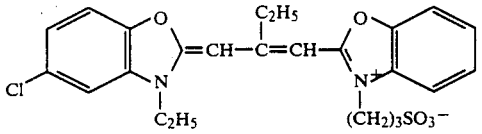
(55)
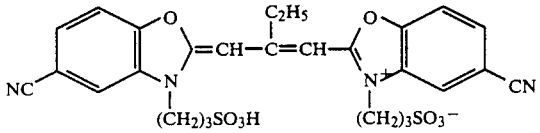
(56)
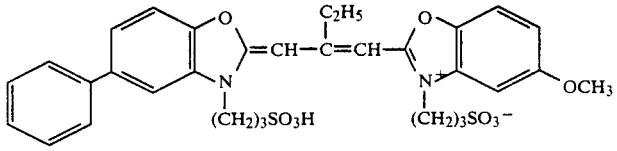

-continued (Examples of the compound)

(57)

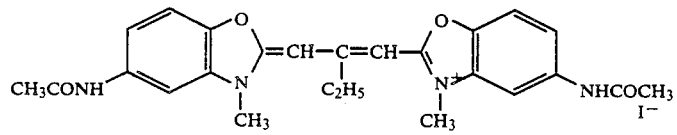

(58)

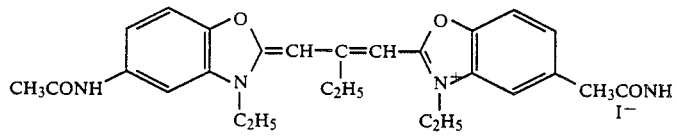

(59)

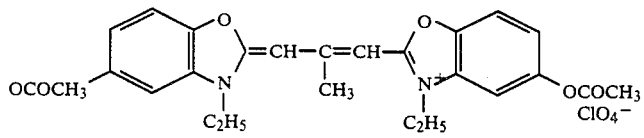

(60)

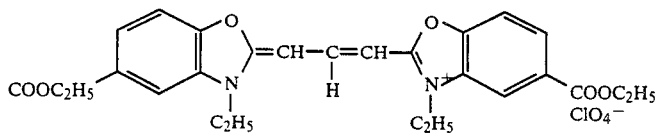

(61)

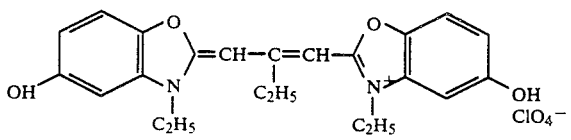

(62)

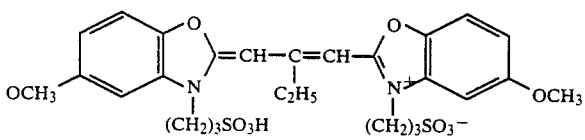

(63)

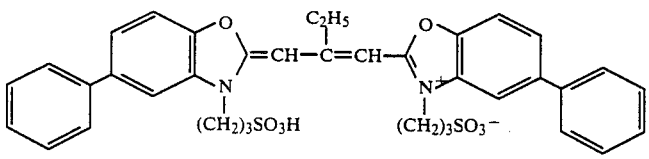

(64)

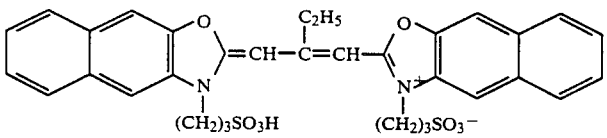

(65)

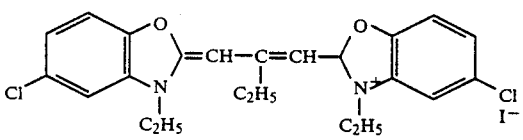

Next, in Formula (III), the lower alkyl group represented by $R_7$ and $R_9$ may include groups such as methyl, ethyl, propyl and butyl. The substituted alkyl group may include the groups exemplified for $R_1$ to $R_3$ in Formula (I). The lower alkyl group represented by $R_8$ and $R_{10}$ may be exemplified by those same as for $R_7$ and $R_9$. Also, the hydroxyalkyl group, sulfoalkyl group and carboxyalkyl group represented by $R_8$ and $R_{10}$ may include the groups exemplified for $R_1$ to $R_3$ in Formula (I).

The anion represented by $X_3^-$ may also include the ions exemplified for $X_1^-$ in Formula (I).

Typical examples of the compound represented by Formula (III) are shown below. In this case also, this invention is by no means limited by these examples as a matter of course.

(Examples of the compounds)
(66)
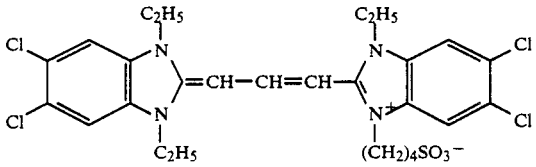
(67)
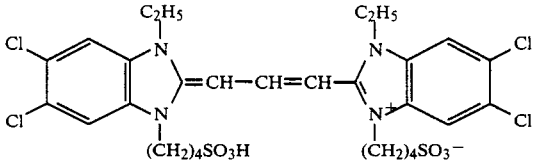
(68)
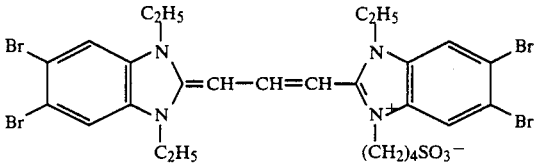
(69)
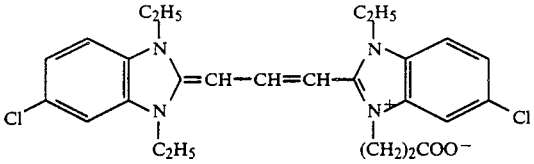
(70)
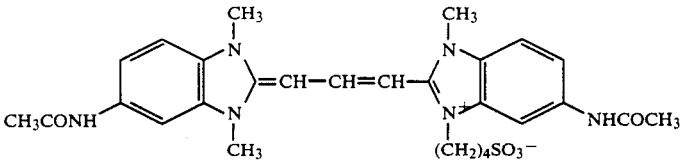
(71)
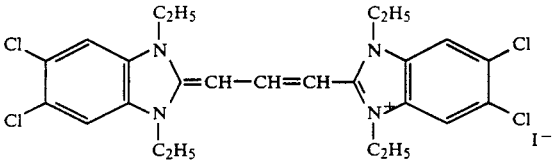
(72)
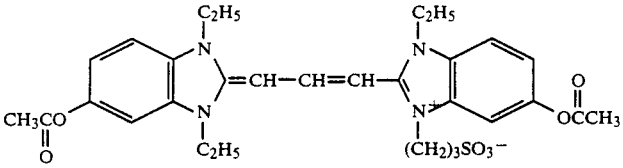
(73)
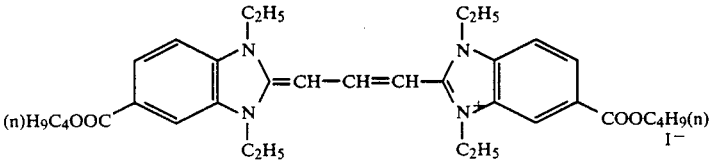
(74)
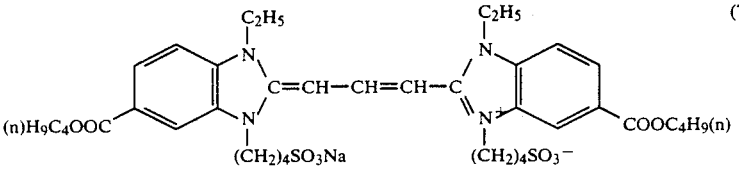

-continued (Examples of the compounds)

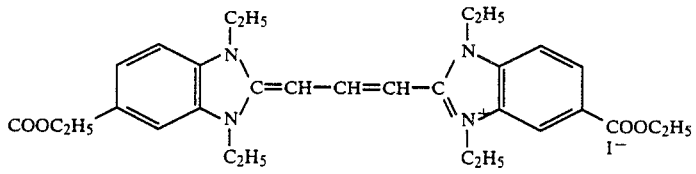
(75)

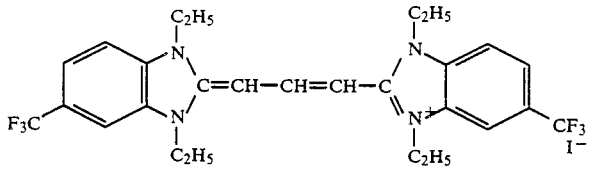
(76)

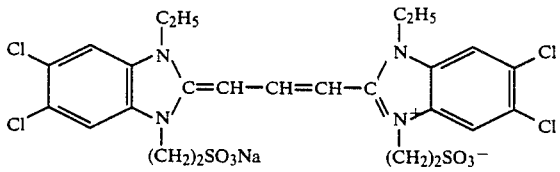
(77)

The compounds represented by the above Formulas (I), (II) and (III) may be used in an amount ranging between 10 mg and 900 mg in total per mole of silver halide. Particularly preferably, the amount ranges between 60 mg and 600 mg.

The compounds represented by the above Formulas (I), (II) and (III) may be added at any position in the course of the production of the light-sensitive materials. For example, they may be added anywhere before chemical ripening, during chemical ripening, after termination of chemical ripening or before coating.

The light-sensitive material of this invention is suitable for a high speed processing, and excellent photographs can be obtained without causing the problems mentioned above even when used, for example, in the ultra rapid processing mentioned above.

In a preferred embodiment of this invention, the light-sensitive material of this invention can be processed by an automatic processor having a processing time of 20 to 60 seconds.

Another preferred embodiment is to use a silver halide photographic emulsion comprising a silver halide grain substantially comprising silver iodobromide and having multi-layer structure, and to use light-sensitive silver halide grains such that the difference in average iodide contents between any two layers (between coats or between an inner nucleus and a coat) in the multi-layer silver halide grain, which are adjacent to each other and each have uniform iodide distribution, is 10 mole % or less.

It is further preferred that the most surface layer has an average iodide content of 10 mole % or less, and the silver halide grains are chemically sensitized.

The grain having multi-layer structure is a grain provided outside an inner nucleus with a coat that may have any halogen composition. This coat may comprise only one layer or may be laminated to form two or more layers, for example, three layers or four layers, but preferably not more than five layers.

As silver halides in the inner nucleus and the coats, silver bromide, silver iodobromide and silver iodide are used, but they may be a mixture with a small amount of silver chloride. Specifically, the mixture may contain about 10 mole % or less, preferably about 5 mole % or less of silver chloride.

Also, the most surface layer may preferably comprise substantially silver bromide or substantially silver iodobromide (iodide content: 10 % or less), and may contain less than several % of chloride.

The average iodide content in total in the silver halide grains of this invention is preferably 10 mole % or less, more preferably 6 mole % or less.

In, for example, X-ray light-sensitive materials, iodide may sometimes aggravate the problems such as development inhibition and infectious development, and, therefore, it is preferable to make the iodide content not more than a certain level in practical use. In any of the cases, the method according to this invention is effective for decreasing fogging by pressure, and, for such a reason, the total iodide content in all of the grains is preferably 10 mole % or less, more preferably 7 mole % or less, and most preferably 5 mole % or less.

When the inner nucleus comprises silver iodobromide, it is preferably of homogeneous phase of a solid solution.

Here, being "homogeneous" may be more specifically explained as follows.

Namely, it means that, when an analysis by X-ray diffraction is effected on powder of the silver halide grains, the half-width at a peak of area index [200] of silver iodide with use of Cu-K$\beta$ X-rays can read $\Delta 2\theta = 0.30$ (deg) or less. Here, the conditions under which diffractometer is used is such that, assuming the scanning speed of a goniometer as $\omega$(deg/min), the time constant as $\tau$(sec) and the width as r(mm) $\omega\tau/r \leqq 10$.

The halide composition of the inner nucleus may be such that the average iodide content is preferably 40 mole or less, more preferably 0 to 20 mole %.

The difference in the silver iodide content between the two layers adjacent to each other (any two coats, or a coat and an inner nucleus) is preferably not less than 10 mole %, more preferably not less than 20 mole %, and particularly preferably not less than 25 mole %.

The silver iodide content in a coat other than the most surface coat is preferably 10 mole % to 100 mole %.

When the silver halide grain comprises 3 or more layers and the coats comprise silver iodobromide, they may not necessarily be all homogeneous, but it is preferable for all layers to comprise homogeneous silver iodobromide.

Such coats (or inner nucleus) having a high iodide content are preferably present below the most surface layer in the case of a negative type silver halide emulsion. In the case of a positive type silver halide emulsion, they may be present either in the inside or at the surface.

The silver iodide content in the most surface coat is preferably not more than 10 mole %, more preferably 0 to 5 mole %.

The iodide content in the inner nucleus and the coats of the silver halide grain used in working this invention can be also determined according to the method disclosed in J. I. Goldstein and D. B. Williams, "X-ray Analysis in TEM/ATEM", Scanning Electron Microscopy (1977), Vol. 1, (I.I.T. Research Institute), p.651 (March, 1977).

When the silver halide grain used in working this invention comprises, for example, two layers, the inner nucleus may preferably have a higher iodide content than the most surface layer, and, when it comprises three layers, the coats other than the most surface layer or the inner nucleus may preferably have a higher iodide content than the most surface layer.

This invention can be preferably applied in respect of silver halide grains chemically sensitized. This is because unsensitized grains may be very poor in the sensitivity itself, and neither abrasion blackening nor pressure desensitization may tend to occur in the first place.

The silver halide grains used in this invention may be of positive type or of negative type.

In the case of negative type, chemical sensitization is carried out preferably to such a degree that may give 60 % or more of the optimum sensitization degree when taking a sensitivity point of "fog+0.1" in the optical density.

In the case of positive type, chemical sensitization is applied in the inside of grains preferably to such a degree that may give 60 % or more of the optimum sensitization degree when taking a sensitivity point of "fog −0.1" in the optical density.

As the silver halide grains used in this invention, there can be further used a combination of internal fog type silver halide grains with surface latent image type silver halide grains as disclosed in Japanese Patent Publication No. 2068/1966.

Average grain size of the silver halide grains used in this invention is expressed in terms of an average value of the grain size determined by assuming as grain size the edge length to be found when converted into a cube having an equivalent volume.

In this invention, there may be included an embodiment wherein the silver halide emulsion grains used in the silver halide emulsion layers have an average grain size preferably of 0.30 to 1.50 μm, more preferably 0.40 to 1.30 μm, and most preferably 0.40 to 1.10 μm.

Grain size distribution of the grains used may be either narrow or wide.

Also, the silver halide grains contained in the photographic emulsion may have any grain size distribution, but may be of monodispersed one. Here, the term "monodispersed" contemplates a dispersed system wherein 95 % of the grains is included in ±60 %, preferably in ±40 %, of the number average grain size. Here, the number average grain size refers to the number average diameter of projected area size of silver halide grains.

The silver halide grains in the photographic emulsion may have a regular crystal form such as a cube, an octahedron, a tetradecahedron and a dodecahedron, or may have an irregular crystal form such as a sphere and a plate, or may have a composite form of these crystal forms. The grains may comprise grains of various crystal forms.

Also available are, for example, junction type silver halide crystals formed by combining crystals of oxides such as PbO with crystals of silver halides such as silver chloride, silver halide crystals formed by epitaxial growth (for example, silver chloride, silver iodobromide, silver iodide, etc. are epitaxially grown on silver bromide), hexagonal crystals, crystals formed by epitaxy of regular hexahedral silver chloride on regular octahedral silver iodide.

There may be also used an emulsion such that silver halide grains comprising an ultra flat plate having diameter 5 times or more of its thickness account for 50 % or more of the total projection area. Details thereof are disclosed in the specifications of Japanese Unexamined Patent Publications No. 127921/1983, No. 113927/1983, etc.

The regular grains mentioned above refer to a silver halide emulsion wherein at least 80 % of the weight or number of silver halide grains are comprised of grains having a regular form. Also, the silver halide grains which are regular in the structure or form refer to grains all of which may isotropically grow without including any anisotropical growth of twin crystal face or the like, and have the shape of, for example, a cube, a tetradecahedron, a regular octahedron, a dodecahedron, a sphere, etc. Method for the production of such regular silver halide grains is disclosed in Journal of Photographic Science, 5, 332 (1961), Berchte der Bunsenges Physik Chemi, 67, 949 (1963), International Congress of Photographic Science of Tokyo (1967), etc. Such regular silver halide grains can be obtained by controlling reaction conditions for allowing silver halide grains to grow with use of a simultaneous mixing method. In such a simultaneous mixing method, silver halide grains can be obtained by adding to an aqueous solution of protective colloid a silver nitrate solution and a halide solution each in a substantially equimolar amount and with vigorous stirring.

In working this invention, when incorporating, for example, the regular silver halide grains as mentioned above, it is also possible to incorporate irregular silver halide grains. However, when such grains are present, it is better for them not to be generally about 50 % or more in terms of weight or grain number. In a preferred embodiment, an emulsion should comprise at least about 60 to 70% by weight of the regular silver halide grains.

When producing the monodispersed emulsion and/or the emulsion having the regular silver halide grains, silver ions and halide ions may be fed preferably by gradually increasing in a continuous manner or in a stepwise manner the growth rate at a critical growth rate, or within a tolerance scope thereof, for feeding the silver halide necessary and sufficient for the growth owing to existing grains only, without dissolving out the existing crystal grains, and without generation or growth of new grains on the contrary, accompanying with the growth of the crystal grains. The method of gradual increasing is disclosed in Japanese Patent Publications No. 36890/1973 and No. 16364/1977, and Japanese Unexamined Patent Publication No. 142329/1980.

In other words, silver ions and halide ions are effectively fed at such a feed rate that the rate of growth of silver halide grains is 30 to 100 % of the critical growth rate.

This critical growth rate may vary depending on the temperature, the pH, the pAg, the degree of stirring, the composition of silver halide grains, the solubility, the grain size, the distance between grains, the crystal form, the kind and density of protective colloid, etc., but can be readily determined by an experimental approach according to the methods such as microscopic observation of emulsion grains suspended in a liquid phase, measurement of turbidity, etc.

In working this invention, the silver halide grains used in the silver halide emulsion can be produced by applying a neutral method, an acidic method, an ammonia method, a regular mixing method, a reverse mixing method, a double jet method, a controlled double jet method, a conversion method, a core/shell method, etc. as disclosed in publications, for example, of T. H. James, The Theory of the Photographic Process, 4th Ed., published by Macmillan Publishing Co., Inc. (1977); P. Glafkides, Chemie et Physique Photographigue, published by Paul Montel Co., 1967; G. F. Duffin, Photographic Emulsion Chemistry, published by The Focal Press, 1966; V. L. Zelikman et al, Making and Coating Photographic Emulsion, published by The Forcal Press, 1964; etc.

As an alternative system of the double jet method, there can be also used a triple jet method in which soluble halogen salts having different composition (for example, a soluble silver salt, a soluble bromine salt and a soluble iodine salt) are each independently added.

It is also possible to use a method in which grains are formed in the presence of excess silver ions (the so-called reverse mixing method). As one system of the simultaneous mixing method, it is also possible to use a method wherein the pAg is kept constant in a liquid phase in which silver halide are formed, namely, the so-called controlled double jet method.

According to this method, it is possible to obtain a silver halide emulsion having regular crystal form and substantially uniform grain size.

In forming silver halide grains, a silver halide solvent, for example, ammonia, potassium thiocyanate, ammonium thiocyanate, thioether compounds (see, for example, U.S. Pat. Nos. 3,271,157, 3,574,628, 3,704,130, 4,297,439, 4,276,374, etc.), thion compounds (see, for example, Japanese Unexamined Patent Publications No. 144319/1978, No. 82408/1978, No. 77737/1980, etc.) and amine compounds (see, for example, Japanese Unexamined Patent Publication No. 100717/1979) can be used in order to control the growth of grains. Among them, ammonia is preferred.

Two kinds or more of silver halide emulsions separately produced may be also used by mixing them.

These silver halide grains or the silver halide emulsion may preferably contain at least one of salts (soluble salts) of iridium, thallium, palladium, rhodium, zinc, nickel, cobalt, uranium, thorium, strontium, tungsten and platinum. It may be contained preferably in an amount of $10^{-6}$ to $10^{-1}$ mole per mole of silver. It is particularly preferable to contain at least one of salts of thallium, palladium and iridium. These may be used alone or in combination, and any position (or time) of addition may be selected. Thus, there can be expected the effects such as improvement in flash light exposure performance, prevention of pressure desensitization, prevention of latent image fading, sensitization, and others.

In working this invention, preferably employable is an embodiment in which a mother liquor containing protective colloids is kept to have the pAg of at least 10.5 or more in the course of the grain growth effected before the chemical sensitization mentioned above. Particularly preferably, the grains should be allowed to pass at least once through an atmosphere of pAg 11.5 or more containing very excessive bromide ions. In this manner, (111) face is increased and grains are rounded, whereby the effect of this invention can be increased. Such (111) face of a grain may preferably account for 5% or more in the proportion to the total surface area thereof.

In such a case, the rate of increase in (111) face (the rate of increase relative to the grain having not yet been allowed to pass the above-mentioned atmosphere of pAg 10.5 or more) is preferably made to be not less than 10%, more preferably 10 to 20%.

As to which of (111) face or (100) face covers the outer surface of a silver halide grain, or as to how to measure the ratio therebetween, there is a disclosure by Akira Hirata in "Bulletin of the Society of Scientific Photography of Japan", No. 13, pp. 5-15 (1963).

In the course of the grain growth effected before chemical sensitization, grains may be allowed to pass once through the atmosphere where a mother liquor containing protective colloids is kept to have the pAg of at least 10.5 or more, whereby it can be readily confirmed according to Hirata's measurement method to see whether the (111) face is increased to 5% or more.

In this case, the mother liquor may be made to have the above pAg preferably at the time after having added about $\frac{2}{3}$ of the total amount of silver and before taking a step of the so-called desalting which is generally carried out before the chemical sensitization. This is because a monodispersed emulsion having wide grain size distribution can be readily obtained by doing so.

Additionally speaking, the ripening in the atmosphere of pAg 10.5 or more is preferably effected for 2 minutes or more.

By controlling the pAg in this manner, the (111) face can be increased to 5% or more and the grain can have roundish shape, whereby a preferable grain having 5% or more of (111) face, relative to the total surface area of the grain, can be obtained.

In order to remove soluble salts from an emulsion after the formation of precipitates or after physical ripening, a noodle washing method which is carried out by gelation of gelatin may be used, or a sedimentation method (or a flocculation method) utilizing inorganic salts, anionic surface active agents, anionic polymers (for example, polystyrene sulfonic acid) or gelatin derivatives (for example, acylated gelatin, carbamoylated gelatin, etc.) may also be used. The step of removing soluble salts may be omitted.

The silver halide emulsion may be, or may not be, chemically sensitized, but may preferably be chemically sensitized. For the purpose of chemical sensitization, the method disclosed in H. Frieser, Die Grundlagen der Photo-graphischen Prozesse mit Silberhalogeniden, Akademische Verlagaesellschaft, 1968, pp. 675-734 can be employed.

More specifically, there can be employed alone or in combination a sulfur sensitization method using an active gelatin or a sulfur-containing compound capable of reacting with silver (for example, thiosulfate, thioureas, mercapto compounds, rhodanines); a reduction sensitization method using a reducible substance (for example, a silver-tin salt, amines, hydrazine derivatives, formamidinesulfinic acid, silane compounds); and a noble metal sensitization method using a noble metal compound (for example, gold complex salts, as well as complex salts of Group VIII metals in the periodic table such as Pt, Ir, Pd, etc.).

Specific examples thereof are disclosed in U.S. Pat. Nos. 1,574,944, 3,410,689, 2,278,947, 2,728,668, 3,656,955, etc. in respect of the sulfur sensitization method; U.S. Pat. Nos. 2,983,609, 2,419,974, 4,054,458, etc. in respect of the reduction sensitization method; and U.S. Pat. Nos. 2,599,083 and 2,448,060, British Pat. No. 618,061, etc. in respect of the noble metal sensitization method.

The photographic emulsion used in this invention may be spectrally sensitized by use of a methine dye or the like. The dye usable may include cyanine dyes, merocyanine dyes, composite cyanine dyes, composite merocyanine dyes, holopolarcyanine dyes, hemicyanine dyes, styryl dyes and hemioxonol dyes. Particularly useful dyes are dyes belonging to cyanine dyes, merocyanine dyes and composite merocyanine dyes. In these dyes, any nuclei usually utilized in cyanine dyes as basic heterocyclic ring nuclei can be used. Namely, there can be used a pyrroline nucleus, an oxazoline nucleus, a thiazoline nucleus, a pyrol nucleus, an oxazole nucleus, a thiazole nucleus, a selenazole nucleus, an imidazole nucleus, a tetrazole nucleus, a pyridine nucleus, etc.; a nucleus wherein an aliphatic hydrocarbon nucleus is fused with any of the above nuclei; and a nucleus wherein an aromatic hydrocarbon is fused with any of the above nuclei, namely, an indolenine nucleus, a benzindolenine nucleus, an indole nucleus, a benzoxazole nucleus, a naphthoxazole nucleus, a benzothiazole nucleus, a naphthothiazole nucleus, a benzoselenazole nucleus, a benzimidazole nucleus, a quinoline nucleus, etc. These nuclei may be substituted on a carbon atom.

In the merocyanine dyes or the composite merocyanine dyes, 5- or 6-membered heterocyclic ring nuclei such as a pyrazolin-5-on nucleus, a thiohydantoin nucleus, a 2-thiooxazolidine-2,4-dion nucleus, a thiazolidine-2,4-dion nucleus, a rhodanine nucleus and a thiobarbituric acid nucleus can be used as nuclei having ketomethylene structure.

Specific examples of spectral sensitizing dyes are disclosed in, for example, P. Glafkides, "Chemie Photographique", 2nd Ed., 1957; Paul Montel, Paris, Articles 35 to 41; F. M. Hamer, "The Cyanine and Related Compounds", Interscience; and U.S. Pat. Nos. 2,503,776, 3,459,553 and 3,117,210, Research Disclosure Vol. 176, 17643, published December, 1978, Paragraph 23-IV-J, etc.

Sensitizing dyes may be used alone or may be used in combination, and a combination of sensitizing dye is frequently used particularly for the purpose of supersensitization.

Typical examples thereof are disclosed in U.S. Pat. Nos. 2,688,543, 2,977,229, 3,397,060, 3,322,052, 3,327,601, 3,617,293, 3,636,960, 3,666,450, 3,272,898, 3,679,428, 3,703,377, 3,769,301, 3,814,609, 3,537,562 and 4,026,707, British Pat. Nos. 1,344,281 and 1,207,503, Japanese Patent Publication Nos. 4536/1970 and 12373/1978, Japanese Unexamined Patent Publication Nos. 110615/1978 and 109923/1978, etc.

When the sensitizing dye is used in this invention, it can be used in the concentration same as used in ordinary negative type silver halide emulsions. It is particularly advantageously used in the dye concentration of a level that may not substantially lower the sensitivity inherent in a silver halide emulsion. The sensitizing dye may be preferably used in the concentration of about $1.0\times10^{-5}$ to about $5.0\times10^{-4}$ mole per mole of silver halide, particularly about $4.0\times10^{-5}$ to about $2.0\times10^{-4}$ mole per mole of silver halide.

Together with the sensitizing dye, the emulsion may contain a dye having itself no action of spectral sensitization, or a substance substantially absorbing no visible light and showing supersensitization.

For example, it may contain an aminostilbene compound (for example, the compounds disclosed in U.S. Pat. Nos. 3,533,590 and 3,638,721), an aromatic organic acid/formaldehyde condensate (for example, the compounds disclosed in U.S. Pat. No. 3,743,510), a cadmium salt, an azaindene compound. Particularly effective are the combinations disclosed in U.S. Pat. Nos. 3,615,615, 3,615,641, 3,617,295 and 3,635,921.

The photographic emulsion used in this invention may contain various compounds for the purpose of preventing fog during the production, storage or photographic processing of light-sensitive materials, or making photographic performances stable. That is, there can be added a variety of compounds known as antifoggants or stabilizers, including thiazoles, for example, benzothiazolium salts, nitroimidazoles, nitrobenzimidazoles, chlorobenzimidazoles, bromobenzimidazsoles, mercaptothiazoles, mercaptobenzothiazoles, mercaptobenzimidazoles, mercaptothiadiazoles, aminotriazoles, benzotriazoles, nitrobenzotriazoles, mercaptotetrazoles (in particular, 1-phenyl-5-mercaptotetrazole), etc.; mercaptopyrimidines; mercaptotriazines; thioketo compounds such as oxazoline thion; azaindenes, for example, triazaindenes, tetrazaindenes (in particular, 4-hydroxy substituted (1,3,3a,7)tetrazaindenes), pentazaindenes, etc.; benzenethiosulfonic acid, benzenesulfinic acid, benzenesulfonic acid amide, etc.

Details may be available by making reference to E. J. Birr, "Stabilization of Photographic Silver Halide Emulsions", Focal Press, 1974, etc.

Usable compounds may include, for example, thiazolium salts disclosed in U.S. Pat. Nos. 2,131,038, 2,694,716, etc.; azaindenes disclosed in U.S. Pat. Nos. 2,886,437, 2,444,605, etc.; urazoles disclosed in U.S. Pat. No. 3,287,135; sulfocatechols disclosed in U.S Pat. No. 3,236,632; oxymes disclosed in British Pat. No. 623,448; mercaptotetrazoles disclosed in U.S. Pat. Nos. 2,403,927, 3,266,897, 3,397,987, etc; nitron; nitroindazoles; polyvalent metal salts disclosed in U.S. Pat. No. 2,839,403, etc.; thiuronium salts disclosed in U.S. Pat. No. 3,220,839, etc.; salts of palladium, platinum or gold disclosed in U.S. Pat. Nos. 2,566,263, 2,597,715, etc.

The light-sensitive material of this invention may contain a water soluble dye as a filter dye or for the purposes of preventing irradiation and halation and for any other various purposes. Such a dye may include oxonol dyes, hemioxonol dyes, styryl dyes, merocyanine dyes, cyanine dyes and azo dyes. Among them, useful are oxonol dyes, hemioxonol dyes and merocyanine dyes.

In the light-sensitive material of this invention, when a dye or an ultraviolet absorbent is contained in a hydrophilic colloid layer, they may be mordanted by use of a cationic polymer or the like.

Such a dye to be used may include the compounds disclosed in the paragraph of Absorbing and Filter Dyes in Research Disclosure Vol. 176, pp. 23–26.

For the purpose of increasing sensitivity, increasing contrast or accelerating development, the photographic emulsion layers of the light-sensitive photographic material of this invention may contain, for example, polyalkylene oxides, derivatives thereof such as ether, ester and amine thereof, thioether compounds, thiomorpholines, quaternary ammonium chloride compounds, urethane derivatives, urea derivatives, imidazole derivatives, 3-pyrazolidones, etc.

It is advantageous to use gelatin as a binding material or a protective colloid which can be used in emulsion layers or intermediate layers of the light-sensitive material of this invention. However, it is also possible to use other hydrophilic colloid alone or in combination with gelatin.

When gelatin is used in working this invention, the gelatin may be either lime-treated or treated with use of an acid. Details of the method for producing gelatin are disclosed in Arther Davis, The Macromolecular Chemistry of Gelatin, Academic Press, published 1964).

The above usable hydrophilic colloid may include, for example, proteins such as gelatin derivatives, graft polymers of gelatin with other macromolecules, albumin and casein; cellulose derivatives such as hydroxyethyl cellulose, carboxymethyl cellulose and cellulose sulfuric acid esters; sugar derivatives such as sodium alginate and starch derivatives; and various synthetic hydrophilic macromolecular substances such as homopolymers or copolymers of polyvinyl alcohol, polyvinyl alcohol partial acetal, poly-N-vinyl pyrrolidone, polyacrylic acid, polymethacrylic acid, polyacrylamide, polyvinyl imidazole or polyvinyl pyrazole.

In the light-sensitive photographic material of this invention, the photographic emulsion layers and other hydrophilic colloid layers may contain an inorganic or organic hardening agent. For example, there can be used, alone or in combination, chromium salts (such as chrome alum and chromium acetate), aldehydes (such as formaldehyde, glyoxal and glutalaldehyde), N-methylol compounds (such as dimethylol urea and methyloldimethylhydantoin), dioxane derivatives (such as 2,3-dihydroxydioxane), active vinyl compounds (such as 1,3,5-triacryloyl-hexahydro-2-triazine and 1,3-vinylsulfonyl-2-propanol), active halogen compounds (such as 2,4-dichloro-6-hydroxy-3-triazine), mucohalogen acids (such as mucochloric acid and mucophenoxychloric acid), etc.

In the light-sensitive photographic material of this invention, the photographic emulsion layers and other hydrophilic colloid layers may contain a dispersed product of a water soluble or slightly soluble synthetic polymer for the purpose of improving the dimensional stability. For example, there can be used, solely or in combination, alkyl acrylates or methacrylates, alkoxyalkyl acrylates or methacrylates, glycidyl acrylates or methacrylates, acryl or methacrylamide, vinyl esters (for example, vinyl acetate), acrylonitriles, olefins, styrenes, etc. or polymers having monomer components comprising the combination of these with acrylic acid, methacrylic acid, $\alpha,\beta$-unsaturated dicarboxylic acid, hydroxyalkyl acrylates or methacrylates, sulfoalkyl acrylates or methacrylates, styrenesulfonic acid, etc.

A protective layer is preferably used in the light-sensitive silver halide photographic material of this invention. The protective layer is a layer comprising a hydrophilic colloid, and, as the hydrophilic colloid to be used, there can be used those mentioned before. Also, the protective layer may comprise either a single layer or overlapped layers.

A matte agent and/or a smoothing agent or the like may be added to the emulsion layers or the protective layer, preferably to the protective layers, of the light-sensitive silver halide photographic material of this invention. Examples of the matte agent preferably used may include organic compounds such as water dispersible vinyl polymers including polymethyl methacrylate having suitable grain size (preferably, grain size of 0.3 to 5 $\mu$m, or twice or more, particularly four times or more, of the thickness of a protective layer), or inorganic compounds such as silver halide and strontium or barium sulfate. The smoothing agent is useful for preventing an adhesion trouble as being similar to the matte agent, and also effective for improving the friction characteristics having a relation to the adaptability to cameras when taking photographs of motion picture films or projecting motion pictures. Specific examples thereof that can be preferably used may include waxes such as liquid paraffin and higher aliphatic acid esters; polyfluorinated hydrocarbons or derivatives thereof; and silicones such as polyalkyl polysiloxane, polyaryl polysiloxane, polyalkylaryl polysiloxane or alkylene oxide addition derivatives of these.

If necessary, other additives can be used in the light-sensitive photographic material of this invention. For example, they include a dye, a development accelerator, a brightening agent, a color fog preventive agent, an ultraviolet absorbent, etc. Specifically, there can be used those disclosed in Research Disclosure No. 176, pp. 22–31 (RD-17643, 1978).

In addition, if necessary, the light-sensitive silver halide photographic material of this invention can be provided with an antihalation layer, an intermediate layer, a filter layer and the like.

In the light-sensitive photographic material of this invention, the photographic emulsion layers or other layers are applied to one side or both sides of a flexible support usually used in light-sensitive materials to embody a product. Useful as the flexible support are films comprising semisynthesized or synthesized macromolecules such as cellulose nitrate, cellulose acetate, cellulose acetate butylate, polystyrene, polyvinyl chloride, polyethylene terephthalate, polycarbonate, etc.; paper coated or laminated with a baryta layer or an $\alpha$-olefin polymer (for example, polyethylene, polypropylene, an ethylene/butene copolymer), etc. The support may be colored by using a dye or a pigment. It may be made black for the purpose of light interception. The surface of these supports are, in general, subbing-treated in order to improve the adhesion with a photographic emulsion. The surface of the support may be applied with corona discharge, ultraviolet irradiation, flame treatment, etc. before or after the subbing treatment. Entering into details, those disclosed in the paragraph of "Supports" in Research Disclosure, Vol. 176, p. 25 may be used.

In the light-sensitive photographic material of this invention, the photographic emulsion layers or other hydrophilic colloid layers can be applied on a support or other layers according to various coating methods. In coating, a dip coating method, a roller coating method, a curtain coating method, an extrusion coating method, etc. can be employed. Entering into details, the method disclosed in the paragraph of "Coating Procedures" in Research Disclosure, Vol. 176, pp. 27–28.

The light-sensitive silver halide photographic material of this invention can be used specifically in X-ray light-sensitive materials, lithographic light-sensitive materials, black and white photographing light-sensitive materials, color negative light-sensitive materials, color reversal light-sensitive materials, color photographic paper, a colloid transfer process, a silver salt diffusion transfer process, a dye transfer process, a silver dye bleaching method, print-out sensitive materials, heat development sensitive materials, and so forth.

Exposure for obtaining a photographic image may be carried out by using conventional methods. Namely, there can be used any of various kinds of light sources containing ultraviolet light, including natural light (sunlight), a tungsten lamp, a fluorescent lamp, a mercury lamp, a xenon arc lamp, a carbon arc lamp, a xenon flash lamp, a cathode ray tube flying spot, a light-emitting diode, laser beams (for example, of a gas laser, a YAG laser, a dye laser, a semiconductor laser, etc.). Also, exposure may be carried out by use of light emitted from phosphors excited by electron rays, X-rays, gamma rays, alpha rays, etc. Exposure may be carried out in the exposure time of 1/1000 second to 1 second used in oordinary cameras, as well as in exposure time shorter than 1/1000 second, for example, exposure time of $1/10^4$ to $1/10^6$ second using a xenon flash lamp or a cathode ray tube, or exposure longer than 1 second may also be used. If necessary, spectral composition of light used in exposure can be controlled by using a color filter.

Any of the various methods and various processing solutions as disclosed in, for example, Research Disclosure No. 176, pp. 25–30 (RD-17643) can be used in the photographic processing of the light-sensitive material of this invention. This photographic processing may be either photographic processing for the formation of silver images (i.e., black and white photographic processing) or photographic processing for the formation of color images (i.e., color photographic processing). The processing temperature may be selected in the range between 18° C. to 50° C. in usual cases, but may be made lower than 18° C. or higher than 50° C.

Other various development methods (for example, heat development, etc.) can be used as occasion demands.

A developing solution to be used when, for example, carrying out a black and white processing may contain known developing agents. There can be used as the developing agents, solely or in combination, dihydroxybenzenes (for example, hydroquinone), 3-pyrazolidones (for example, 1-phenyl-3-pyrazolidone), aminophenols (for example, N-methyl-n-aminophenol), etc. In general, besides these, the developing solution may contain a preservative, an alkali agent, a pH buffering agent, an antifoggant, etc., and may further contain, if necessary, a dissolution auxiliary, a color toning agent, a development accelerator, a surface active agent, an antifoaming agent, a hard water-softening agent, a hardening agent, a viscosity-imparting agent, etc.

As a special developing processing system, there may be employed a method in which a development agent is incorporated in a light-sensitive material, for example, in emulsion layers, and the light-sensitive material is processed in an aqueous alkali solution to carry out the development. Of the development agent, a hydrophobic development agent can be incorporated in the emulsion layers according to various methods as disclosed in Research Disclosure No. 169 (RD-16928), U.S. Pat. No. 2,739,890, British Pat. No. 813,253 and West German Pat. No. 15 47 763. Such a developing processing may be combined with a silver salt stabilizing processing carried out by using thiocyanate.

As a fixing solution, those having the formulation generally employed can be used. As a fixing agent, there can be used thiosulfate and thiocyanate, as well as organic sulfur compounds known to be effective as fixing agents. The fixing solution may contain a water soluble aluminum salt as a hardening agent.

The photographic emulsion layer of the light-sensitive photographic material of the present invention may contain a color image-forming coupler, i.e., a compound capable of forming a dye by reacting with an oxidized product of an aromatic primary amine (for example, phenylenediamine derivative or aminophenol derivative) developing agent in color developing processing. For example, as a magenta coupler, there may be included 5-pyrazolone couplers, pyrazolobenzimidazole couplers, cyanoacetylcumarone couplers, open chain acylacetonitrile couplers, etc.; as a yellow coupler, acylacetamide couplers (for example, benzoylacetanilides and pivaloylacetanirides); and as a cyan coupler, naphthol coupler, phenol coupler, etc.

These couplers are preferably non-diffusible couplers having a hydrophobic group called a ballast group in molecules. The couplers may be either of four equivalent type or two equivalent type relative to silver ion. There may be also included colored couplers having the color correcting effect or couplers capable of releasing a development restrainer as the development proceeds (the so-called DIR couplers).

Besides the DIR couplers, there may be included colorless DIR coupling compounds that may form a colorless product by the coupling reaction and release a development restrainer.

The light-sensitive silver halide photographic material of this invention may contain a color fog preventive agent including hydroquinone derivatives, aminophenol derivatives, gallic acid derivatives, ascorbic acid derivatives, etc.

The light-sensitive silver halide photographic material of this invention may contain an ultraviolet absorbent in the hydrophilic colloid layer. For example, there can be used benzotriazole compounds substituted with an aryl group (for example, those disclosed in U.S. Pat. No. 3,533,794), 4-thiazolidone compounds (for example, those disclosed in U.S. Pat. Nos. 3,314,794 and 3,352,651), benzophenone compounds (for example, those disclosed in Japanese Unexamined Patent Publication No. 2784/1971), cinnamic acid ester compounds (for example, those disclosed in U.S. Pat. Nos. 3,705,805 and 3,705,375), butadiene compounds (for example, those disclosed in U.S. Pat. No. 4,045,229), or benzooxydole compounds (for example, those disclosed in U.S. Pat. No. 3,700,455). Those disclosed in U.S. Pat. No. 3,499,762 and Japanese Unexamined Patent Publication No. 48534/1979 can be further used. Couplers having ultraviolet absorbing properties (for example, cyan dye-forming couplers of $\alpha$-naphthol type) or polymers having ultraviolet absorbing properties may be also used.

These ultraviolet absorbents may be mordanted in a particular layer.

In working this invention, a variety of anti-color-fading agents shown below can be used in combination, and color image stabilizers used in this invention can be used alone or in combination of two or more of them. The anti-color-fading agents may include hydroquinone derivatives, gallic acid derivatives, p-alkoxyphenols, p-oxyphenol derivative, bisphenols, etc.

In general, a color developing solution may comprise an alkaline aqueous solution containing a color development agent. The color developing agent that can be used may include various primary aromatic amine developing agents such as phenylenediamines (for example, 4-amino-N,N-diethylamine, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfoamide ethylaniline, 4-amino-3-methyl-N-ethyl-N-β-methoxyethylaniline, etc.).

Besides these, those disclosed in L. F. A. Mason, Photographic Processing Chemistry, Focal Press (1966), pp. 226–229, U.S. Pat. Nos. 2,193,015 and 2,592,364, Japanese Unexamined Patent Publication No. 64933/1973, etc.

The color developing solution may further contain a pH buffering agent such as sulfite of alkali metals, carbonate, borate and phosphate, a development restrainer or antifoggant such as bromide, iodide and organic antifoggants, and so forth. If necessary, it may also contain a hard water softening agent, a preservative such as hydroxylamine, an organic solvent such as benzyl alcohol and diethylene glycol, a development accelerator such as polyethylene glycol, quaternary ammonium salts and amines, a color dye-forming coupler, a competing coupler, a fogging agent such as sodium boron hydride, an auxiliary developing agent such as 1-phenyl-3-pyrazolidone, a viscosity imparting agent, a polycarboxylic acid type chelating agent, an antioxidant, etc.

After the color development, the photographic emulsion layers are usually subjected to a bleaching processing. The bleaching processing may be carried out simultaneously with a fixing processing, or may be carried out separately. As a bleaching agent, there may be used polyvalent metal compounds such as iron (III), cobalt (III), chrome (VI) and copper (II), peracids, quinones, nitroso compounds, etc.

For example, there can be used ferricyanide, dichromate, organic complex salts of iron (III) or cobalt (III), for example, complex salts of aminopolycarboxylic acids such as ethylenediaminetetraacetic acid, nitrilotriacetic acid and 1,3-diamino-2-propanoltetraacetic acid, or of organic acids such as citric acid, tartaric acid and malic acid; persulfate; permanganate; nitrosophenol; etc. Of these, particularly useful are potassium ferricyanide, sodium ethylenediaminetetraacetic acid iron (III) and ammonium ethylenediaminetetraacetic acid iron (III). Ethylenediaminetetraacetic acid iron (III) complex salts are useful in both an independent bleaching solution and a combined bleach-fixing solution.

This invention will be described below by Examples. As a mater of course, this invention is by no means limited to these Examples.

EXAMPLE 1

A silver iodobromide emulsion E-1 containing 2.0 mole % of silver iodide was first prepared according to regular mixing by a full ammonia method. This emulsion comprised grains having an average grain size of 1.10 μm. This silver iodobromide emulsion E-1 was subjected to an optimum gold/sulfur sensitization by adding chloroauric acid, sodium thiosulfate and ammonium thiocyanate, and stabilized with use of 4-hydroxy-6-methyl-1,3,3a,7-tetrazaindene.

Both sides of a polyester film support having been subjected to subbing treatment were coated with the above stabilized emulsion and a protective layer to which a hardening agent was added, to provide layers in the order of the silver halide emulsion layer and the protective layer according to a slide hopper method at a coating rate of 100 m/min so that two layers may simultaneously overlap, thereby obtaining Samples No. 1 to No. 28 shown in Table 1 (Table 1-a, -b, -c). Coated silver weight was 55 mg/dm$^2$.

The amount of hardening agent in each of the above samples was controlled to have a melting time of about 25 minutes. Here, the melting time refers to the time by which an emulsion layer begins to melt out after a sample (a light-sensitive silver halide photographic material) cut into 1 cm×2 cm was dipped in an aqueous solution of 1.5% sodium hydroxide kept at 50° C.

Subsequently, the number and extent of coating troubles (such as coating streaks and coating unevenness) in the samples obtained as above were measured and indicated by the five rank system ranging 1 (poor) to 5 (excellent). There is no problem when it shows 3 to 5, but the rank of 1 to 2 means infeasibleness for practical use.

Also, measurement of sensitivity was carried out as follows. That is, a sample was interposed between two optical wedges wherein the density inclination was mirror-symmetrically adjusted, and exposed in equal quantity from both sides for 1/12.5 second with use of a light source of the color temperature of 5,400° K.

Processing was carried out according to the following steps by using an automatic processor of roller conveyor type. Total processing time was 45 seconds.

| | Processing temperature | Processing time |
|---|---|---|
| Insertion | — | 1.2 sec. |
| Developing & passing | 35° C. | 14.6 sec. |
| Fixing & passing | 33° C. | 8.2 sec. |
| Washing & passing | 25° C. | 7.2 sec. |
| Squeegeeing | 40° C. | 5.7 sec. |
| Drying | 45° C. | 8.1 sec. |
| Total | — | 45.0 sec. |

Developing solution and Fixing solution used were XD-90 and XF, respectively (both trade names; produced by Konishiroku Photo Industry Co., Ltd.).

Based on the characteristic curve showing the relationship between log E (a logarithm of exposure amount) and D (optical density), the exposure amount at base density + fog density + 1.0 was obtained to determine the relative sensitivity.

Also, drying characteristics were evaluated as follows. That is, after carrying out the above 45 second automatic processing, touch on the samples having passed through the drying area and degree of sticking to other samples were overall evaluated to indicate by the 5 rank system ranging 1 (poor) to 5 (excellent). There is no problem when it shows 3 to 5, but the rank of 1 to 2 means infeasibleness for practical use. Results obtained are shown together in Table 1 (Table 1-c). At the right end column of the table, a sample according to this invention is indicated as "Yes", and a sample not according thereto as "No".

Part of the samples were processed to obtain the sensitivity in the conventional 90 second processing by dropping to ½ the line speed of the above 45 second automatic processor. Results obtained are shown in Table 2.

As will be clear from Table 1 (Table 1-a, -b, -c) and Table 2, the samples (light-sensitive silver halide photographic materials) of this invention have good coating properties and also excellent sensitivity and drying characteristics, and thus have the feasibility for ultra rapid processing. It is also seen from the comparison with the conventional 90 second processing that the processing time can be shortened to ½ to make twice the processing ability, retaining the sensitivity attained in the conventional system.

TABLE 1

| Sample No. | Silver halide emulsion layer: Gelatin amount per one side ($g/m^2$) | Surface active agent: Type | Surface active agent: Amount per one side ($g/m^2$) | Surface tension (dyn/cm) |
|---|---|---|---|---|
| 1 | 2.20 | 1-10 | $1 \times 10^{-3}$ | 36 |
| 2 | " | " | " | 36 |
| 3 | " | " | " | 36 |
| 4 | 2.00 | " | " | " |
| 5 | " | " | " | " |
| 6 | " | " | " | " |
| 7 | 1.90 | " | $1.5 \times 10^{-3}$ | " |
| 8 | " | " | " | " |
| 9 | " | " | " | " |
| 10 | " | " | " | " |
| 11 | 1.75 | " | $2 \times 10^{-3}$ | 35 |
| 12 | " | " | " | " |
| 13 | " | " | " | " |
| 14 | " | " | " | " |
| 15 | " | " | " | " |
| 16 | 1.70 | " | " | 35 |
| 17 | " | " | " | " |
| 18 | " | " | " | " |
| 19 | " | " | " | " |
| 20 | " | " | " | " |
| 21 | 1.20 | " | $4 \times 10^{-3}$ | 34 |
| 22 | " | " | " | " |
| 23 | " | " | " | " |
| 24 | " | " | " | " |
| 25 | " | " | " | " |
| 26 | 1.10 | " | " | 34 |
| 27 | " | " | " | " |
| 28 | " | " | " | " |

| Sample No. | Protective layer: Gelatin amount per one side ($g/m^2$) | Surface active agent: Type | Surface active agent: Amount per one side ($g/m^2$) | Surface tension (dyn/cm) |
|---|---|---|---|---|
| 1 | 1.15 | 1-10 | $5 \times 10^{-4}$ | 31 |
| 2 | 1.15 | " | $8 \times 10^{-4}$ | 30 |
| 3 | 1.15 | " | $1 \times 10^{-3}$ | 28 |
| 4 | 1.15 | 3-3 | $4 \times 10^{-4}$ | 31 |
| 5 | " | " | $7 \times 10^{-4}$ | 30 |
| 6 | " | " | $1.3 \times 10^{-3}$ | 28 |
| 7 | " | 2-70 | $4 \times 10^{-4}$ | 31 |
| 8 | " | " | $7 \times 10^{-4}$ | 30 |
| 9 | " | " | $1 \times 10^{-3}$ | 28 |
| 10 | " | " | $4 \times 10^{-3}$ | 26 |
| 11 | " | 2-6 | $7 \times 10^{-4}$ | 30 |
| 12 | " | " | $1 \times 10^{-3}$ | 29 |
| 13 | " | " | $3 \times 10^{-3}$ | 27 |
| 14 | " | " | $8 \times 10^{-3}$ | 25 |
| 15 | " | " | $2 \times 10^{-2}$ | 22 |
| 16 | 1.00 | 2-80 | $4 \times 10^{-4}$ | 30 |
| 17 | " | " | $7 \times 10^{-4}$ | 29 |
| 18 | " | " | $2 \times 10^{-3}$ | 27 |

TABLE 1-continued

| | | | | |
|---|---|---|---|---|
| 19 | " | " | $4 \times 10^{-3}$ | 25 |
| 20 | " | " | $1 \times 10^{-2}$ | 22 |
| 21 | " | 2-26 | $6 \times 10^{-4}$ | 29 |
| 22 | " | " | $8 \times 10^{-4}$ | 28 |
| 23 | " | " | $2 \times 10^{-3}$ | 26 |
| 24 | " | " | $4 \times 10^{-3}$ | 24 |
| 25 | " | " | $1 \times 10^{-2}$ | 21 |
| 26 | " | 2-7 | $3 \times 10^{-3}$ | 26 |
| 27 | " | " | $5 \times 10^{-3}$ | 24 |
| 28 | " | " | $2 \times 10^{-2}$ | 19 |

| Sample No. | Total gelatin amount per one side ($g/m^2$) | Diff.* in surface tension (dyn/cm) | Coating trouble | Sensitivity | Drying characteristics | Remarks |
|---|---|---|---|---|---|---|
| 1 | 3.35 | 5 | 5 | 100 | 1 | No |
| 2 | " | 6 | 5 | 100 | 1 | No |
| 3 | " | 8 | 5 | 100 | 1 | No |
| 4 | 3.15 | 5 | 4 | 105 | 2 | No |
| 5 | " | 6 | 5 | 105 | 2 | No |
| 6 | " | 8 | 5 | 105 | 2 | No |
| 7 | 3.05 | 5 | 2 | 110 | 3 | No |
| 8 | " | 6 | 4 | 110 | 3 | Yes |
| 9 | " | 8 | 5 | 110 | 3 | Yes |
| 10 | " | 10 | 5 | 110 | 3 | Yes |
| 11 | 2.90 | 5 | 2 | 120 | 4 | No |
| 12 | " | 6 | 4 | 120 | 4 | Yes |
| 13 | " | 8 | 5 | 120 | 4 | Yes |
| 14 | " | 10 | 5 | 120 | 4 | Yes |
| 15 | " | 13 | 5 | 120 | 4 | Yes |
| 16 | 2.70 | 5 | 1 | 130 | 5 | No |
| 17 | " | 6 | 3 | 130 | 5 | Yes |
| 18 | " | 8 | 4 | 130 | 5 | Yes |
| 19 | " | 10 | 5 | 130 | 5 | Yes |
| 20 | " | 13 | 5 | 130 | 5 | Yes |
| 21 | 2.20 | 5 | 1 | 145 | 5 | No |
| 22 | " | 6 | 3 | 145 | 5 | Yes |
| 23 | " | 8 | 3 | 145 | 5 | Yes |
| 24 | " | 10 | 4 | 145 | 5 | Yes |
| 25 | " | 13 | 5 | 145 | 5 | Yes |
| 26 | 2.10 | 8 | 1 | 150 | 5 | No |
| 27 | " | 10 | 2 | 150 | 5 | No |
| 28 | " | 15 | 2 | 150 | 5 | No |

*Difference (between emulsion layer and protective layer)
Yes: Present invention
No: Not the invention

TABLE 2

| Sample No. | Total gelatin amount per one side ($g/m^2$) | Difference in surface tension (dyn/cm) | Sensitivity: 45 second processing | Sensitivity: 90 second processing |
|---|---|---|---|---|
| 3 | 3.35 | 8 | 100 | 120 |
| 10 | 3.05 | 10 | 110 | 130 |
| 14 | 2.90 | 10 | 120 | 135 |
| 19 | 2.70 | 10 | 130 | 145 |
| 25 | 2.20 | 13 | 145 | 155 |
| 28 | 2.10 | 15 | 150 | 160 |

EXAMPLE 2

Here described are preparation of emulsions E-2 to E-6 containing silver halide grains having multi-layer structure. First, a 3.0N ammoniacal silver nitrate solution and a solution containing 2.0 mole % of potassium iodide and 98.0 mole % of potassium bromide were added according to a double jet method at 45° C. while keeping pAg=11.0 and pH=9.0. The rate of addition was gradually accelerated with growth of grains.

The emulsion obtained was found to be an octahedral monodispersed emulsion comprising grains having an average grain size of 1.05 μm. Further, an ammoniacal silver nitrate solution and a solution of potassium bromide were added according to a double jet method at pAg=11.0 and pH=9.0 to form shells comprising silver bromide alone. The emulsion thus obtained was found to be an octahedral monodispersed emulsion comprising grains having an average grain size of 1.10 μm. This emulsion was designated as E-2.

Subsequently, octahedral silver iodobromide emulsions containing 5 mole %, 10 mole %, 20 mole % and 30 mole % of silver iodide, respectively, were prepared employing substantially the same preparation method as that for E-2, except that the ratio of potassium iodide to potassium bromide was varied, that the core size was varied so as to make uniform the average silver content after the shell formation, and also that the rate of addition at the initial stage of mixing was controlled so as to give the same grain size. Thereafter, the procedures quite same as those for E-2 were taken to prepare corresponding octahedral monodispersed emulsions comprising grains having an average grain size of 1.10 μm, which were designated as E-3, E-4, E-5 and E-6, respectively. Chemical sensitization and coating were carried out on emulsions E-1 to E-6 in the same manner as in Example 1 to obtain samples Nos. 29 to 38 as shown in Table 3 (Table 3-a, -b, -c).

These samples were subjected to the 45 second processing as in Example 1 to determine the sensitivity. Also, abrasion blackening was measured in the following manner: Samples were moisture-conditioned for 4 hours at 23° C. and 55% RH, and, thereafter, scratched with use of a sapphire stylus of 0.3 mil in radius while continuously varying the load, and developed to indicate the abrasion blackening by the load (g) at which the blackening began to occur. The smaller the value is, it means that the weaker the abrasion blackening is.

Results obtained in the above are shown in Table 3 (Table 3-c). As will be clear from Table 3, in the grains having the difference of 10 mole % or more in the iodine content between core and shell, the abrasion blackening is hard to occur and also the sensitivity is excellent as gelatin amount is smaller, when compared with the grains having the difference of less than 10 mole %.

TABLE 3

| | | Silver halide emulsion layer | | | |
|---|---|---|---|---|---|
| | | | Surface active agent | | |
| Sample No. | Emulsion | Gelatin amount per one side ($g/m^2$) | Type | Amount per one side ($g/m^2$) | Surface tension (dyn/cm) |
| 29 | E-2 | 2.20 | 1-10 | $1 \times 10^{-3}$ | 36 |
| 30 | E-3 | " | " | " | " |
| 31 | E-4 | " | " | " | " |
| 32 | E-5 | " | " | " | " |
| 33 | E-6 | " | " | " | " |
| 34 | E-2 | 1.70 | " | $2 \times 10^{-3}$ | 35 |
| 35 | E-3 | " | " | " | " |
| 36 | E-4 | " | " | " | " |
| 37 | E-5 | " | " | " | " |
| 38 | E-6 | " | " | " | " |

| | Protective layer | | | |
|---|---|---|---|---|
| | | Surface active agent | | |
| Sample No. | Gelatin amount per one side ($g/m^2$) | Type | Amount per one side ($g/m^2$) | Surface tension (dyn/cm) |
| 29 | 1.15 | 1-10 | $1 \times 10^{-3}$ | 28 |
| 30 | " | " | " | " |
| 31 | " | " | " | " |
| 32 | " | " | " | " |
| 33 | " | " | " | " |
| 34 | 1.00 | 2-80 | $4 \times 10^{-3}$ | 25 |

TABLE 3-continued

| | | | | |
|---|---|---|---|---|
| 35 | " | " | " | " |
| 36 | " | " | " | " |
| 37 | " | " | " | " |
| 38 | " | " | " | " |

| Sample No. | Total gelatin amount per one side ($g/m^2$) | Diff. in surface tension (between emulsion layer and protective layer (dyn/cm) | Sensitivity | Abrasion blackening (g) |
|---|---|---|---|---|
| 29 | 3.35 | 8 | 110 | 55 |
| 30 | " | " | 110 | 55 |
| 31 | " | " | 115 | 58 |
| 32 | " | " | 120 | 60 |
| 33 | " | " | 125 | 60 |
| 34 | 2.70 | 10 | 140 | 30 |
| 35 | " | " | 140 | 33 |
| 36 | " | " | 150 | 45 |
| 37 | " | " | 155 | 50 |
| 38 | " | " | 160 | 55 |

EXAMPLE 3

Emulsions containing core grains were prepared in the same procedures as those for E-3 to E-6, whereby octahedral silver iodobromide emulsions containing 5 mole %, 10 mole %, 20 mole % and 30 mole % of silver iodide, respectively, were obtained. In the same procedures as those for E-2, except that 2.0 mole % of shell potassium iodide was contained in each of these emulsions, there were prepared corresponding octahedral monodispersed core/shell emulsions comprising grains having an average grain size of 1.10 μm, which were designated as E-7, E-8, E-9 and E-10, respectively.

On these monodispersed emulsions, chemical sensitization and coating were carried out in the same manner as in Example 1 to obtain samples No. 39 to No. 46 as shown in Table 4 (Table 4-a, -b, -c). On these samples, abrasion blackening and sensitivity were determined in the same manner as in Example 2 to obtain results as shown in Table 4 (Table 4-c).

As will be clear from Table 4, in the grains having the difference of 10 mole % or more in the iodine content between core and shell, the abrasion blackening is hard to occur and also the sensitivity is excellent as gelatin amount is smaller, when compared with the grains having the difference of less than 10 mole %.

TABLE 4

| | | Silver halide emulsion layer | | | |
|---|---|---|---|---|---|
| | | | Surface active agent | | |
| Sample No. | Emulsion | Gelatin amount per one side ($g/m^2$) | Type | Amount per one side ($g/m^2$) | Surface tension (dyn/cm) |
| 39 | E-7 | 2.20 | 1-10 | $1 \times 10^{-3}$ | 36 |
| 40 | E-8 | " | " | " | " |
| 41 | E-9 | " | " | " | " |
| 42 | E-10 | " | " | " | " |
| 43 | E-7 | 1.70 | " | $2 \times 10^{-3}$ | 35 |
| 44 | E-8 | " | " | " | " |
| 45 | E-9 | " | " | " | " |
| 46 | E-10 | " | " | " | " |

| | Protective layer | | | |
|---|---|---|---|---|
| | | Surface active agent | | |
| Sample No. | Gelatin amount per one side ($g/m^2$) | Type | Amount per one side ($g/m^2$) | Surface tension (dyn/cm) |
| 39 | 1.15 | 1-10 | $1 \times 10^{-3}$ | 28 |
| 40 | " | " | " | " |
| 41 | " | " | " | " |
| 42 | " | " | " | " |

TABLE 4-continued

| | | | | |
|---|---|---|---|---|
| 43 | 1.00 | 2-80 | $4 \times 10^{-3}$ | 25 |
| 44 | " | " | " | " |
| 45 | " | " | " | " |
| 46 | " | " | " | " |

| Sample No. | Total gelatin amount per one side ($g/m^2$) | Diff. in surface tension (between emulsion layer and protective layer (dyn/cm) | Sensitivity | Abrasion blackening (g) |
|---|---|---|---|---|
| 39 | 3.35 | 8 | 115 | 55 |
| 40 | " | " | 120 | 55 |
| 41 | " | " | 125 | 58 |
| 42 | " | " | 130 | 60 |
| 43 | 2.70 | 10 | 145 | 30 |
| 44 | " | " | 150 | 35 |
| 45 | " | " | 160 | 50 |
| 46 | " | " | 165 | 55 |

EXAMPLE 4

While controlling at 60° C., pAg=8.0 and pH=2.0, a cubic monodispersed emulsion comprising silver iodobromide grains having an average grain size of 0.28 μm and containing 2.5 mole % of silver iodide were prepared according to a double jet method. Part of this emulsion was used as cores, and allowed to grow in the following manner. That is, to the solutions containing the core grains and gelatin, an ammoniacal silver nitrate solution and a solution containing potassium iodide and potassium bromide were added at 40° C., pAg 8.0 and pH 9.5 according to a double jet method to form a first coat each containing 5 mole %, 10 mole %, 20 mole % or 30 mole % of silver iodide.

Each of the emulsions was treated in the same procedures as those for E-2, except that the pAg was made to be 9.0, to form a second coat comprising silver bromide alone, thereby preparing core/shell emulsions comprising cubic monodispersed silver iodobromide grains having an average grain size of 1.0 μm, which were designated as E-11, E-12, E-13 and E-14, respectively. All of these emulsions were made to have an average silver iodide content of 3.0 mole %.

On these monodispersed emulsions, chemical sensitization and coating were carried out in the same manner as in Example 1 to obtain samples No. 47 to No. 54 as shown in Table 5 (Table 5-a, -b, -c). On these samples, abrasion blackening and sensitivity were determined in the same manner as in Example 2 to obtain results as shown in Table 5 (Table 5-c).

As will be clear from Table 5 (Table 5-a, -b, -c), in the grains having the difference of 10 mole % or more in the iodine content between core and shell, the abrasion blackening is hard to occur and also the sensitivity is excellent as gelatin amount is smaller, when compared with the grains having the difference of less than 10 mole %.

TABLE 5

| | | Silver halide emulsion layer | | | |
|---|---|---|---|---|---|
| | | | Surface active agent | | |
| Sample No. | Emulsion | Gelatin amount per one side ($g/m^2$) | Type | Amount per one side ($g/m^2$) | Surface tension (dyn/cm) |
| 47 | E-11 | 2.20 | 1-10 | $1 \times 10^{-3}$ | 36 |
| 48 | E-12 | " | " | " | " |
| 49 | E-13 | " | " | " | " |
| 50 | E-14 | " | " | " | " |
| 51 | E-11 | 1.70 | " | $2 \times 10^{-3}$ | 35 |
| 52 | E-12 | " | " | " | " |

TABLE 5-continued

| | | | | | |
|---|---|---|---|---|---|
| 53 | E-13 | " | " | " | " |
| 54 | E-14 | " | " | " | " |

| | Protective layer | | | |
|---|---|---|---|---|
| | | Surface active agent | | |
| Sample No. | Gelatin amount per one side ($g/m^2$) | Type | Amount per one side ($g/m^2$) | Surface tension (dyn/cm) |
| 47 | 1.15 | 1-10 | $1 \times 10^{-3}$ | 28 |
| 48 | " | " | " | " |
| 49 | " | " | " | " |
| 50 | " | " | " | " |
| 51 | 1.00 | 2-80 | $4 \times 10^{-3}$ | 25 |
| 52 | " | " | " | " |
| 53 | " | " | " | " |
| 54 | " | " | " | " |

| Sample No. | Total gelatin amount per one side ($g/m^2$) | Diff. in surface tension (between emulsion layer and protective layer (dyn/cm) | Sensitivity | Abrasion blackening (g) |
|---|---|---|---|---|
| 47 | 3.35 | 8 | 120 | 55 |
| 48 | " | " | 125 | 58 |
| 49 | " | " | 130 | 60 |
| 50 | " | " | 135 | 60 |
| 51 | 2.70 | 10 | 150 | 35 |
| 52 | " | " | 160 | 50 |
| 53 | " | " | 165 | 55 |
| 54 | " | " | 170 | 60 |

EXAMPLE 5

Example 1 was repeated to prepare emulsion E-15, except that the following thickening agents and surface active agents were used. Using this emulsion E-15, chemical sensitization and coating were carried out in the same procedures as in Example 1 to obtain samples No. 55 to No. 110. Subsequently, the experiments were carried out in the same manner as in Example 1. Results are shown in Tables 6 and 7.

Thickening agents:

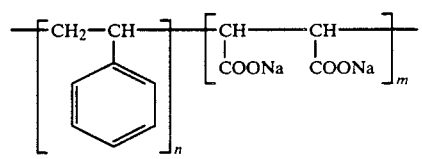

(A)

Colloid silica (Ludox AM, Produced by DuPont) (B)

Surface active agents used were surface active agents 1-10, 2-26, 2-80 and 3-3 of this invention, and the following compounds (1) to (3).

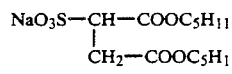

(1)

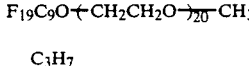

(2)

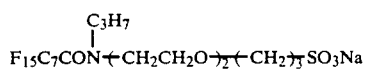

(3)

As will be clear from Table 6 (Table 6-a, -b, -c) and Table 7, the samples (light-sensitive silver halide photographic materials) of this invention have good coating properties and also excellent sensitivity and drying characteristics, and thus have the feasibility for ultra rapid processing. It is also seen from the comparison with the conventional 90 second processing that the processing time can be shortened to ½ to make twice the processing ability, retaining the sensitivity attained in the conventional system. Also, Example 5 was repeated except for employing dextran in place of the compound (A) as a thickening agent of the emulsion layer. The same result as in Example 5 was observed. Further, Example 5 was repeated except for changing the melting time to 20 minutes. The same result of relation was observed.

TABLE 6

| | Silver halide emulsion layer | | | | | Protective layer | | | | |
|---|---|---|---|---|---|---|---|---|---|---|
| Sample No. | Gelatin amount per one side ($g/m^2$) | Type of surface active agent | Surface tension (dyn/cm) | Type of thickening agent | Viscosity (cp) | Gelatin amount per one side ($g/m^2$) | Type of surface active agent | Surface tension (dyn/cm) | Type of thickening agent | Viscosity (cp) |
| 55 | 2.20 | (1) | 36 | (A) | 24 | 1.15 | 1-10 | 30 | (B) | 22 |
| 56 | 2.20 | (1) | 36 | (A) | 10 | 1.15 | 1-10 | 30 | (B) | 10 |
| 57 | 2.20 | (1) | 36 | (A) | 24 | 1.15 | 1-10 | 31 | (B) | 22 |
| 58 | 2.20 | (1) | 36 | (A) | 10 | 1.15 | 1-10 | 31 | (B) | 10 |
| 59 | 2.00 | (1) | 36 | (A) | 24 | 1.15 | 3-3 | 30 | (B) | 22 |
| 60 | 2.00 | (1) | 36 | (A) | 10 | 1.15 | 3-3 | 30 | (B) | 10 |
| 61 | 2.00 | (1) | 36 | (A) | 24 | 1.15 | 3-3 | 31 | (B) | 22 |
| 62 | 2.00 | (1) | 36 | (A) | 20 | 1.15 | 3-3 | 31 | (B) | 20 |
| 63 | 1.90 | (1) | 36 | (A) | 24 | 1.15 | (1) | 30 | (B) | 22 |
| 64 | 1.90 | (1) | 36 | (A) | 20 | 1.15 | (1) | 30 | (B) | 20 |
| 65 | 1.90 | (1) | 36 | (A) | 10 | 1.15 | (1) | 30 | (B) | 12 |
| 66 | 1.90 | (1) | 36 | (A) | 12 | 1.15 | (1) | 30 | (B) | 10 |
| 67 | 1.90 | (1) | 36 | (A) | 24 | 1.15 | (1) | 31 | (B) | 20 |
| 68 | 1.90 | (1) | 36 | (A) | 20 | 1.15 | (1) | 31 | (B) | 20 |
| 69 | 1.90 | (1) | 36 | (A) | 10 | 1.15 | (1) | 31 | (B) | 12 |
| 70 | 1.90 | (1) | 36 | (A) | 12 | 1.15 | (1) | 31 | (B) | 10 |
| 71 | 1.75 | (1) | 35 | (A) | 24 | 1.15 | (2) | 29 | (B) | 22 |
| 72 | 1.75 | (1) | 35 | (A) | 20 | 1.15 | (2) | 29 | (B) | 20 |
| 73 | 1.75 | (1) | 35 | (A) | 10 | 1.15 | (2) | 29 | (B) | 12 |
| 74 | 1.75 | (1) | 35 | (A) | 12 | 1.15 | (2) | 29 | (B) | 10 |
| 75 | 1.75 | (1) | 35 | (A) | 24 | 1.15 | (2) | 30 | (B) | 22 |
| 76 | 1.75 | (1) | 35 | (A) | 20 | 1.15 | (2) | 30 | (B) | 20 |
| 77 | 1.75 | (1) | 35 | (A) | 10 | 1.15 | (2) | 30 | (B) | 12 |
| 78 | 1.75 | (1) | 35 | (A) | 12 | 1.15 | (2) | 30 | (B) | 10 |
| 79 | 1.75 | (1) | 35 | (A) | 24 | 1.15 | (2) | 27 | (B) | 22 |
| 80 | 1.75 | (1) | 35 | (A) | 20 | 1.15 | (2) | 27 | (B) | 20 |
| 81 | 1.75 | (1) | 35 | (A) | 10 | 1.15 | (2) | 27 | (B) | 12 |
| 82 | 1.75 | (1) | 35 | (A) | 12 | 1.15 | (2) | 27 | (B) | 10 |
| 83 | 1.70 | (1) | 35 | (A) | 24 | 1.00 | 2-80 | 29 | (B) | 22 |
| 84 | 1.70 | (1) | 35 | (A) | 20 | 1.00 | " | 29 | (B) | 20 |
| 85 | 1.70 | (1) | 35 | (A) | 10 | 1.00 | " | 29 | (B) | 12 |
| 86 | 1.70 | (1) | 35 | (A) | 12 | 1.00 | " | 29 | (B) | 10 |
| 87 | 1.70 | (1) | 35 | (A) | 24 | 1.00 | " | 30 | (B) | 22 |
| 88 | 1.70 | (1) | 35 | (A) | 20 | 1.00 | " | 30 | (B) | 20 |
| 89 | 1.70 | (1) | 35 | (A) | 10 | 1.00 | " | 30 | (B) | 12 |
| 90 | 1.70 | (1) | 35 | (A) | 12 | 1.00 | " | 30 | (B) | 10 |
| 91 | 1.70 | (1) | 35 | (A) | 24 | 1.00 | " | 27 | (B) | 22 |
| 92 | 1.70 | (1) | 35 | (A) | 20 | 1.00 | " | 27 | (B) | 20 |
| 93 | 1.70 | (1) | 35 | (A) | 10 | 1.00 | " | 27 | (B) | 12 |
| 94 | 1.70 | (1) | 35 | (A) | 12 | 1.00 | " | 27 | (B) | 10 |
| 95 | 1.20 | (1) | 34 | (A) | 24 | 1.00 | 2-26 | 28 | (B) | 22 |
| 96 | 1.20 | (1) | 34 | (A) | 20 | 1.00 | " | 28 | (B) | 20 |
| 97 | 1.20 | (1) | 34 | (A) | 10 | 1.00 | " | 28 | (B) | 12 |
| 98 | 1.20 | (1) | 34 | (A) | 12 | 1.00 | " | 28 | (B) | 10 |
| 99 | 1.20 | (1) | 34 | (A) | 24 | 1.00 | " | 29 | (B) | 22 |
| 100 | 1.20 | (1) | 34 | (A) | 20 | 1.00 | " | 29 | (B) | 20 |
| 101 | 1.20 | (1) | 34 | (A) | 10 | 1.00 | " | 29 | (B) | 12 |
| 102 | 1.20 | (1) | 34 | (A) | 12 | 1.00 | " | 29 | (B) | 10 |
| 103 | 1.20 | (1) | 34 | (A) | 24 | 1.00 | " | 26 | (B) | 22 |
| 104 | 1.20 | (1) | 34 | (A) | 20 | 1.00 | " | 26 | (B) | 20 |
| 105 | 1.20 | (1) | 34 | (A) | 10 | 1.00 | " | 26 | (B) | 12 |
| 106 | 1.20 | (1) | 34 | (A) | 12 | 1.00 | " | 26 | (B) | 10 |
| 107 | 1.10 | (1) | 34 | (A) | 24 | 1.00 | (3) | 28 | (B) | 22 |
| 108 | 1.10 | (1) | 34 | (A) | 10 | 1.00 | " | 28 | (B) | 10 |
| 109 | 1.10 | (1) | 34 | (A) | 24 | 1.00 | " | 26 | (B) | 22 |
| 110 | 1.10 | (1) | 34 | (A) | 10 | 1.00 | " | 26 | (B) | 10 |

| Sample No. | Total gelatin amount/ one side ($g/m^2$) | Diff.* in surface tension (dyn/cm) | Diff.* in viscosity (cp) | Coating trouble | Sensitivity | Drying characteristics | Remarks |
|---|---|---|---|---|---|---|---|
| 55 | 3.35 | 6 | 2 | 5 | 100 | 1 | No |
| 56 | 3.35 | 6 | 0 | 5 | 100 | 1 | No |
| 57 | 3.35 | 5 | 2 | 5 | 100 | 1 | No |
| 58 | 3.35 | 5 | 0 | 5 | 100 | 1 | No |
| 59 | 3.15 | 6 | 2 | 5 | 105 | 2 | No |
| 60 | 3.15 | 6 | 0 | 5 | 105 | 2 | No |
| 61 | 3.15 | 5 | 2 | 4 | 105 | 2 | No |
| 62 | 3.15 | 5 | 0 | 4 | 105 | 2 | No |

TABLE 6-continued

| | | | | | | | |
|---|---|---|---|---|---|---|---|
| 63 | 3.05 | 6 | 2 | 2 | 110 | 3 | No |
| 64 | 3.05 | 6 | 0 | 4 | 110 | 3 | Yes |
| 65 | 3.05 | 6 | −2 | 5 | 110 | 3 | Yes |
| 66 | 3.05 | 6 | 2 | 5 | 110 | 3 | Yes |
| 67 | 3.05 | 5 | 2 | 2 | 110 | 3 | No |
| 68 | 3.05 | 5 | 0 | 2 | 110 | 3 | No |
| 69 | 3.05 | 5 | −2 | 2 | 110 | 3 | No |
| 70 | 3.05 | 5 | 2 | 2 | 110 | 3 | No |
| 71 | 2.90 | 6 | 2 | 2 | 120 | 4 | No |
| 72 | 2.90 | 6 | 0 | 4 | 120 | 4 | Yes |
| 73 | 2.90 | 6 | −2 | 5 | 120 | 4 | Yes |
| 74 | 2.90 | 6 | 2 | 5 | 120 | 4 | Yes |
| 75 | 2.90 | 5 | 2 | 2 | 120 | 4 | No |
| 76 | 2.90 | 5 | 0 | 2 | 120 | 4 | No |
| 77 | 2.90 | 5 | −2 | 2 | 120 | 4 | No |
| 78 | 2.90 | 5 | 2 | 2 | 120 | 4 | No |
| 79 | 2.90 | 8 | 2 | 2 | 120 | 4 | No |
| 80 | 2.90 | 8 | 0 | 4 | 120 | 4 | Yes |
| 81 | 2.90 | 8 | −2 | 5 | 120 | 4 | Yes |
| 82 | 2.90 | 8 | 2 | 5 | 120 | 4 | Yes |
| 83 | 2.70 | 6 | 2 | 2 | 130 | 5 | No |
| 84 | 2.70 | 6 | 0 | 4 | 130 | 5 | Yes |
| 85 | 2.70 | 6 | −2 | 5 | 130 | 5 | Yes |
| 86 | 2.70 | 6 | 2 | 5 | 130 | 5 | Yes |
| 87 | 2.70 | 5 | 2 | 1 | 130 | 5 | No |
| 88 | 2.70 | 5 | 0 | 1 | 130 | 5 | No |
| 89 | 2.70 | 5 | −2 | 1 | 130 | 5 | No |
| 90 | 2.70 | 5 | 2 | 1 | 130 | 5 | No |
| 91 | 2.70 | 8 | 2 | 1 | 130 | 5 | No |
| 92 | 2.70 | 8 | 0 | 4 | 130 | 5 | Yes |
| 93 | 2.70 | 8 | −2 | 5 | 130 | 5 | Yes |
| 94 | 2.70 | 8 | 2 | 5 | 130 | 5 | Yes |
| 95 | 2.20 | 6 | 2 | 2 | 145 | 5 | No |
| 96 | 2.20 | 6 | 0 | 3 | 145 | 5 | Yes |
| 97 | 2.20 | 6 | −2 | 4 | 145 | 5 | Yes |
| 98 | 2.20 | 6 | 2 | 4 | 145 | 5 | Yes |
| 99 | 2.20 | 5 | 2 | 1 | 145 | 5 | No |
| 100 | 2.20 | 5 | 0 | 1 | 145 | 5 | No |
| 101 | 2.20 | 5 | −2 | 1 | 145 | 5 | No |
| 102 | 2.20 | 5 | 2 | 1 | 145 | 5 | No |
| 103 | 2.20 | 8 | 2 | 2 | 145 | 5 | No |
| 104 | 2.20 | 8 | 0 | 3 | 145 | 5 | Yes |
| 105 | 2.20 | 8 | −2 | 4 | 145 | 5 | Yes |
| 106 | 2.20 | 8 | 2 | 4 | 145 | 5 | Yes |
| 107 | 2.10 | 6 | 2 | 1 | 150 | 5 | No |
| 108 | 2.10 | 6 | 0 | 1 | 150 | 5 | No |
| 109 | 2.10 | 8 | 2 | 1 | 150 | 5 | No |
| 110 | 2.10 | 8 | 0 | 1 | 150 | 5 | No |

*Difference (between emulsion layer and protective layer)
Yes: Present invention
No: Not the invention

TABLE 7

| Sample No. | Total gelatin amount per one side ($g/m^2$) | Diff. in surface tension (dyn/cm) | Diff. in viscosity | Sensitivity 45 second processing | Sensitivity 90 second processing |
|---|---|---|---|---|---|
| 56 | 3.35 | 6 | 0 | 100 | 120 |
| 60 | 3.15 | 6 | 0 | 105 | 125 |
| 64 | 3.05 | 6 | 0 | 110 | 130 |
| 72 | 2.90 | 6 | 0 | 120 | 135 |
| 84 | 2.70 | 6 | 0 | 130 | 145 |
| 96 | 2.20 | 6 | 0 | 145 | 155 |
| 106 | 2.10 | 6 | 0 | 150 | 160 |

EXAMPLE 6

Example 2 was repeated to prepare emulsions E-16 to E-20, except that the thickening agents and surface active agents used in Example 5 were used. Chemical sensitization and coating were carried out in the same procedures as in Example 2 to obtain samples No. 111 to No. 120 shown hereinbelow. Experiments were carried out on these samples in the same manner as in Example 2. Results obtained are shown in Table 8 (Table 8-a, -b, -c).

As will be clear from Table 8, in the grains having the difference of 10 mole % or more in the iodine content between core and shell, the abrasion blackening is hard to occur and also the sensitivity is excellent as gelatin amount is smaller, when compared with the grains having the difference of less than 10 mole %.

TABLE 8

| | | Silver halide emulsion layer | | | | | Protective layer | | | | |
|---|---|---|---|---|---|---|---|---|---|---|---|
| Sample No. | Emulsion | Gelatin amount per one side ($g/m^2$) | Type of surface active agent | Surface tension (dyn/cm) | Type of thickening agent | Viscosity (cp) | Gelatin amount per one side ($g/m^2$) | Type of surface active agent | Surface tension (dyn/cm) | Type of thickening agent | Viscosity (cp) |
| 111 | E-16 | 2.20 | (1) | 36 | (A) | 10 | 1.15 | (1) | 30 | (B) | 10 |

TABLE 8-continued

| | | | | | | | | | | | |
|---|---|---|---|---|---|---|---|---|---|---|---|
| 112 | E-17 | 2.20 | (1) | 36 | (A) | 10 | 1.15 | (1) | 30 | (B) | 10 |
| 113 | E-18 | 2.20 | (1) | 36 | (A) | 10 | 1.15 | (1) | 30 | (B) | 10 |
| 114 | E-19 | 2.20 | (1) | 36 | (A) | 10 | 1.15 | (1) | 30 | (B) | 10 |
| 115 | E-20 | 2.20 | (1) | 36 | (A) | 10 | 1.15 | (1) | 30 | (B) | 10 |
| 116 | E-16 | 1.70 | (1) | 35 | (A) | 10 | 1.00 | 2-80 | 27 | (B) | 10 |
| 117 | E-17 | 1.70 | (1) | 35 | (A) | 10 | 1.00 | " | 27 | (B) | 10 |
| 118 | E-18 | 1.70 | (1) | 35 | (A) | 10 | 1.00 | " | 27 | (B) | 10 |
| 119 | E-19 | 1.70 | (1) | 35 | (A) | 10 | 1.00 | " | 27 | (B) | 10 |
| 120 | E-20 | 1.70 | (1) | 35 | (A) | 10 | 1.00 | " | 27 | (B) | 10 |

| Sample No. | Total gelatin amount per one side ($g/m^2$) | Diff.* in surface tension (dyn/cm) | Diff* in viscosity (cp) | Sensitivity | Abrasion blackening (g) |
|---|---|---|---|---|---|
| 111 | 3.35 | 6 | 0 | 110 | 55 |
| 112 | 3.35 | 6 | 0 | 110 | 55 |
| 113 | 3.35 | 6 | 0 | 115 | 58 |
| 114 | 3.35 | 6 | 0 | 120 | 60 |
| 115 | 3.35 | 6 | 0 | 125 | 60 |
| 116 | 2.70 | 8 | 0 | 140 | 30 |
| 117 | 2.70 | 8 | 0 | 140 | 33 |
| 118 | 2.70 | 8 | 0 | 150 | 45 |
| 119 | 2.70 | 8 | 0 | 155 | 50 |
| 120 | 2.70 | 8 | 0 | 160 | 55 |

*Difference (between emulsion layer and protective layer)

EXAMPLE 7

Emulsions containing core grains were prepared in the same procedures as those for E-17 to E-20, whereby octahedral silver iodobromide emulsions containing 5 mole %, 10 mole %, 20 mole % and 30 mole % of silver iodide, respectively, were obtained. In the same procedures as those for E-16, except that 2.0 mole % of shell potassium iodide was contained in each of these emulsions, there were prepared corresponding tetrahedral monodispersed core/shell emulsions comprising grains having an average grain size of 1.10 μm, which were designated as E-21, E-22, E-23 and E-24, respectively.

On these monodispersed emulsions, chemical sensitization and coating were carried out in the same manner as in Example 5 to obtain samples No. 121 to No. 128 as shown in Table 9 (Table 9-a, -b, -c) shown below. On these samples, abrasion blackening and sensitivity were determined in the same manner as in Example 6 to obtain results as shown in Table 9 (Table 9-c).

As will be clear from Table 9, in the grains having the difference of 10 mole % or more in the iodine content between core and shell, the abrasion blackening is hard to occur and also the sensitivity is excellent as gelatin amount is smaller, when compared with the grains having the difference of less than 10 mole %.

TABLE 9

| | | Silver halide emulsion layer | | | | | Protective layer | | | | |
|---|---|---|---|---|---|---|---|---|---|---|---|
| Sample No. | Emulsion | Gelatin amount per one side ($g/m^2$) | Type of surface active agent | Surface tension (dyn/cm) | Type of thickening agent | Viscosity (cp) | Gelatin amount per one side ($g/m^2$) | Type of surface active agent | Surface tension (dyn/cm) | Type of thickening agent | Viscosity (cp) |
| 121 | E-21 | 2.20 | (1) | 36 | (A) | 10 | 1.15 | (1) | 30 | (B) | 10 |
| 122 | E-22 | 2.20 | (1) | 36 | (A) | 10 | 1.15 | (1) | 30 | (B) | 10 |
| 123 | E-23 | 2.20 | (1) | 36 | (A) | 10 | 1.15 | (1) | 30 | (B) | 10 |
| 124 | E-24 | 2.20 | (1) | 36 | (A) | 10 | 1.15 | (1) | 30 | (B) | 10 |
| 125 | E-21 | 1.70 | (1) | 35 | (A) | 10 | 1.00 | 2-80 | 27 | (B) | 10 |
| 126 | E-22 | 1.70 | (1) | 35 | (A) | 10 | 1.00 | " | 27 | (B) | 10 |
| 127 | E-23 | 1.70 | (1) | 35 | (A) | 10 | 1.00 | " | 27 | (B) | 10 |
| 128 | E-24 | 1.70 | (1) | 35 | (A) | 10 | 1.00 | " | 27 | (B) | 10 |

| Sample No. | Total gelatin amount per one side ($g/m^2$) | Diff.* in surface tension (dyn/cm) | Diff.* in viscosity (cp) | Sensitivity | Abrasion blackening (g) |
|---|---|---|---|---|---|
| 121 | 3.35 | 6 | 0 | 115 | 55 |
| 122 | 3.35 | 6 | 0 | 120 | 55 |
| 123 | 3.35 | 6 | 0 | 125 | 58 |
| 124 | 3.35 | 6 | 0 | 130 | 60 |
| 125 | 2.70 | 8 | 0 | 145 | 30 |
| 126 | 2.70 | 8 | 0 | 150 | 35 |
| 127 | 2.70 | 8 | 0 | 160 | 50 |
| 128 | 2.70 | 8 | 0 | 165 | 55 |

*Difference (between emulsion layer and protective layer)

EXAMPLE 8

Example 4 was repeated to prepare emulsions E-25 to E-28, except that the thickening agents and surface active agents used in Example 5 were used. Chemical sensitization and coating were carried out on these samples in the same procedures as in Example 4 to obtain samples No. 129 to No. 136 as shown in Table 10 (Table 10-a, -b, -c). Experiments were carried out in the same manner as in Example 4 to obtain the results shown in Table 10 (Table 10-c).

As will be clear from Table 10 (Table 10-a, -b, -c), in the grains having the difference of 10 mole % or more in the iodine content between core and shell, the abrasion blackening is hard to occur and also the sensitivity is excellent as gelatin amount is smaller.

in Table 11 (Table 11-a, -b, -c) shown below. On these samples, coating troubles, sensitivities and drying characteristics were evaluated in the same manner as in Example 5 to obtain the results as shown in Table 12 shown below.

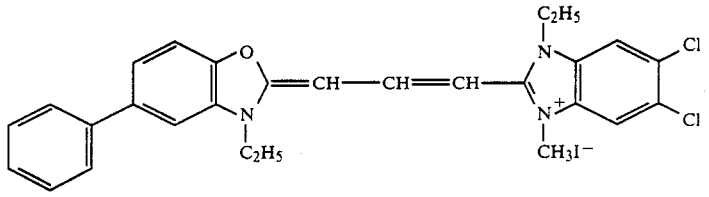

Control dye (a)

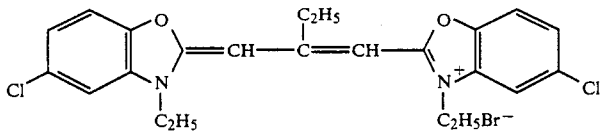

Control dye (b)

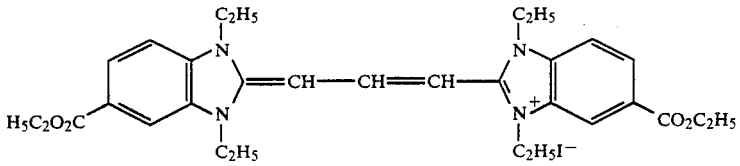

Control dye (c)

R.M.S. granularity was also measured in the following manner.

TABLE 10

| | | Silver halide emulsion layer | | | | | Protective layer | | | | |
|---|---|---|---|---|---|---|---|---|---|---|---|
| Sample No. | Emulsion | Gelatin amount per one side ($g/m^2$) | Type of surface active agent | Surface tension (dyn/cm) | Type of thickening agent | Viscosity (cp) | Gelatin amount per one side ($g/m^2$) | Type of surface active agent | Surface tension (dyn/cm) | Type of thickening agent | Viscosity (cp) |
| 129 | E-25 | 2.20 | (1) | 36 | (A) | 10 | 1.15 | (1) | 30 | (B) | 10 |
| 130 | E-26 | 2.20 | (1) | 36 | (A) | 10 | 1.15 | (1) | 30 | (B) | 10 |
| 131 | E-27 | 2.20 | (1) | 36 | (A) | 10 | 1.15 | (1) | 30 | (B) | 10 |
| 132 | E-28 | 2.20 | (1) | 36 | (A) | 10 | 1.15 | (1) | 30 | (B) | 10 |
| 133 | E-25 | 1.70 | (1) | 35 | (A) | 10 | 1.00 | (1) | 27 | (B) | 10 |
| 134 | E-26 | 1.70 | (1) | 35 | (A) | 10 | 1.00 | (1) | 27 | (B) | 10 |
| 135 | E-27 | 1.70 | (1) | 35 | (A) | 10 | 1.00 | (1) | 27 | (B) | 10 |
| 136 | E-28 | 1.70 | (1) | 35 | (A) | 10 | 1.00 | (1) | 27 | (B) | 10 |

| Sample No. | Total gelatin amount per one side ($g/m^2$) | Diff.* in surface tension (dyn/cm) | Diff.* in viscosity (cp) | Sensitivity | Abrasion blackening (g) |
|---|---|---|---|---|---|
| 129 | 3.35 | 6 | 0 | 120 | 55 |
| 130 | 3.35 | 6 | 0 | 125 | 58 |
| 131 | 3.35 | 6 | 0 | 130 | 60 |
| 132 | 3.35 | 6 | 0 | 135 | 60 |
| 133 | 2.70 | 8 | 0 | 150 | 35 |
| 134 | 2.70 | 8 | 0 | 160 | 50 |
| 135 | 2.70 | 8 | 0 | 165 | 55 |
| 136 | 2.70 | 8 | 0 | 170 | 60 |

*Difference (between emulsion layer and protective layer)

EXAMPLE 9

In this example, using the emulsion used in Example 5, the sensitizing dyes shown as the examples of the compounds of Formulas (I) to (III) or control dyes (a) to (c) shown below were added to the respective samples. Thereafter, chloroauric acid, sodium thiosulfate and ammonium thiocyanate were added to carry out optimum gold and sulfur sensitization, followed by stabilization with 4-hydroxy-6-methyl-1,3,3a,7-tetrazaindene. Coating weight of silver was 45 $mg/dm^2$, and other conditions same as in the procedures in Example 5 were used to obtain samples No. 137 to No. 197 as That is, each sample was inserted to an orthochromatic sensitizing screen KS (produced by Konishiroku Photo Industry Co., Ltd.), and irradiated with X-rays for 0.10 second at a tube voltage of 90 KVP and a tube current of 100 mA with use of an aluminum wedge, followed by the above 45 second processing. Subsequently, an emulsion layer of the sample was peeled off at a portion of the density 1.0 and at the front side facing to an X-ray generator, and, using Sakura one-touch type RMS measuring machine (produced by Konishiroku Photo Industry Co., Ltd.), the other side emulsion face was measured under an aperture size of 50×200 μm. The smaller the measured value is, the better the granularity is.

Similar to Example 5, part of the samples were processed to determine the sensitivity in the conventional 90 second processing by dropping to ½ the line speed of the above 45 second automatic processor. Results obtained are shown in Table 13.

As will be clear from Table 12 and Table 13, the samples according to this invention have good coating properties and also excellent sensitivity and drying characteristics, and thus have the feasibility for ultra rapid processing. It is also seen from the comparison with the conventional 90 second processing that the processing time can be shortened to ½ to make twice the processing ability, retaining the sensitivity attained in the conventional system.

TABLE 11

| | | (Table 11-a) | | | | | (Table 11-b) | | | | |
|---|---|---|---|---|---|---|---|---|---|---|---|
| | | Silver halide emulsion layer | | | | | Protective layer | | | | |
| Sample No. | Emulsion | Gelatin amount per one side (g/m²) | Type of surface active agent | Surface tension (dyn/cm) | Type of thickening agent | Viscosity (cp) | Gelatin amount per one side (g/m²) | Type of surface surface agent | Surface tension (dyn/cm) | Type of thickening agent | Viscosity (cp) |
| 137 | E-15 | 2.00 | (1) | 36 | (A) | 24 | 1.15 | 3—3 | 30 | (B) | 22 |
| 138 | E-15 | 2.00 | (1) | 36 | (A) | 10 | 1.15 | " | 30 | (B) | 10 |
| 139 | E-15 | 2.00 | (1) | 36 | (A) | 24 | 1.15 | " | 31 | (B) | 22 |
| 140 | E-15 | 2.00 | (1) | 36 | (A) | 10 | 1.15 | " | 31 | (B) | 10 |
| 141 | E-15 | 1.90 | (1) | 36 | (A) | 24 | 1.15 | (1) | 30 | (B) | 22 |
| 142 | E-15 | 1.90 | (1) | 36 | (A) | 20 | 1.15 | (1) | 30 | (B) | 20 |
| 143 | E-15 | 1.90 | (1) | 36 | (A) | 10 | 1.15 | (1) | 30 | (B) | 10 |
| 144 | E-15 | 1.90 | (1) | 36 | (A) | 24 | 1.15 | (1) | 31 | (B) | 22 |
| 145 | E-15 | 1.90 | (1) | 36 | (A) | 20 | 1.15 | (1) | 31 | (B) | 20 |
| 146 | E-15 | 1.90 | (1) | 36 | (A) | 10 | 1.15 | (1) | 31 | (B) | 10 |
| 147 | E-15 | 1.75 | (1) | 35 | (A) | 24 | 1.15 | (2) | 29 | (B) | 22 |
| 148 | E-15 | 1.75 | (1) | 35 | (A) | 20 | 1.15 | (2) | 29 | (B) | 20 |
| 149 | E-15 | 1.75 | (1) | 35 | (A) | 10 | 1.15 | (2) | 29 | (B) | 10 |
| 150 | E-15 | 1.75 | (1) | 35 | (A) | 24 | 1.15 | (2) | 30 | (B) | 22 |
| 151 | E-15 | 1.75 | (1) | 35 | (A) | 20 | 1.15 | (2) | 30 | (B) | 20 |
| 152 | E-15 | 1.75 | (1) | 35 | (A) | 10 | 1.15 | (2) | 30 | (B) | 10 |
| 153 | E-15 | 1.75 | (1) | 35 | (A) | 24 | 1.15 | (2) | 27 | (B) | 22 |
| 154 | E-15 | 1.75 | (1) | 35 | (A) | 20 | 1.15 | (2) | 27 | (B) | 20 |
| 155 | E-15 | 1.75 | (1) | 35 | (A) | 10 | 1.15 | (2) | 27 | (B) | 10 |
| 156 | E-15 | 1.70 | (1) | 35 | (A) | 24 | 1.10 | 2-80 | 29 | (B) | 22 |
| 157 | E-15 | 1.70 | (1) | 35 | (A) | 20 | 1.10 | " | 29 | (B) | 20 |
| 158 | E-15 | 1.70 | (1) | 35 | (A) | 10 | 1.10 | " | 29 | (B) | 10 |
| 159 | E-15 | 1.70 | (1) | 35 | (A) | 24 | 1.10 | " | 30 | (B) | 22 |
| 160 | E-15 | 1.70 | (1) | 35 | (A) | 20 | 1.10 | " | 30 | (B) | 20 |
| 161 | E-15 | 1.70 | (1) | 35 | (A) | 10 | 1.10 | " | 30 | (B) | 10 |
| 162 | E-15 | 1.70 | (1) | 35 | (A) | 24 | 1.10 | " | 27 | (B) | 22 |
| 163 | E-15 | 1.70 | (1) | 35 | (A) | 20 | 1.00 | " | 27 | (B) | 20 |
| 164 | E-15 | 1.70 | (1) | 35 | (A) | 10 | 1.00 | " | 27 | (B) | 10 |
| 165 | E-15 | 1.20 | (1) | 34 | (A) | 24 | 1.00 | 2-26 | 28 | (B) | 22 |
| 166 | E-15 | 1.20 | (1) | 34 | (A) | 20 | 1.00 | " | 28 | (B) | 20 |
| 167 | E-15 | 1.20 | (1) | 34 | (A) | 10 | 1.00 | " | 28 | (B) | 10 |
| 168 | E-15 | 1.20 | (1) | 34 | (A) | 24 | 1.00 | " | 29 | (B) | 22 |
| 169 | E-15 | 1.20 | (1) | 34 | (A) | 20 | 1.00 | " | 29 | (B) | 20 |
| 170 | E-15 | 1.20 | (1) | 34 | (A) | 10 | 1.00 | " | 29 | (B) | 10 |
| 171 | E-15 | 1.20 | (1) | 34 | (A) | 24 | 1.00 | " | 26 | (B) | 22 |
| 172 | E-15 | 1.20 | (1) | 34 | (A) | 10 | 1.00 | " | 26 | (B) | 20 |
| 173 | E-15 | 1.20 | (1) | 34 | (A) | 20 | 1.00 | " | 26 | (B) | 10 |
| 174 | E-15 | 1.10 | (1) | 34 | (A) | 24 | 1.00 | (3) | 28 | (B) | 22 |
| 175 | E-15 | 1.10 | (1) | 34 | (A) | 10 | 1.00 | " | 28 | (B) | 10 |
| 176 | E-15 | 1.10 | (1) | 34 | (A) | 24 | 1.00 | " | 26 | (B) | 22 |
| 177 | E-15 | 1.10 | (1) | 34 | (A) | 10 | 1.00 | " | 26 | (B) | 10 |
| 178 | E-15 | 1.70 | (1) | 35 | (A) | 24 | 1.00 | 2-80 | 29 | (B) | 22 |
| 179 | E-15 | 1.70 | (1) | 35 | (A) | 20 | 1.00 | " | 29 | (B) | 20 |
| 180 | E-15 | 1.70 | (1) | 35 | (A) | 10 | 1.00 | " | 29 | (B) | 10 |
| 181 | E-15 | 1.70 | (1) | 35 | (A) | 24 | 1.00 | " | 30 | (B) | 22 |
| 182 | E-15 | 1.70 | (1) | 35 | (A) | 20 | 1.00 | " | 30 | (B) | 20 |
| 183 | E-15 | 1.70 | (1) | 35 | (A) | 10 | 1.00 | " | 30 | (B) | 10 |
| 184 | E-15 | 1.70 | (1) | 35 | (A) | 24 | 1.00 | " | 27 | (B) | 22 |
| 185 | E-15 | 1.70 | (1) | 35 | (A) | 20 | 1.00 | " | 27 | (B) | 20 |
| 186 | E-15 | 1.70 | (1) | 35 | (A) | 10 | 1.00 | " | 27 | (B) | 10 |
| 187 | E-15 | 1.90 | (1) | 36 | (A) | 24 | 1.15 | 1-10 | 30 | (B) | 22 |
| 188 | E-15 | 1.90 | (1) | 36 | (A) | 10 | 1.15 | " | 30 | (B) | 10 |
| 189 | E-15 | 1.90 | (1) | 36 | (A) | 24 | 1.15 | " | 31 | (B) | 22 |
| 190 | E-15 | 1.90 | (1) | 36 | (A) | 10 | 1.15 | " | 31 | (B) | 10 |
| 191 | E-15 | 1.20 | (1) | 34 | (A) | 24 | 1.00 | 2-26 | 28 | (B) | 22 |
| 192 | E-15 | 1.20 | (1) | 34 | (A) | 10 | 1.00 | " | 28 | (B) | 10 |
| 193 | E-15 | 1.20 | (1) | 34 | (A) | 24 | 1.00 | " | 29 | (B) | 22 |
| 194 | E-15 | 1.20 | (1) | 34 | (A) | 10 | 1.00 | " | 29 | (B) | 10 |
| 195 | E-15 | 1.70 | (1) | 35 | (A) | 24 | 1.00 | 2-80 | 29 | (B) | 22 |
| 196 | E-15 | 1.70 | (1) | 35 | (A) | 20 | 1.00 | " | 29 | (B) | 20 |
| 197 | E-15 | 1.70 | (1) | 35 | (A) | 10 | 1.00 | " | 29 | (B) | 10 |

(Table 11-c)

Sensitizing dye

TABLE 11-continued

| Sample No. | Total gelatin amount/ one side (g/m$^2$) | Diff.* in surface tension (dyn/cm) | Diff.* in viscosity (cp) | Type | Amount (mg/mole AgX) | Remarks |
|---|---|---|---|---|---|---|
| 137 | 3.15 | 6 | 2 | (2) | 120 | No |
| 138 | 3.15 | 6 | 0 | (2) | 120 | No |
| 139 | 3.15 | 5 | 2 | (2) | 120 | No |
| 140 | 3.15 | 5 | 0 | (2) | 120 | No |
| 141 | 3.05 | 6 | 2 | (2) | 120 | No |
| 142 | 3.05 | 6 | 0 | (44) | 120 | Yes |
| 143 | 3.05 | 6 | 0 | (74) | 120 | Yes |
| 144 | 3.05 | 5 | 2 | (44) | 120 | No |
| 145 | 3.05 | 5 | 0 | (44) | 120 | No |
| 146 | 3.05 | 5 | 0 | (44) | 120 | No |
| 147 | 2.90 | 6 | 2 | (74) | 120 | No |
| 148 | 2.90 | 6 | 0 | (2) | 120 | Yes |
| 149 | 2.90 | 6 | 0 | (44) | 120 | Yes |
| 150 | 2.90 | 5 | 2 | (44) | 120 | No |
| 151 | 2.90 | 5 | 0 | (2) | 120 | No |
| 152 | 2.90 | 5 | 0 | (74) | 120 | No |
| 153 | 2.90 | 8 | 2 | (44) | 120 | No |
| 154 | 2.90 | 8 | 0 | (2) | 120 | Yes |
| 155 | 2.90 | 8 | 0 | (74) | 120 | Yes |
| 156 | 2.70 | 6 | 2 | (74) | 120 | No |
| 157 | 2.70 | 6 | 0 | (44) | 120 | Yes |
| 158 | 2.70 | 6 | 0 | (2) | 120 | Yes |
| 159 | 2.70 | 5 | 2 | (2) | 120 | No |
| 160 | 2.70 | 5 | 0 | (44) | 120 | No |
| 161 | 2.70 | 5 | 0 | (74) | 120 | No |
| 162 | 2.70 | 8 | 2 | (2) | 120 | No |
| 163 | 2.70 | 8 | 0 | (44) | 120 | Yes |
| 164 | 2.70 | 8 | 0 | (74) | 120 | Yes |
| 165 | 2.20 | 6 | 2 | (44) | 120 | No |
| 166 | 2.20 | 6 | 0 | (74) | 120 | No |
| 167 | 2.20 | 6 | 0 | (2) | 120 | Yes |
| 168 | 2.20 | 5 | 2 | (44) | 120 | No |
| 169 | 2.20 | 5 | 0 | (2) | 120 | No |
| 170 | 2.20 | 5 | 0 | (74) | 120 | No |
| 171 | 2.20 | 8 | 2 | (74) | 120 | No |
| 172 | 2.20 | 8 | 0 | (2) | 120 | Yes |
| 173 | 2.20 | 8 | 0 | (44) | 120 | Yes |
| 174 | 2.10 | 6 | 2 | (74) | 120 | No |
| 175 | 2.10 | 6 | 0 | (74) | 120 | Yes |
| 176 | 2.10 | 8 | 2 | (74) | 120 | No |
| 177 | 2.10 | 8 | 0 | (74) | 120 | Yes |
| 178 | 2.70 | 6 | 2 | (a) | 120 | No |
| 179 | 2.70 | 6 | 0 | (b) | 120 | Yes |
| 180 | 2.70 | 6 | 0 | (c) | 120 | Yes |
| 181 | 2.70 | 5 | 2 | (a) | 120 | No |
| 182 | 2.70 | 5 | 0 | (b) | 120 | No |
| 183 | 2.70 | 5 | 0 | (c) | 120 | No |
| 184 | 2.70 | 8 | 2 | (a) | 120 | No |
| 185 | 2.70 | 8 | 0 | (b) | 120 | Yes |
| 186 | 2.70 | 8 | 0 | (c) | 120 | Yes |
| 187 | 3.05 | 6 | 2 | (a) | 120 | No |
| 188 | 3.05 | 6 | 0 | (b) | 120 | Yes |
| 189 | 3.05 | 5 | 2 | (b) | 120 | No |
| 190 | 3.05 | 5 | 0 | (c) | 120 | No |
| 191 | 2.20 | 6 | 2 | (c) | 120 | No |
| 192 | 2.20 | 6 | 0 | (a) | 120 | Yes |
| 193 | 2.20 | 5 | 2 | (a) | 120 | No |
| 194 | 2.20 | 5 | 0 | (b) | 120 | No |
| 195 | 2.70 | 6 | 2 | None | — | No |
| 196 | 2.70 | 6 | 0 | None | — | Yes |
| 197 | 2.70 | 6 | 0 | None | — | Yes |

*Difference (between emulsion layer and protective layer)
Yes: Present invention
No: Not the invention

TABLE 12

| Sample No. | Coating trouble | Sensitivity | Drying characteristic | Granularity | Remarks |
|---|---|---|---|---|---|
| 137 | 5 | 150 | 2 | 0.0017 | No |
| 138 | 5 | 150 | 2 | 0.0017 | No |
| 139 | 5 | 150 | 2 | 0.0017 | No |
| 140 | 5 | 150 | 2 | 0.0017 | No |
| 141 | 2 | 160 | 3 | 0.0018 | No |
| 142 | 4 | 155 | 3 | 0.0018 | Yes |
| 143 | 5 | 155 | 3 | 0.0018 | Yes |
| 144 | 2 | 155 | 3 | 0.0018 | No |
| 145 | 2 | 155 | 3 | 0.0018 | No |
| 146 | 2 | 155 | 3 | 0.0018 | No |

TABLE 12-continued

| Sample No. | Coating trouble | Sensitivity | Drying characteristic | Granularity | Remarks |
|---|---|---|---|---|---|
| 147 | 2 | 165 | 4 | 0.0019 | No |
| 148 | 4 | 170 | 4 | 0.0019 | Yes |
| 149 | 5 | 165 | 4 | 0.0019 | Yes |
| 150 | 2 | 165 | 4 | 0.0019 | No |
| 151 | 2 | 170 | 4 | 0.0019 | No |
| 152 | 2 | 165 | 4 | 0.0019 | No |
| 153 | 2 | 165 | 4 | 0.0019 | No |
| 154 | 4 | 170 | 4 | 0.0019 | Yes |
| 155 | 5 | 165 | 4 | 0.0020 | Yes |
| 156 | 2 | 175 | 5 | 0.0020 | No |

TABLE 12-continued

| Sample No. | Coating trouble | Sensitivity | Drying characteristic | Granularity | Remarks |
|---|---|---|---|---|---|
| 157 | 3 | 180 | 5 | 0.0020 | Yes |
| 158 | 4 | 175 | 5 | 0.0020 | Yes |
| 159 | 1 | 180 | 5 | 0.0020 | No |
| 160 | 1 | 175 | 5 | 0.0020 | No |
| 161 | 1 | 175 | 5 | 0.0020 | No |
| 162 | 1 | 180 | 5 | 0.0020 | No |
| 163 | 4 | 175 | 5 | 0.0020 | Yes |
| 164 | 5 | 175 | 5 | 0.0021 | Yes |
| 165 | 1 | 190 | 5 | 0.0021 | No |
| 166 | 3 | 190 | 5 | 0.0021 | Yes |
| 167 | 4 | 195 | 5 | 0.0021 | No |
| 168 | 1 | 190 | 5 | 0.0021 | No |
| 169 | 1 | 195 | 5 | 0.0021 | No |
| 170 | 1 | 190 | 5 | 0.0021 | No |
| 171 | 1 | 190 | 5 | 0.0021 | No |
| 172 | 4 | 195 | 5 | 0.0021 | Yes |
| 173 | 5 | 190 | 5 | 0.0021 | Yes |
| 174 | 1 | 195 | 5 | 0.0022 | No |
| 175 | 3 | 195 | 5 | 0.0022 | Yes |
| 176 | 1 | 195 | 5 | 0.0022 | No |
| 177 | 3 | 195 | 5 | 0.0022 | Yes |
| 178 | 1 | 135 | 5 | 0.0020 | No |
| 179 | 3 | 135 | 5 | 0.0020 | Yes |
| 180 | 4 | 135 | 5 | 0.0020 | Yes |
| 181 | 1 | 135 | 5 | 0.0020 | No |
| 182 | 1 | 135 | 5 | 0.0020 | No |
| 183 | 1 | 135 | 5 | 0.0020 | No |
| 184 | 1 | 135 | 5 | 0.0020 | No |
| 185 | 2 | 135 | 5 | 0.0020 | No |
| 186 | 2 | 135 | 5 | 0.0020 | No |
| 187 | 2 | 105 | 3 | 0.0018 | No |
| 188 | 2 | 105 | 3 | 0.0018 | No |
| 189 | 2 | 105 | 3 | 0.0018 | No |
| 190 | 2 | 105 | 3 | 0.0018 | No |
| 191 | 1 | 150 | 5 | 0.0021 | No |
| 192 | 3 | 150 | 5 | 0.0021 | Yes |
| 193 | 1 | 150 | 5 | 0.0021 | No |
| 194 | 1 | 150 | 5 | 0.0021 | No |
| 195 | 1 | 130 | 5 | 0.0020 | No |
| 196 | 3 | 130 | 5 | 0.0020 | Yes |
| 197 | 3 | 130 | 5 | 0.0020 | Yes |

Yes: Present invention
No: Not the invention

TABLE 13

| Sample No. | Total gelatin amount per one side ($g/m^2$) | Diff. in surface tension (dyn/cm) | Diff. in viscosity | Sensitizing dye | Sensitivity 45 sec. processing | Sensitivity 90 sec. processing |
|---|---|---|---|---|---|---|
| 138 | 3.15 | 6 | 0 | (2) | 150 | 170 |
| 143 | 3.05 | 6 | 0 | (74) | 155 | 175 |
| 149 | 2.90 | 6 | 0 | (44) | 165 | 180 |
| 158 | 2.70 | 6 | 0 | (2) | 175 | 190 |
| 167 | 2.20 | 6 | 0 | (2) | 195 | 205 |
| 175 | 2.10 | 6 | 0 | (74) | 195 | 205 |
| 180 | 2.70 | 6 | 0 | (c) | 135 | 140 |
| 188 | 3.05 | 6 | 0 | (b) | 105 | 115 |
| 192 | 2.20 | 6 | 0 | (a) | 150 | 155 |

EXAMPLE 10

Using the emulsion used in Example 6, the sensitizing dyes (2) were added, and thereafter, chloroauric acid, sodium thiosulfate and ammonium thiocyanate were added to carry out optimum gold and sulfur sensitization, followed by stabilization with 4-hydroxy-6-methyl-1,3,3a,7-tetrazaindene. Coating weight of silver was 45 $mg/dm^2$, and other conditions same as in the procedures in Example 5 were used to obtain the samples as shown in Table 14 (Table 14-a, -b, -c) shown below On these samples, experiments were carried out in the same manner as in Example 6 to obtain the results as shown in Table 15 shown below.

As will be clear from Table 15, in the grains having the difference of 10 mole % or more in the iodine content between core and shell, the abrasion blackening is hard to occur and also the sensitivity is excellent as gelatin amount is smaller, when compared with the grains having the difference of less than 10 mole %.

Similar experiments were carried out also on sensitizing dyes (44) and (74) to obtain similar results.

TABLE 14

| | Silver halide emulsion layer | | | | | |
|---|---|---|---|---|---|---|
| Sample No. | Emulsion | Gelatin amount per one side ($g/m^2$) | Type of surface active agent | Surface tension (dyn/cm) | Type of thickening agent | Viscosity (cp) |
| 198 | E-16 | 2.00 | (1) | 36 | (A) | 10 |
| 199 | E-17 | 2.00 | (1) | 36 | (A) | 10 |
| 200 | E-18 | 2.00 | (1) | 36 | (A) | 10 |
| 201 | E-19 | 2.00 | (1) | 36 | (A) | 10 |
| 202 | E-20 | 2.00 | (1) | 36 | (A) | 10 |
| 203 | E-16 | 1.70 | (1) | 35 | (A) | 10 |
| 204 | E-17 | 1.70 | (1) | 35 | (A) | 10 |
| 205 | E-18 | 1.70 | (1) | 35 | (A) | 10 |
| 206 | E-19 | 1.70 | (1) | 35 | (A) | 10 |
| 207 | E-20 | 1.70 | (1) | 35 | (A) | 10 |

| | Protective layer | | | | |
|---|---|---|---|---|---|
| Sample No. | Gelatin amount per one side ($g/m^2$) | Type of surface active agent | Surface tension (dyn/cm) | Type of thickening agent | Viscosity (cp) |
| 198 | 1.15 | 3-3 | 30 | (B) | 10 |
| 199 | 1.15 | " | 30 | (B) | 10 |
| 200 | 1.15 | " | 30 | (B) | 10 |
| 201 | 1.15 | " | 30 | (B) | 10 |
| 202 | 1.15 | " | 30 | (B) | 10 |
| 203 | 1.00 | 2-80 | 29 | (B) | 10 |
| 204 | 1.00 | " | 29 | (B) | 10 |
| 205 | 1.00 | " | 29 | (B) | 10 |
| 206 | 1.00 | " | 29 | (B) | 10 |
| 207 | 1.00 | " | 29 | (B) | 10 |

| Sample No. | Total gelatin amount/one side ($g/m^2$) | Diff.* in surface tension (dyn/cm) | Diff.* in viscosity (cp) | Sensitizing dye Type | Sensitizing dye Amount (mg/mole AgX) |
|---|---|---|---|---|---|
| 198 | 3.15 | 6 | 0 | (2) | 120 |
| 199 | 3.15 | 6 | 0 | (2) | 120 |
| 200 | 3.15 | 6 | 0 | (2) | 120 |
| 201 | 3.05 | 6 | 0 | (2) | 120 |
| 202 | 3.05 | 6 | 0 | (2) | 120 |
| 203 | 2.70 | 6 | 0 | (2) | 120 |
| 204 | 2.70 | 6 | 0 | (2) | 120 |
| 205 | 2.70 | 6 | 0 | (2) | 120 |
| 206 | 2.70 | 6 | 0 | (2) | 120 |
| 207 | 2.70 | 6 | 0 | (2) | 120 |

*Difference (between emulsion layer and protective layer)

TABLE 15

| Sample No. | Sensitivity | Abrasion blackening |
|---|---|---|
| 198 | 160 | 58 |
| 199 | 165 | 58 |
| 200 | 170 | 61 |
| 201 | 175 | 63 |
| 202 | 180 | 63 |
| 203 | 185 | 33 |
| 204 | 190 | 36 |
| 205 | 195 | 48 |
| 206 | 200 | 53 |
| 207 | 205 | 58 |

EXAMPLE 11

Two kinds of silver iodobromide emulsions containing 3.0 mole % of silver iodide were prepared according to regular mixing by a full ammonia method. They comprised grains having an average grain size of 1.10 μm and 0.80 μm, respectively, which are designated as emulsions E-29 and E-30, respectively. To these emulsions E-29 and E-30, the sensitizing dyes as shown in Table 16 (Table 16-c) were added. Thereafter, chloroauric acid, sodium thiosulfate and ammonium thiocyanate were added to carry out optimum gold and sulfur sensitization, followed by stabilization with 4-hydroxy-6-methyl-1,3,3a,7-tetrazaindene.

Both sides of a polyester film support having been subjected to subbing treatment were coated, together with the above emulsions, with a protective layer to which a hardening agent was added, to provide layers in the order of the silver halide emulsion layer and the protective layer according to a slide hopper method at a coating rate of 100 m/min so that two layers may simultaneously overlap, thereby obtaining Samples No. 208 to No. 230. Amount of gelatin, surface active agents, difference in surface tension and sensitizing dyes are shown in Table 16 (Table 16-a, -b, -c) with use of reference to the above-mentioned exemplary compound No. (and control dye No. shown below).

Silver weight was 45 mg/dm2.

The amount of hardening agent in each of the above samples was controlled to have a melting time of about 30 minutes.

In measuring R.M.S. granularity, the sample to which no sensitizing dye was added was inserted to a regular sensitizing screen NS (produced by Konishiroku Photo Industry Co., Ltd.) and the sample to which the sensitizing dye was added was inserted to an orthochromatic sensitizing screen KS (produced by Konishiroku Photo Industry Co., Ltd.).

Measurement of pressure desensitization was also carried out in the following manner. That is, each sample was moisture-conditioned at 23° C., 35 % R.H. for 5 hours, and, under such conditions, folded about 280° with a curvature radius of 2 cm. Three (3) minutes after folded, with use of an optical wedge, the sample was exposed for 1/10 second using a tungsten lamp as a light source to carry out development. The difference in density between the portion with a blackening density of 1.0 where desensitization occurred due to the folding and the density of 1.0 at the portion where the sample was not folded, was indicated by ΔD. It follows that, the smaller this value is, the smaller the pressure desensitization is.

Results obtained above are shown in Table 17.

Part of the samples were also processed to obtain the sensitivity in the conventional 90 second processing by dropping to ½ the line speed of the above 45 second automatic processor. Results are shown in Table 18.

As will be clear from Table 17 and Table 18, the samples according to this invention have good coating properties and also totally excellent sensitivity, granularity, pressure desensitization, abrasion blackening and drying characteristics, and thus have the feasibility for ultra rapid processing. It is also seen from the comparison with the conventional 90 second processing that the sensitivity is higher than the conventional system, and yet the processing time can be shortened to ½ to make twice the processing ability.

TABLE 16

| Silver halide emulsion layer | | | | | |
|---|---|---|---|---|---|
| Sample No. | Emulsion | Gelatin amount per one side ($g/m^2$) | Surface active agent Type | Surface active agent Amount per one side ($g/m^2$) | Surface tension (dyn/cm) |
| 208 | E-29 | 1.60 | 1-5 | $2 \times 10^{-4}$ | 35 |
| 209 | E-30 | 2.10 | 1-5 | $2 \times 10^{-4}$ | 35 |
| 210 | E-30 | 2.10 | 1-5 | $2 \times 10^{-4}$ | 35 |
| 211 | E-30 | 2.10 | 1-5 | $2 \times 10^{-4}$ | 35 |
| 212 | E-30 | 2.00 | 1-5 | $2 \times 10^{-4}$ | 35 |
| 213 | E-30 | 2.00 | 1-5 | $2 \times 10^{-4}$ | 35 |
| 214 | E-30 | 2.00 | 1-5 | $2 \times 10^{-4}$ | 35 |
| 215 | E-30 | 1.60 | 1-5 | $2 \times 10^{-4}$ | 35 |
| 216 | E-30 | 1.60 | 1-5 | $2 \times 10^{-4}$ | 35 |
| 217 | E-30 | 1.60 | 1-5 | $2 \times 10^{-4}$ | 35 |
| 218 | E-30 | 1.60 | 1-5 | $2 \times 10^{-4}$ | 35 |
| 219 | E-30 | 1.60 | 1-5 | $2 \times 10^{-4}$ | 35 |
| 220 | E-30 | 1.60 | 1-5 | $2 \times 10^{-4}$ | 35 |
| 221 | E-30 | 1.60 | 1-5 | $2 \times 10^{-4}$ | 35 |
| 222 | E-30 | 1.60 | 1-5 | $2 \times 10^{-4}$ | 35 |
| 223 | E-30 | 1.60 | 1-5 | $2 \times 10^{-4}$ | 35 |
| 224 | E-30 | 1.10 | 1-5 | $4 \times 10^{-4}$ | 34 |
| 225 | E-30 | 1.10 | 1-5 | $4 \times 10^{-4}$ | 34 |
| 226 | E-30 | 1.10 | 1-5 | $4 \times 10^{-4}$ | 34 |
| 227 | E-30 | 1.10 | 1-5 | $4 \times 10^{-4}$ | 34 |
| 228 | E-30 | 1.00 | 1-5 | $4 \times 10^{-4}$ | 34 |
| 229 | E-30 | 1.00 | 1-5 | $4 \times 10^{-4}$ | 34 |
| 230 | E-30 | 1.00 | 1-5 | $4 \times 10^{-4}$ | 34 |

| Protective layer | | | | |
|---|---|---|---|---|
| Sample No. | Gelatin amount per one side ($g/m^2$) | Surface active agent Type | Surface active agent Amount per one side ($g/m^2$) | Surface tension (dyn/cm) |
| 208 | 1.10 | 1-10 | $5 \times 10^{-3}$ | 25 |
| 209 | 1.10 | 1-10 | $8 \times 10^{-4}$ | 30 |
| 210 | 1.10 | 1-10 | $1 \times 10^{-3}$ | 29 |
| 211 | 1.10 | 1-10 | $2 \times 10^{-3}$ | 27 |
| 212 | 1.10 | 1-10 | $8 \times 10^{-4}$ | 30 |
| 213 | 1.10 | 1-10 | $1 \times 10^{-3}$ | 29 |
| 214 | 1.10 | 1-10 | $2 \times 10^{-3}$ | 27 |
| 215 | 1.10 | 2-80 | $4 \times 10^{-4}$ | 30 |
| 216 | 1.10 | 2-80 | $7 \times 10^{-4}$ | 29 |
| 217 | 1.10 | 2-80 | $2 \times 10^{-3}$ | 27 |
| 218 | 1.10 | 2-80 | $4 \times 10^{-3}$ | 25 |
| 219 | 1.10 | 2-24 | $3 \times 10^{-3}$ | 25 |
| 220 | 1.10 | 2-24 | $3 \times 10^{-3}$ | 25 |
| 221 | 1.10 | 2-24 | $3 \times 10^{-3}$ | 25 |
| 222 | 1.10 | 2-24 | $3 \times 10^{-3}$ | 25 |
| 223 | 1.10 | 2-24 | $3 \times 10^{-3}$ | 25 |
| 224 | 1.10 | 2-81 | $6 \times 10^{-4}$ | 29 |
| 225 | 1.10 | 2-81 | $8 \times 10^{-4}$ | 28 |
| 226 | 1.10 | 2-81 | $4 \times 10^{-3}$ | 24 |
| 227 | 1.10 | 2-81 | $1 \times 10^{-2}$ | 21 |
| 228 | 1.10 | 2-33 | $2 \times 10^{-3}$ | 26 |
| 229 | 1.10 | 2-33 | $4 \times 10^{-3}$ | 24 |
| 230 | 1.10 | 2-33 | $2 \times 10^{-2}$ | 19 |

| Sample No. | Total gelatin amount/one side ($g/m^2$) | Diff.* in surface tension (dyn/cm) | Sensitizing dye Type | Sensitizing dye Amount (mg/mole AgX) | Remarks |
|---|---|---|---|---|---|
| 208 | 2.70 | 10 | — | — | Yes |
| 209 | 3.20 | 5 | Compound (2) | 120 | No |
| 210 | 3.20 | 6 | Compound (2) | 120 | No |
| 211 | 3.20 | 8 | Compound (2) | 120 | No |
| 212 | 3.10 | 5 | Compound (2) | 120 | No |
| 213 | 3.10 | 6 | Compound (2) | 120 | Yes |
| 214 | 3.10 | 8 | Compound (2) | 120 | Yes |
| 215 | 2.70 | 5 | Compound (2) | 120 | No |
| 216 | 2.70 | 6 | Compound (2) | 120 | Yes |
| 217 | 2.70 | 8 | Compound (2) | 120 | Yes |
| 218 | 2.70 | 10 | Compound (2) | 120 | Yes |
| 219 | 2.70 | 10 | — | — | Yes |
| 220 | 2.70 | 10 | Compound (44) | 120 | Yes |
| 221 | 2.70 | 10 | Compound (74) | 120 | Yes |
| 222 | 2.70 | 10 | Control (a) | 120 | Yes |
| 223 | 2.70 | 10 | Control (b) | 120 | Yes |

TABLE 16-continued

| | | | | | |
|---|---|---|---|---|---|
| 224 | 2.20 | 5 | Compound (2) | 120 | No |
| 225 | 2.20 | 6 | Compound (2) | 120 | Yes |
| 226 | 2.20 | 10 | Compound (2) | 120 | Yes |
| 227 | 2.20 | 13 | Compound (2) | 120 | Yes |
| 228 | 2.10 | 8 | Compound (2) | 120 | No |
| 229 | 2.10 | 10 | Compound (2) | 120 | No |
| 230 | 2.10 | 15 | Compound (2) | 120 | No |

*Difference (between emulsion layer and protective layer)
Yes: Present invention
No: Not the invention

TABLE 17

| Sample No. | Coating trouble | Sensitivity | Granularity | Pressure desensitization | Abrasion blackening (g) | Drying characteristic |
|---|---|---|---|---|---|---|
| 208 | 5 | 100 | 0.0023 | 0.19 | 25 | 5 |
| 209 | 4 | 85 | 0.0017 | 0.06 | 60 | 2 |
| 210 | 5 | 85 | 0.0017 | 0.06 | 60 | 2 |
| 211 | 5 | 85 | 0.0017 | 0.06 | 60 | 2 |
| 212 | 3 | 90 | 0.0018 | 0.07 | 57 | 3 |
| 213 | 4 | 90 | 0.0018 | 0.07 | 57 | 3 |
| 214 | 5 | 90 | 0.0018 | 0.07 | 58 | 3 |
| 215 | 1 | 120 | 0.0019 | 0.08 | 50 | 5 |
| 216 | 3 | 120 | 0.0019 | 0.08 | 50 | 5 |
| 217 | 4 | 120 | 0.0019 | 0.08 | 51 | 5 |
| 218 | 5 | 120 | 0.0019 | 0.08 | 52 | 5 |
| 219 | 5 | 75 | 0.0019 | 0.09 | 50 | 5 |
| 220 | 5 | 115 | 0.0019 | 0.08 | 52 | 5 |
| 221 | 5 | 120 | 0.0019 | 0.08 | 52 | 5 |
| 222 | 5 | 90 | 0.0019 | 0.09 | 52 | 5 |
| 223 | 5 | 95 | 0.0019 | 0.09 | 52 | 5 |
| 224 | 1 | 135 | 0.0020 | 0.09 | 45 | 5 |
| 225 | 3 | 135 | 0.0020 | 0.09 | 45 | 5 |
| 226 | 4 | 135 | 0.0020 | 0.09 | 46 | 5 |
| 227 | 5 | 135 | 0.0020 | 0.09 | 47 | 5 |
| 228 | 1 | 140 | 0.0023 | 0.10 | 41 | 5 |
| 229 | 2 | 140 | 0.0023 | 0.10 | 41 | 5 |
| 230 | 2 | 140 | 0.0023 | 0.10 | 42 | 5 |

TABLE 18

| Sample No. | Total gelatin amount per one side ($g/m^2$) | Diff. in surface tension (dyn/cm) | Amount of sensitizing dye (mg/mol AgX) | | Sensitivity 45 sec. processing | Sensitivity 90 sec. processing |
|---|---|---|---|---|---|---|
| 211 | 3.20 | 8 | Comp. (2) | 120 | 85 | 105 |
| 214 | 3.10 | 8 | Comp. (2) | 120 | 90 | 110 |
| 218 | 2.70 | 10 | Comp. (2) | 120 | 120 | 135 |
| 219 | 2.70 | 10 | — | — | 75 | 90 |
| 226 | 2.20 | 10 | Comp. (2) | 120 | 135 | 145 |
| 229 | 2.10 | 10 | Comp. (2) | 120 | 140 | 150 |

EXAMPLE 12

Here will be described on the preparation of emulsions E-31 to E-35 containing silver halide grains having multi-layer structure. A 3.0N ammoniacal silver nitrate solution and a solution containing 2.0 mole % each of potassium iodide and 98.0 mole % of potassium bromide were added in a gelatin solution according to a double jet method at 45° C. while keeping pAg=11.0 and pH=9.0. The addition rate was gradually accelerated with growth of grains.

The resulting emulsion was found to be an octahedral monodispersed emulsion comprising grains having an average grain size of 0.70 μm. Keeping pAg=11.0 and pH=9.0, an ammoniacal silver nitrate solution and a potassium bromide solution were further added according to a double jet method to form shells comprising silver bromide alone. Obtained was an octahedral monodispersed emulsion comprising grains having an average grains size of 0.75 μm. This emulsion was designated as E-31.

Following substantially the same procedures as those for E-31, provided, however, that the ratio of potassium iodide to potassium bromide was varied, that the core size was varied so as to make uniform the average silver iodide content after the formation of shells, and that the addition rate at an initial stage of mixing was controlled, there were prepared octahedral silver iodobromide emulsions containing 5 mole %, 10 mole %, 25 mole % and 40 mole %, respectively, of silver iodide. Subsequent steps were made quite the same as those for E-31 to prepare octahedral monodispersed emulsions comprising grains having an average grain size of 0.75 μm, which were respectively designated as E-32, E-33, E-34 and E-35. On E-29 and E-31 to E-35, chemical sensitization and coating were carried out in the same manner as in Example 1 to obtain samples No. 231 to No. 239. Profiles of the samples are shown in Table 19 (Table 19-a, -b, -c).

These samples were evaluated in the same manner as in Example 10 to obtain the results as shown in Table 20.

As will be clear from Table 20, the samples according to this invention are excellent in sensitivity, granularity, pressure desensitization, and abrasion blackening as a whole, and it is also seen from the comparison with the conventional 90 second processing that the sensitivity is higher than the conventional system (samples No. 231 and No. 235), and yet the processing time can be shortened to ½ to make twice the processing ability.

TABLE 19

Silver halide emulsion layer

| Sample No. | Emulsion | Gelatin amount per one side ($g/m^2$) | Surface active agent Type | Surface active agent Amount per one side ($g/m^2$) | Surface tension (dyn/cm) |
|---|---|---|---|---|---|
| 231 | E-31 | 1.70 | 1-10 | $2 \times 10^{-4}$ | 35 |
| 232 | E-33 | 1.70 | 1-10 | $2 \times 10^{-4}$ | 35 |
| 233 | E-34 | 1.70 | 1-10 | $2 \times 10^{-4}$ | 35 |
| 234 | E-35 | 1.70 | 1-10 | $2 \times 10^{-4}$ | 35 |
| 235 | E-36 | 1.70 | 1-10 | $2 \times 10^{-4}$ | 35 |
| 236 | E-36 | 1.70 | 1-10 | $2 \times 10^{-4}$ | 35 |
| 237 | E-36 | 1.70 | 1-10 | $2 \times 10^{-4}$ | 35 |
| 238 | E-36 | 1.70 | 1-10 | $2 \times 10^{-4}$ | 35 |
| 239 | E-37 | 1.70 | 1-10 | $2 \times 10^{-4}$ | 35 |

Protective layer

| Sample No. | Gelatin amount per one side ($g/m^2$) | Surface active agent Type | Surface active agent Amount per one side ($g/m^2$) | Surface tension (dyn/cm) |
|---|---|---|---|---|
| 231 | 1.00 | 1-10 | $5 \times 10^{-3}$ | 25 |
| 232 | 1.00 | 1-10 | $5 \times 10^{-3}$ | 25 |
| 233 | 1.00 | 1-10 | $5 \times 10^{-3}$ | 25 |
| 234 | 1.00 | 1-10 | $5 \times 10^{-3}$ | 25 |
| 235 | 1.00 | 1-10 | $5 \times 10^{-3}$ | 25 |
| 236 | 1.00 | 1-10 | $5 \times 10^{-3}$ | 25 |
| 237 | 1.00 | 1-10 | $5 \times 10^{-3}$ | 25 |
| 238 | 1.00 | 1-10 | $5 \times 10^{-3}$ | 25 |
| 239 | 1.00 | 1-10 | $5 \times 10^{-3}$ | 25 |

| Sample No. | Total gelatin amount/one side ($g/m^2$) | Diff.* in surface tension (dyn/cm) | Sensitizing dye Type | Sensitizing dye Amount (mg/mole AgX) | Remarks |
|---|---|---|---|---|---|
| 231 | 2.70 | 10 | — | — | Yes |
| 232 | 2.70 | 10 | Compound (2) | 120 | Yes |
| 233 | 2.70 | 10 | Compound (2) | 120 | Yes |
| 234 | 2.70 | 10 | Compound (2) | 120 | Yes |
| 235 | 2.70 | 10 | — | — | Yes |
| 236 | 2.70 | 10 | Compound (2) | 120 | Yes |

TABLE 19-continued

| | | | | | |
|---|---|---|---|---|---|
| 237 | 2.70 | 10 | Compound (74) | 120 | Yes |
| 238 | 2.70 | 10 | Control (c) | 120 | Yes |
| 239 | 2.70 | 10 | Compound (2) | 120 | Yes |

*Difference (between emulsion layer and protective layer)
Yes: Present invention
No: Not the invention

TABLE 20

| Sample No. | Sensitivity 45 sec. processing | Sensitivity 90 sec. processing | Granularity | Pressure desensitization | Abrasion blackening (g) |
|---|---|---|---|---|---|
| 231 | 100 | 115 | 0.0023 | 0.19 | 25 |
| 232 | 115 | 130 | 0.0016 | 0.08 | 45 |
| 233 | 120 | 135 | 0.0016 | 0.09 | 47 |
| 234 | 130 | 145 | 0.0016 | 0.09 | 57 |
| 235 | 90 | 105 | 0.0016 | 0.09 | 60 |
| 236 | 135 | 150 | 0.0016 | 0.09 | 60 |
| 237 | 135 | 150 | 0.0016 | 0.09 | 58 |
| 238 | 100 | 115 | 0.0016 | 0.10 | 57 |
| 239 | 138 | 152 | 0.0016 | 0.10 | 62 |

EXAMPLE 13

Formation of core grains was carried out in the same procedures as those for E-32 to E-35 to prepare octahedral silver iodobromide emulsions containing 5 mole %, 10 mole %, 25 mole % and 40 mole %, respectively, of silver iodide. In the same procedures as those for E-31, except that shells were made to contain 1.0 mole % of potassium iodide, octahedral monodispersed emulsions comprising grains having an average grain size of 0.75 μm were prepared, which were respectively designated as E-36, E-37, E-38 and E-39.

On these emulsions, chemical sensitization and coating were carried out in the same manner as in Example 10 to obtain samples No. 240 to 247. Profiles of the samples are shown in Table 21 (Table 21-a, -b, -c).

These samples were evaluated in the same manner as in Example 10 to obtain the results shown in Table 22.

TABLE 21

(Table 21-a)

| Sample No. | Silver halide emulsion layer: Emulsion | Gelatin amount per one side (g/m²) | Surface active agent: Type | Surface active agent: Amount per one side (g/m²) | Surface tension (dyn/cm) |
|---|---|---|---|---|---|
| 240 | E-29 | 1.60 | 2-83 | $1 \times 10^{-4}$ | 35 |
| 241 | E-36 | 1.60 | 2-83 | $1 \times 10^{-4}$ | 35 |
| 242 | E-37 | 1.60 | 2-83 | $1 \times 10^{-4}$ | 35 |
| 243 | E-38 | 1.60 | 2-83 | $1 \times 10^{-4}$ | 35 |
| 244 | E-38 | 1.60 | 2-83 | $1 \times 10^{-4}$ | 35 |
| 245 | E-38 | 1.60 | 2-83 | $1 \times 10^{-4}$ | 35 |
| 246 | E-38 | 1.60 | 2-83 | $1 \times 10^{-4}$ | 35 |
| 247 | E-39 | 1.60 | 2-83 | $1 \times 10^{-4}$ | 35 |

(Table 21-b)

| Sample No. | Protective layer: Gelatin amount per one side (g/m²) | Surface active agent: Type | Surface active agent: Amount per one side (g/m²) | Surface tension (dyn/cm) |
|---|---|---|---|---|
| 240 | 1.00 | 2-81 | $1 \times 10^{-3}$ | 27 |
| 241 | 1.00 | 2-81 | $1 \times 10^{-3}$ | 27 |
| 242 | 1.00 | 2-81 | $1 \times 10^{-3}$ | 27 |
| 243 | 1.00 | 2-81 | $1 \times 10^{-3}$ | 27 |
| 244 | 1.00 | 2-81 | $1 \times 10^{-3}$ | 27 |
| 245 | 1.00 | 2-81 | $1 \times 10^{-3}$ | 27 |
| 246 | 1.00 | 2-81 | $1 \times 10^{-3}$ | 27 |
| 247 | 1.00 | 2-81 | $1 \times 10^{-3}$ | 27 |

(Table 21-c)

| Sample No. | Total gelatin amount/ one side (g/m²) | Diff.* in surface tension (dyn/cm) | Sensitizing dye: Type | Sensitizing dye: Amount (mg/mole/AgX) | Remarks |
|---|---|---|---|---|---|
| 240 | 2.60 | 8 | — | — | Yes |
| 241 | 2.60 | 8 | Compound (44) | 250 | Yes |
| 242 | 2.60 | 8 | Compound (44) | 250 | Yes |
| 243 | 2.60 | 8 | — | — | Yes |
| 244 | 2.60 | 8 | Compound (44) | 250 | Yes |
| 245 | 2.60 | 8 | Compound (47) | 250 | Yes |
| 246 | 2.60 | 8 | Control (b) | 250 | No |
| 247 | 2.60 | 8 | Compound (44) | 250 | Yes |

*Difference (between emulsion layer and protective layer)
Yes: Present invention
No: Not the invention

TABLE 22

| Sample No. | Sensitivity 45 sec. processing | Sensitivity 90 sec. processing | Granularity | Pressure desensitization | Abrasion blackening (g) |
|---|---|---|---|---|---|
| 240 | 103 | 118 | 0.0024 | 0.19 | 23 |
| 241 | 130 | 145 | 0.0017 | 0.08 | 42 |
| 242 | 140 | 155 | 0.0017 | 0.08 | 50 |
| 243 | 95 | 110 | 0.0017 | 0.09 | 55 |
| 244 | 145 | 160 | 0.0017 | 0.09 | 55 |
| 245 | 145 | 160 | 0.0017 | 0.09 | 54 |
| 246 | 105 | 120 | 0.0017 | 0.09 | 52 |
| 237 | 148 | 165 | 0.0017 | 0.09 | 58 |

As will be clear from Table 22, the samples according to this invention are excellent in sensitivity, granularity, pressure desensitization, and abrasion blackening as a whole, and it is also seen from the comparison with the conventional 90 second processing that the sensitivity is higher than the conventional system (samples No. 240 and No. 243), and yet the processing time can be shortened to ½ to make twice the processing ability.

EXAMPLE 14

While controlling at 60° C., pAg=8.0 and pH=2.0, a cubic monodispersed emulsion comprising silver iodobromide grains having an average grain size of 0.28 μm and containing 2.0 mole % of silver iodide were prepared according to a double jet method. Part of this emulsion was used as cores, and allowed to grow in the following manner. That is, to the solutions containing the core grains and gelatin, an ammoniacal silver nitrate solution and a solution containing potassium iodide and potassium bromide were added at 40° C., pAg 8.0 and pH 9.5 according to a double jet method to form a first coat each containing 5 mole %, 10 mole %, 25 mole % or 40 mole % of silver iodide.

Each of the emulsions was treated in the quite same procedures as those for E-2, except that the pAg was made to be 9.0, to form a second coat comprising silver bromide alone, thereby preparing core/shell emulsions comprising cubic monodispersed silver iodobromide grains having an average grain size of 0.65 μm, which were designated as E-40, E-41, E-42 and E-43, respectively. All of these emulsions were made to have an average silver iodide content of 3.0 mole %.

On these monodispersed emulsions, chemical sensitization and coating were carried out in the same manner as in Example 10 to obtain samples No. 248 to No. 255. Profiles of the samples are shown in Table 23 (Table 23-a, -b, -c).

These samples were evaluated in the same manner as in Example 10 to obtain the results as shown in Table 24.

TABLE 23

| (Table 23-a) | | | | | | (Table 23-b) | | | |
|---|---|---|---|---|---|---|---|---|---|
| | Silver halide emulsion layer | | | | | Protective layer | | | |
| | | Gelatin | Surface active agent | | Surface | Gelatin | Surface active agent | | Surface |
| Sample No. | Emulsion | amount per one side (g/m²) | Type | Amount per one side (g/m²) | tension (dyn/cm) | amount per one side (g/m²) | Type | Amount per one side (g/m²) | tension (dyn/cm) |
| 248 | E-29 | 1.50 | 2-82 | $1 \times 10^{-4}$ | 35 | 1.10 | 2-82 | $4 \times 10^{-3}$ | 25 |
| 249 | E-40 | 1.50 | 2-82 | $1 \times 10^{-4}$ | 35 | 1.10 | 2-82 | $4 \times 10^{-3}$ | 25 |
| 250 | E-41 | 1.50 | 2-82 | $1 \times 10^{-4}$ | 35 | 1.10 | 2-82 | $4 \times 10^{-3}$ | 25 |
| 251 | E-42 | 1.50 | 2-82 | $1 \times 10^{-4}$ | 35 | 1.10 | 2-82 | $4 \times 10^{-3}$ | 25 |
| 252 | E-42 | 1.50 | 2-82 | $1 \times 10^{-4}$ | 35 | 1.10 | 2-82 | $4 \times 10^{-3}$ | 25 |
| 253 | E-42 | 1.50 | 2-82 | $1 \times 10^{-4}$ | 35 | 1.10 | 2-82 | $4 \times 10^{-3}$ | 25 |
| 254 | E-42 | 1.50 | 2-82 | $1 \times 10^{-4}$ | 35 | 1.10 | 2-82 | $4 \times 10^{-3}$ | 25 |
| 255 | E-43 | 1.50 | 2-82 | $1 \times 10^{-4}$ | 35 | 1.10 | 2-82 | $4 \times 10^{-3}$ | 25 |

(Table 23-c)

| Sample No. | Total gelatin amount/ one side (g/m²) | Diff.* in surface tension (dyn/cm) | Sensitizing dye Type | Sensitizing dye Amount (mg/mole/AgX) | Remarks |
|---|---|---|---|---|---|
| 248 | 2.60 | 10 | — | — | Yes |
| 249 | 2.60 | 10 | Compound (74) | 50 | Yes |
| 250 | 2.60 | 10 | Compound (74) | 50 | Yes |
| 251 | 2.60 | 10 | — | — | Yes |
| 252 | 2.60 | 10 | Compound (74) | 50 | Yes |
| 253 | 2.60 | 10 | Compound (69) | 50 | Yes |
| 254 | 2.60 | 10 | Control (c) | 50 | Yes |
| 255 | 2.60 | 10 | Compound (74) | 50 | Yes |

*Difference (between emulsion layer and protective layer)
Yes: Present invention
No: Not the invention

TABLE 24

| Sample No. | Sensitivity 45 sec. processing | Sensitivity 90 sec. processing | Granularity | Pressure desensitization | Abrasion blackening (g) |
|---|---|---|---|---|---|
| 248 | 103 | 118 | 0.0024 | 0.19 | 23 |
| 249 | 135 | 150 | 0.0014 | 0.06 | 45 |
| 250 | 150 | 165 | 0.0014 | 0.06 | 53 |
| 251 | 100 | 115 | 0.0014 | 0.06 | 55 |
| 252 | 155 | 170 | 0.0014 | 0.06 | 55 |
| 253 | 155 | 170 | 0.0014 | 0.06 | 55 |
| 254 | 110 | 125 | 0.0014 | 0.06 | 52 |
| 255 | 158 | 175 | 0.0014 | 0.07 | 57 |

As will be clear from Table 24, the samples according to this invention are excellent in sensitivity, granularity, pressure desensitization, and abrasion blackening as a whole, and it is also seen from the comparison with the conventional 90 second processing that the sensitivity is higher than the conventional system (samples No. 248 and No. 251), and yet the processing time can be shortened to ½ to make twice the processing ability.

As described in the foregoing, this invention can give a light-sensitive silver halide photographic material excellent in sensitivity, contrast, maximum density, fixing performance and drying characteristics even when an ultra rapid processing of total processing time of 20 seconds to 60 seconds is carried out.

This invention can also give a light-sensitive si halide photographic material being involved in less trouble in coating even with a small amount of gelatin, suffering less abrasion blackening or pressure desensitization, and also having excellent graininess.

We claim:

1. A light-sensitive silver halide photographic element comprising a support having on one side thereof at least two photographic constituent layers comprising:

(a) at least one silver halide emulsion layer formed from at least one first coating solution comprising a silver halide photographic emulsion and having surface tension x; and (b) an outermost hydrophilic colloid layer adjacent to said at least one silver halide emulsion layer, said outermost layer being formed from a second coating solution comprising a hydrophilic colloid and at least one surface active agent, said second coating solution having a surface tension y, wherein y is smaller than x by at least 6 dyne/cm;

wherein (a) said photographic element has 2.20 to 3.10 g/m² of gelatin in the photographic constituent layers on said one side of said support, or (b) each of said first and second coating solutions has a viscosity of 20 cp or less;

and wherein (a) the surface tension, x, of said first coating solution is about 34 to 36 dynes/cm and (b) the surface tension, y, of said second coating solution is about 19 to 30 dynes/cm.

2. The light-sensitive silver halide photographic element according to claim 1, wherein said at least one silver halide emulsion layer comprises a sensitizing dye having an absorption band in the visible light region.

3. An X-ray light-sensitive silver halide photographic element according to claim 2.

4. The light-sensitive silver halide photographic element according to claim 2, wherein said sensitizing dye comprises at least one compound selected from the group consisting of compounds represented by Formulas (I), (II) and (III): Formula (I):

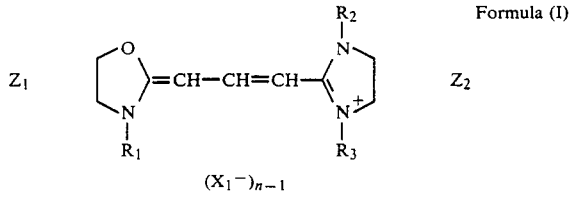

Formula (I)

wherein $R_1$, $R_2$ and $R_3$ each represent a substituted or unsubstituted alkyl group, alkenyl group or aryl group, and at least one or $R_1$ and $R_3$ represents a sulfoalkyl group or a carboxyalkyl group; $X_1^-$ represents an anion; $Z_1$ and $Z_2$ represent a group of nonmetallic atoms necessary for the completion of a substituted or unsubstituted carbon ring; and n represents 1 or 2, provided that n is 1 when an intramolecular salt is formed;

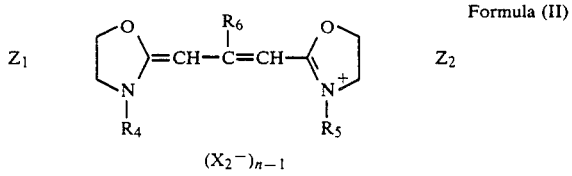

Formula (II)

wherein $R_4$ and $R_5$ each represent a substituted or unsubstituted alkyl group, alkenyl group or aryl group, and at least one of $R_4$ and $R_5$ represents a sulfoalkyl group or a carboxyalkyl group; $R_6$ represents a hydrogen atom, a lower alkyl group or an aryl group; $X_2^-$ represents an anion; $Z_1$ and $Z_2$ represent a group of nonmetallic atoms necessary for the completion of a substituted or unsubstituted carbon ring; and n represents 1 or 2, provided that n is 1 when an intramolecular salt is formed;

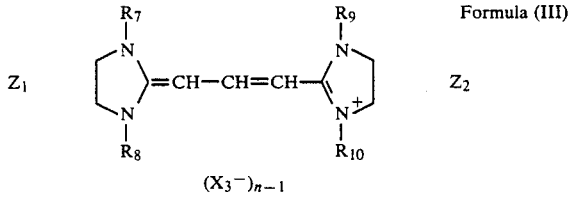

Formula (III)

wherein $R_7$ and $R_9$ each represent a substituted or unsubstituted lower alkyl group; $R_8$ and $R_{10}$ each represent a lower alkyl group, a hydroxyalkyl group, a sulfoalkyl group or a carboxyalkyl group; $X_3^-$ represents an anion; $Z_1$ and $Z_2$ represent a group of nonmetallic atoms necessary for the completion of a substituted or unsubstituted carbon ring; and n represents 1 or 2, provided that n is 1 when an intramolecular salt is formed.

5. An X-ray light-sensitive silver halide photographic element according to claim 4.

6. The light-sensitive silver halide photographic material according to claim 1, wherein the difference in the viscosity between said second coating solution and said first coating solution is in the range of ±2 cp.

7. The light-sensitive silver halide photographic element material according to claim 4, wherein the anion represented by $X_1^-$ is selected from the group consisting of a chloride ion, a bromide ion, an iodide ion, a thiocyanate ion, a sulfate ion, a perchlorate ion, a p-toluene sulfonate ion and an ethyl sulfate ion; and said substituted or unsubstituted carbon ring containing $Z_1$ or $Z_2$ is a substituted or unsubstituted benzene or naphthalene ring.

8. The light-sensitive silver halide photographic element according to claim 4, wherein the lower alkyl group represented by $R_6$ is selected from the group consisting of a methyl group, an ethyl group, a propyl group and a butyl group; the aryl group represented by $R_6$ is a phenyl group; the anion represented by $X_2^-$ is selected from the group consisting of a chloride ion, a bromide ion, an iodide ion, a thiocyanate ion, a sulfate ion, a perchlorate ion, a p-toluene sulfonate ion and an ethyl sulfate ion; and said substituted or unsubstituted carbon ring containing $Z_1$ or $Z_2$ is a substituted or unsubstituted benzene or naphthalene ring.

9. The light-sensitive silver halide photographic element according to claim 4, wherein the unsubstituted lower alkyl group represented by $R_7$ and $R_9$ is selected from the group consisting of a methyl group, an ethyl group, a propyl group and a butyl group; the lower alkyl group represented by $R_8$ and $R_{10}$ is selected from the group consisting of a methyl group, an ethyl group, a propyl group and a butyl group; the anion represented by $X_3^-$ is selected from the group consisting of a chloride ion, a bromide ion, an iodide ion, a thiocyanate ion, a sulfate ion, a perchlorate ion, a p-toluene sulfonate ion and an ethyl sulfate ion; and said substituted or unsubstituted carbon ring containing $Z_1$ or $Z_2$ is a substituted or unsubstituted benzene or naphthalene ring.

10. The light-sensitive silver halide photographic element according to claim 4, wherein the total amount of said compounds represented by Formulas (I), (II) and (III) present in said at least one silver halide emulsion layer is from 10 mg to 900 mg per 1 mole of silver halide in said silver halide emulsion layer.

11. The light-sensitive silver halide photographic element according to claim 4, wherein said at least one silver halide emulsion layer comprises silver halide grains having a multilayer structure comprising silver iodobromide, wherein the difference in average iodine contents between two layers in said multilayer structure, which are adjacent to each other and have uniform iodine distributions, is 10 mole % or less.

12. The light-sensitive silver halide photographic element material according to claim 11, wherein said multilayer structure comprises an inner nucleus and coats, said inner nucleus and coats comprising a compound selected from the group consisting of silver bromide, silver iodobromide and silver iodide.

13. The light-sensitive silver halide photographic element according to claim 11, wherein the surface layers of said grains having a multilayer structure comprise a compound selected from the group consisting of silver bromide and silver iodobromide.

14. The light-sensitive silver halide photographic element according to claim 1, wherein said at least one silver halide emulsion layer comprises silver halide grains which have an average grain size within the range of 0.30 to 1.50 μm.

* * * * *